US012686346B2

(12) United States Patent (10) Patent No.: US 12,686,346 B2
Zaruhata et al. (45) Date of Patent: Jul. 21, 2026

(54) ROTARY CONNECTOR APPARATUS AND STEERING APPARATUS

(71) Applicants: FURUKAWA ELECTRIC CO., LTD., Tokyo (JP); FURUKAWA AUTOMOTIVE SYSTEMS INC., Inukami-gun (JP)

(72) Inventors: Masahiro Zaruhata, Inukami-gun (JP); Yoshihiro Shiotani, Inukami-gun (JP); Yoji Tajiri, Inukami-gun (JP); Yoshiyuki Suzuki, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 278 days.

(21) Appl. No.: 18/383,472

(22) Filed: Oct. 24, 2023

(65) Prior Publication Data

US 2024/0067109 A1 Feb. 29, 2024

Related U.S. Application Data

(63) Continuation of application No. PCT/JP2022/018747, filed on Apr. 25, 2022.

(30) Foreign Application Priority Data

| Apr. 28, 2021 | (JP) | ................................. | 2021-076376 |
| May 27, 2021 | (JP) | ................................. | 2021-089441 |
| Jun. 2, 2021 | (JP) | ................................. | 2021-093074 |

(51) Int. Cl.
| *B60R 16/027* | (2006.01) |
| *B60R 16/02* | (2006.01) |
| *B62D 1/10* | (2006.01) |
| *H01R 35/02* | (2006.01) |

(52) U.S. Cl.
CPC ........ *B60R 16/027* (2013.01); *B60R 16/0215* (2013.01); *B62D 1/10* (2013.01); *H01R 35/025* (2013.01)

(58) Field of Classification Search
CPC ..... B60R 16/027; B60R 16/0215; B62D 1/04; B62D 1/10; H01R 35/025; H01R 35/04
USPC .......................................................... 439/164
See application file for complete search history.

(56) References Cited

U.S. PATENT DOCUMENTS

| 2009/0156034 A1* | 6/2009 | Araki | ................... H01R 35/025 |
| | | | 439/164 |
| 2013/0065413 A1* | 3/2013 | Adachi | ................. B60R 16/027 |
| | | | 439/164 |

(Continued)

FOREIGN PATENT DOCUMENTS

| DE | 10 2008 063951 | 6/2010 | |
| DE | 102008063951 A1 * | 6/2010 | ............... G01D 5/04 |

(Continued)

OTHER PUBLICATIONS

Written Opinion for corresponding International Application No. PCT/JP2022/018747, Nov. 9, 2023.

(Continued)

*Primary Examiner* — Abdullah A Riyami
*Assistant Examiner* — Amara Anderson
(74) *Attorney, Agent, or Firm* — Mori & Ward, LLP

(57) ABSTRACT

A rotary connector apparatus includes a stator, a rotator, and an adjustment structure. The stator is configured to be attached to a vehicle body. The rotator is provided rotatably about a rotation axis with respect to the stator. The stator and the rotator define a cable housing space provided to surround the rotation axis. The adjustment structure is configured to allow the rotation axis to move with respect to the vehicle body in a state where the stator is attached to the vehicle (Continued)

body. The adjustment structure includes a coupling structure configured to couple the stator to the vehicle body. The coupling structure supports the stator movably with respect to the vehicle body to change an angle of the rotation axis with respect to the vehicle body in a state where the coupling structure couples the stator to the vehicle body.

13 Claims, 51 Drawing Sheets

(56) References Cited

U.S. PATENT DOCUMENTS

| | | | | |
|---|---|---|---|---|
| 2014/0235082 A1* | 8/2014 | Adachi | ................. | B60R 16/027 |
| | | | | 439/164 |
| 2021/0001789 A1* | 1/2021 | Utsunomiya | ........ | B62D 15/021 |

FOREIGN PATENT DOCUMENTS

| | | |
|---|---|---|
| EP | 3754795 | 12/2020 |
| JP | 2006-327362 | 12/2006 |
| JP | 2019-121430 | 7/2019 |
| WO | WO 2019/181841 | 9/2019 |

OTHER PUBLICATIONS

International Search Report for corresponding International Application No. PCT/JP2022/018747, Jul. 19, 2022.
Extended European Search Report for corresponding EP Application No. 22795729.7-1009, Aug. 20, 2024.
Japanese Office Action for corresponding JP Application No. 2021-076376, Nov. 19, 2024 (w/ English machine translation).
Japanese Office Action for corresponding JP Application No. 2021-089441, Nov. 19, 2024 (w/ English machine translation).
Korean Office Action for corresponding KR Application No. 10-2023-7038543, Mar. 9, 2026 (w/ English machine translation).

* cited by examiner

ROTARY CONNECTOR APPARATUS AND STEERING APPARATUS

CROSS-REFERENCE TO RELATED APPLICATIONS

The present application is a continuation application of International Application No. PCT/JP2022/018747, filed Apr. 25, 2022, which claims priority to Japanese Patent Applications No. 2021-076376 filed Apr. 28, 2021, No. 2021-089441 filed May 27, 2021, and No. 2021-093074 filed Jun. 2, 2021. The contents of these applications are incorporated herein by reference in their entirety.

BACKGROUND

Technical Field

The technique disclosed in the present application relates to a rotary connector apparatus and a steering apparatus.

Background Art

A rotary connector apparatus is configured to electrically connect an electronic component provided in a steering wheel to an electronic component provided in a vehicle body. For example, the rotary connector apparatus includes a fixing member, a rotation member, and a flexible flat cable. The fixing member is fixed to the vehicle body. The rotation member is rotatable about the rotation axis with respect to the fixing member. The rotation member is coupled to the steering wheel and is configured to rotate together with the steering. The steering wheel is fixed to an end portion of the steering shaft. The steering shaft is rotatably supported by the vehicle body. The flexible flat cable is provided in a space formed by the fixing member and the rotation member, and electrically connects the electronic component provided in the steering wheel to the electronic component provided in the vehicle body.

However, in some situations, the steering may become misaligned with respect to the rotary connector apparatus due to manufacturing errors, assembling errors, and the like of the components. When the steering becomes misaligned, the load at the coupling part between the steering wheel and the rotation member increases, and consequently abnormal noise may be generated from the coupling part and the coupling part may be damaged.

In view of this, a rotary connector apparatus that follows the misalignment of the steering has been proposed (see, for example, WO 2019/181841).

SUMMARY

According to one aspect, a rotary connector apparatus includes a stator, a rotator, and an adjustment structure. The stator is configured to be attached to a vehicle body. The rotator is provided rotatably about a rotation axis with respect to the stator. The stator and the rotator define a cable housing space provided to surround the rotation axis. The adjustment structure is configured to allow the rotation axis to move with respect to the vehicle body in a state where the stator is attached to the vehicle body. The adjustment structure includes a coupling structure configured to couple the stator to the vehicle body. The coupling structure supports the stator movably with respect to the vehicle body to change an angle of the rotation axis with respect to the vehicle body in a state where the coupling structure couples the stator to the vehicle body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 48 is an exploded perspective view of the coupling structure of the rotary connector apparatus illustrated in FIG. 36.

DESCRIPTION OF THE EMBODIMENTS

Figure 1:
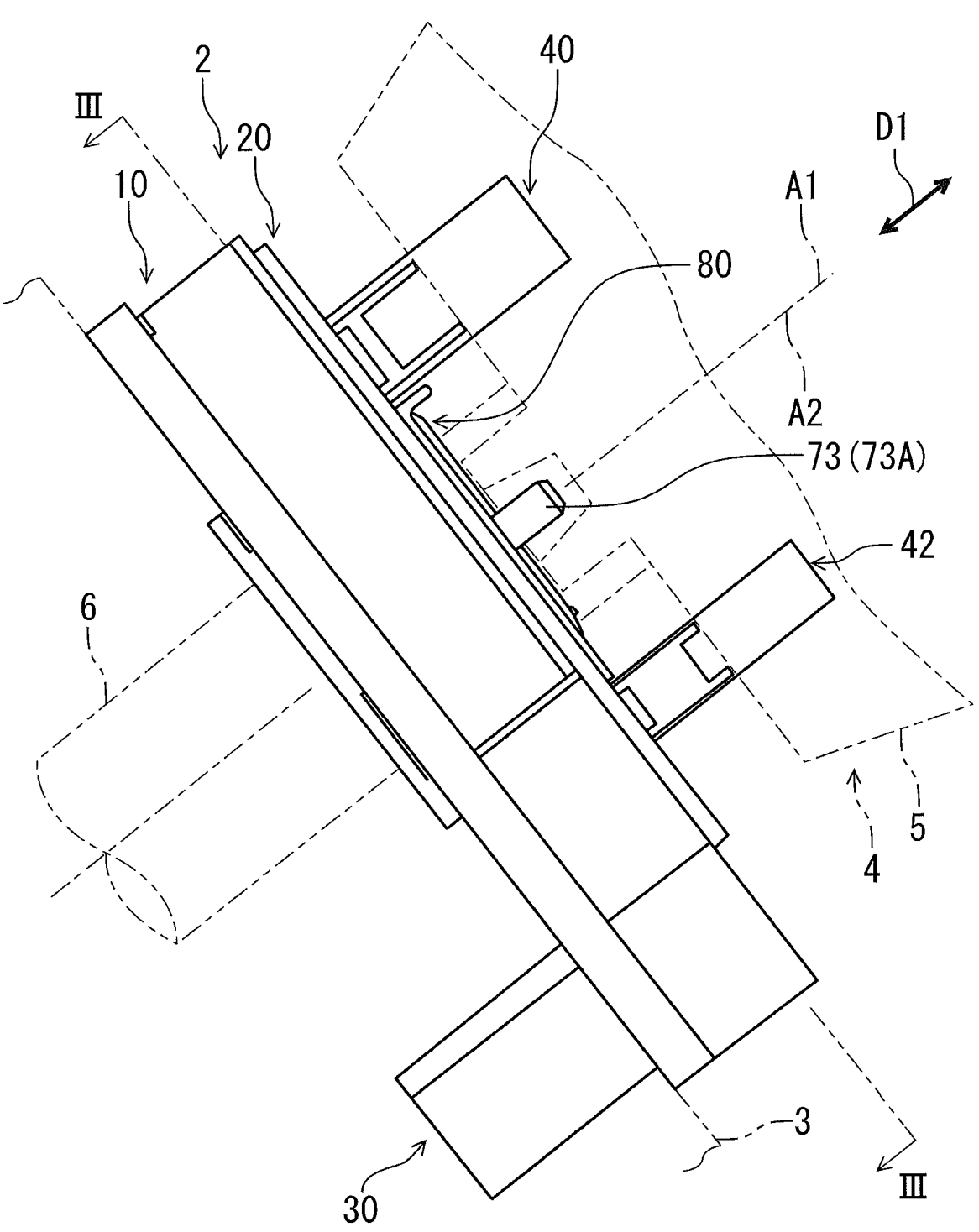
FIG. 1 is a side view of a rotary connector apparatus according to a first embodiment.

Embodiments are described below with reference to the drawings. The same reference signs in the drawings represent corresponding or the same configurations.

First Embodiment

As illustrated in FIG. 1, a rotary connector apparatus 2 includes a stator 10 and a rotator 20. The stator 10 is configured to be attached to a vehicle body 3. The rotator 20 is provided rotatably about a rotation axis A1 with respect to the stator 10. In the present embodiment, for example, the stator 10 is configured to be fastened to a combination switch of the vehicle body 3. The rotator 20 is configured to rotate together with a steering 4 with respect to the stator 10. The steering 4 includes a steering wheel 5 and a steering shaft 6. The steering wheel 5 is fastened to an end portion of the steering shaft 6. The steering 4 is provided rotatably about a rotation axis A2 with respect to the vehicle body 3.

Figure 2:
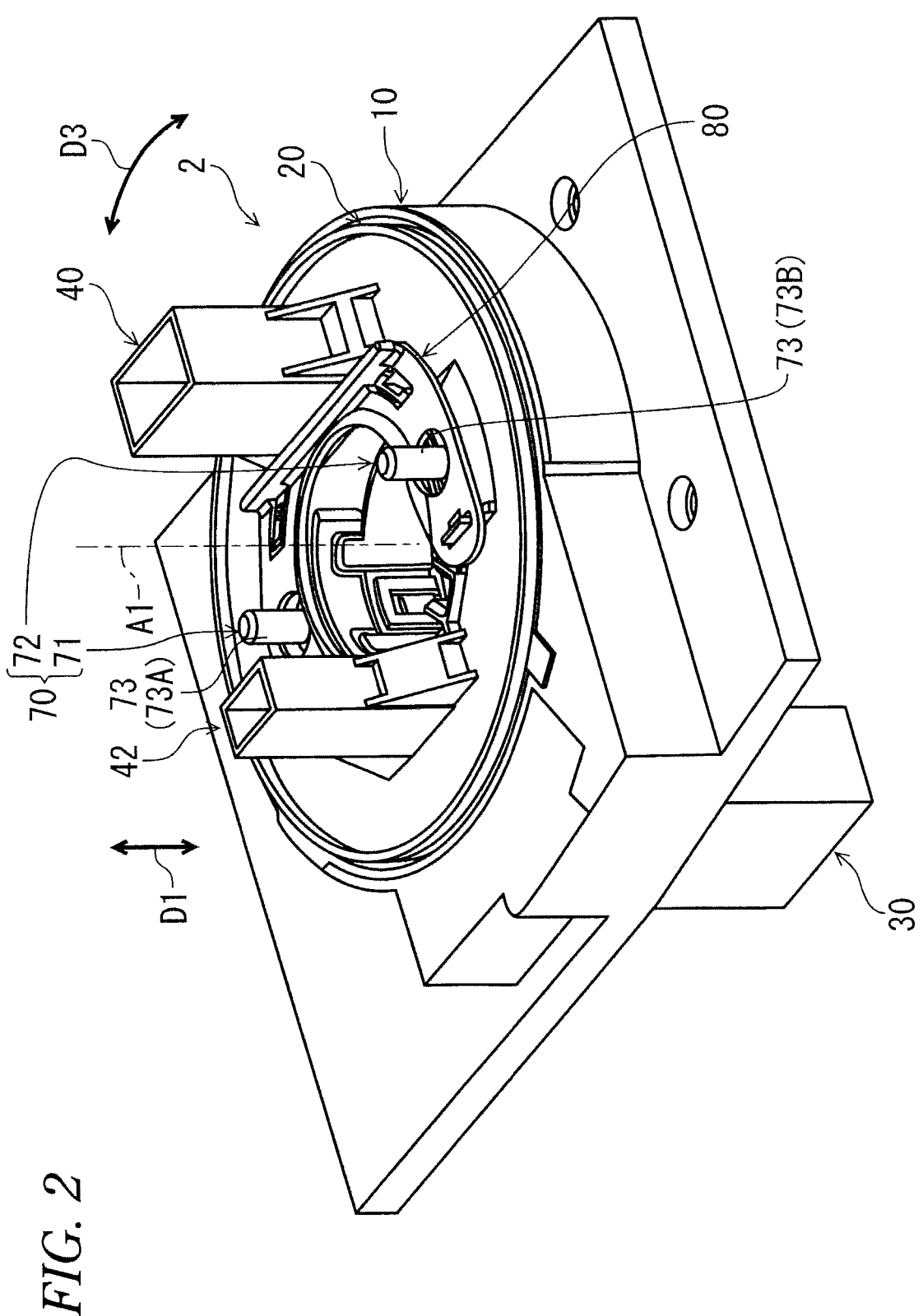
FIG. 2 is a perspective view of the rotary connector apparatus according to the first embodiment.

As illustrated in FIG. 2, the rotary connector apparatus 2 includes a first electrical connector 30 and second electrical connectors 40 and 42. The first electrical connector 30 is attached to the stator 10. The second electrical connectors 40 and 42 are attached to the rotator 20. The first electrical connector 30 is configured to be electrically connected to electrical equipment (such as a control apparatus and a battery) provided in the vehicle body 3 (see, for example, FIG. 1), for example. The second electrical connectors 40 and 42 are configured to be electrically connected to a switch and the like of the steering wheel 5 and/or an electric circuit of an air bag apparatus and the like, for example.

Figure 3:
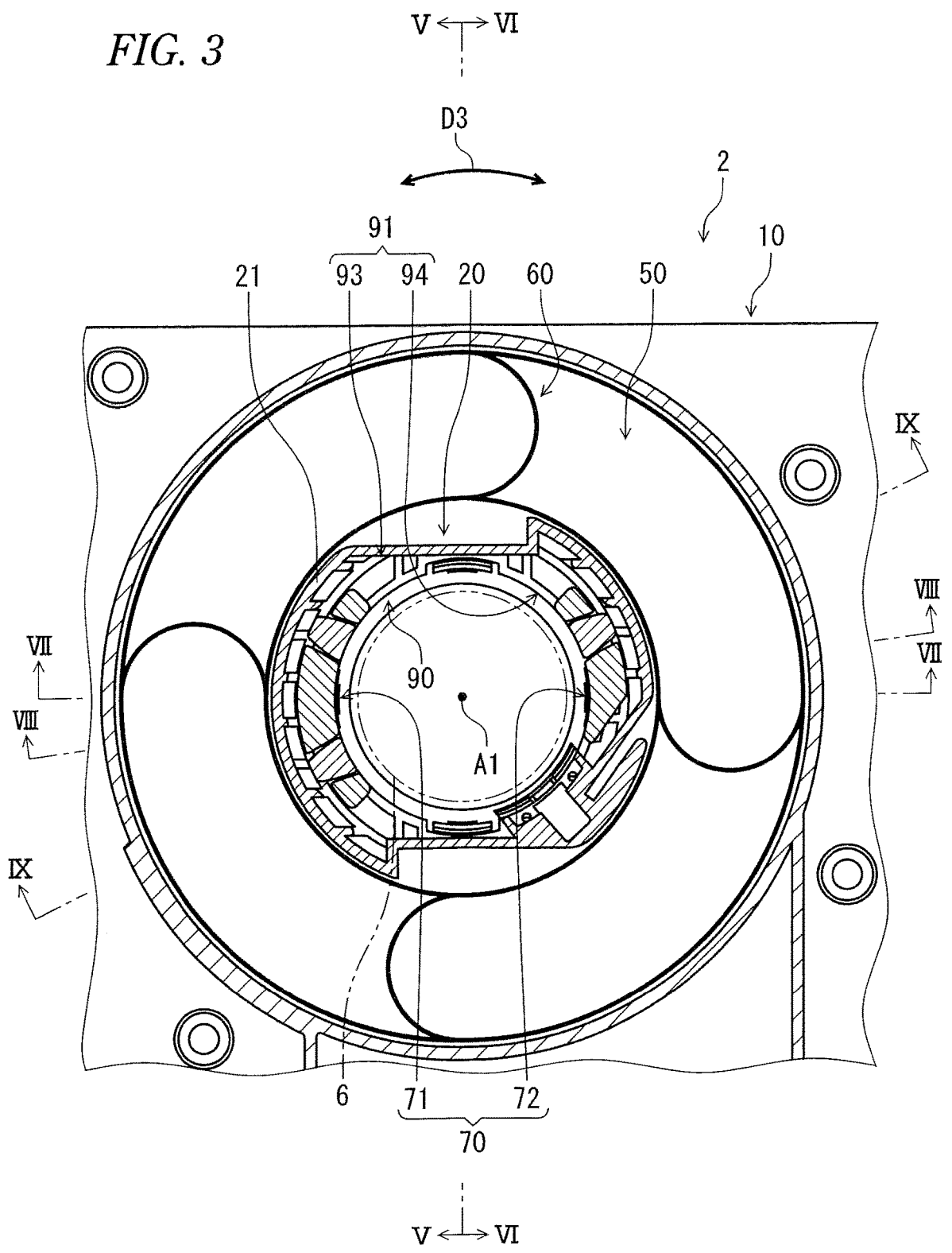
FIG. 3 is a cross-sectional view of the rotary connector apparatus taken along a line III-III in FIG. 1.

As illustrated in FIG. 3, the stator 10 and the rotator 20 define a cable housing space 50 provided to surround the rotation axis A1. The rotator 20 includes a rotator body 21. The stator 10 and the rotator body 21 define the cable housing space 50. For example, the cable housing space 50 has an annular shape, and extends in a circumferential direction D3 with respect to the rotation axis A1. The rotary connector apparatus 2 further includes an electrical cable 60 provided in the cable housing space 50. The electrical cable 60 is electrically connected to the first electrical connector 30 and the second electrical connector 40 (FIG. 1). The electrical cable 60 has a flat shape with flexibility. The electrical cable 60 may also be referred to as a flexible flat cable. In the present embodiment, the electrical cable 60 includes a plurality of flat cables 61.

Figure 4:
FIG. 4 is an exploded perspective view of the rotary connector apparatus illustrated in FIG. 1.

As illustrated in FIG. 4, the rotator body 21 includes a disk part 21A and a cylindrical part 21B. The disk part 21A includes a center opening 21C. The cylindrical part 21B extends in an axial direction D1 defined along the rotation axis A1 from the inner periphery portion of the disk part 21A.

The rotator 20 includes a retainer 22. The retainer 22 is fastened to the rotator body 21. The retainer 22 is fastened to the cylindrical part 21B. With the rotator body 21 and the retainer 22, the rotator 20 is held rotatably about the rotation axis A1 with respect to the stator 10.

The rotary connector apparatus 2 includes an adjustment structure 9. The adjustment structure 9 is configured to allow the rotation axis A1 to move with respect to the vehicle body 3 in the state where the stator 10 is attached to the vehicle body 3. The adjustment structure 9 includes a movable member 70. The movable member 70 is attached to the rotator 20 and is configured to transmit the rotation of the steering 4 to the rotator 20 (see, for example, FIG. 1). The movable member 70 is a separate member from the rotator 20 and is movably attached to the rotator 20. The movable member 70 is coupled to the steering wheel 5 (see, for example, FIG. 1) and is configured to receive the rotational force from the steering 4 (see, for example, FIG. 1). The movable member 70 includes a rotation input part 73 configured to receive the rotational force from the steering 4 (see, for example, FIG. 1).

In the present embodiment, the movable member 70 includes a first movable body 71 and a second movable body 72. The rotation input part 73 includes a first rotation input part 73A and a second rotation input part 73B. The first movable body 71 includes the first rotation input part 73A. The second movable body 72 includes the second rotation input part 73B. The first movable body 71 is a separate member from the second movable body 72. However, the first movable body 71 may be formed integrally with the second movable body 72 as a one-piece member. The movable member 70 may include another movable body in addition to the first movable body 71 and the second movable body 72.

The first movable body 71 includes a first movable part 74. The first rotation input part 73A protrudes from the first movable part 74 along the rotation axis A1. The second movable body 72 includes a second movable part 75. The second rotation input part 73B protrudes from the second movable part 75 along the rotation axis A1.

The rotator 20 includes a holding member 80 attached to the rotator body 21. The movable member 70 is movably held between the rotator body 21 and the holding member 80. The first movable body 71 is movably held between the rotator body 21 and the holding member 80. The second movable body 72 is movably held between the rotator body 21 and the holding member 80.

In the present embodiment, the holding member 80 is a separate member from the rotator body 21. However, the holding member 80 may be formed integrally with the rotator body 21 as a one-piece member. In addition, the holding member 80 may be divided into a plurality of parts.

The holding member 80 includes a first opening 80A. The first rotation input part 73A extends through the first opening 80A. The holding member 80 includes a second opening 80B. The second rotation input part 73B extends through the second opening 80B.

In the present embodiment, the stator 10, the rotator body 21, the retainer 22, the movable member 70, and the holding member 80 are each made of a non-metal material. For example, the stator 10, the rotator body 21, the retainer 22, the movable member 70, and the holding member 80 are each made of resin. However, the material of each of the stator 10, the rotator body 21, the retainer 22, the movable member 70, and the holding member 80 may be a material other than resin.

Figure 5:
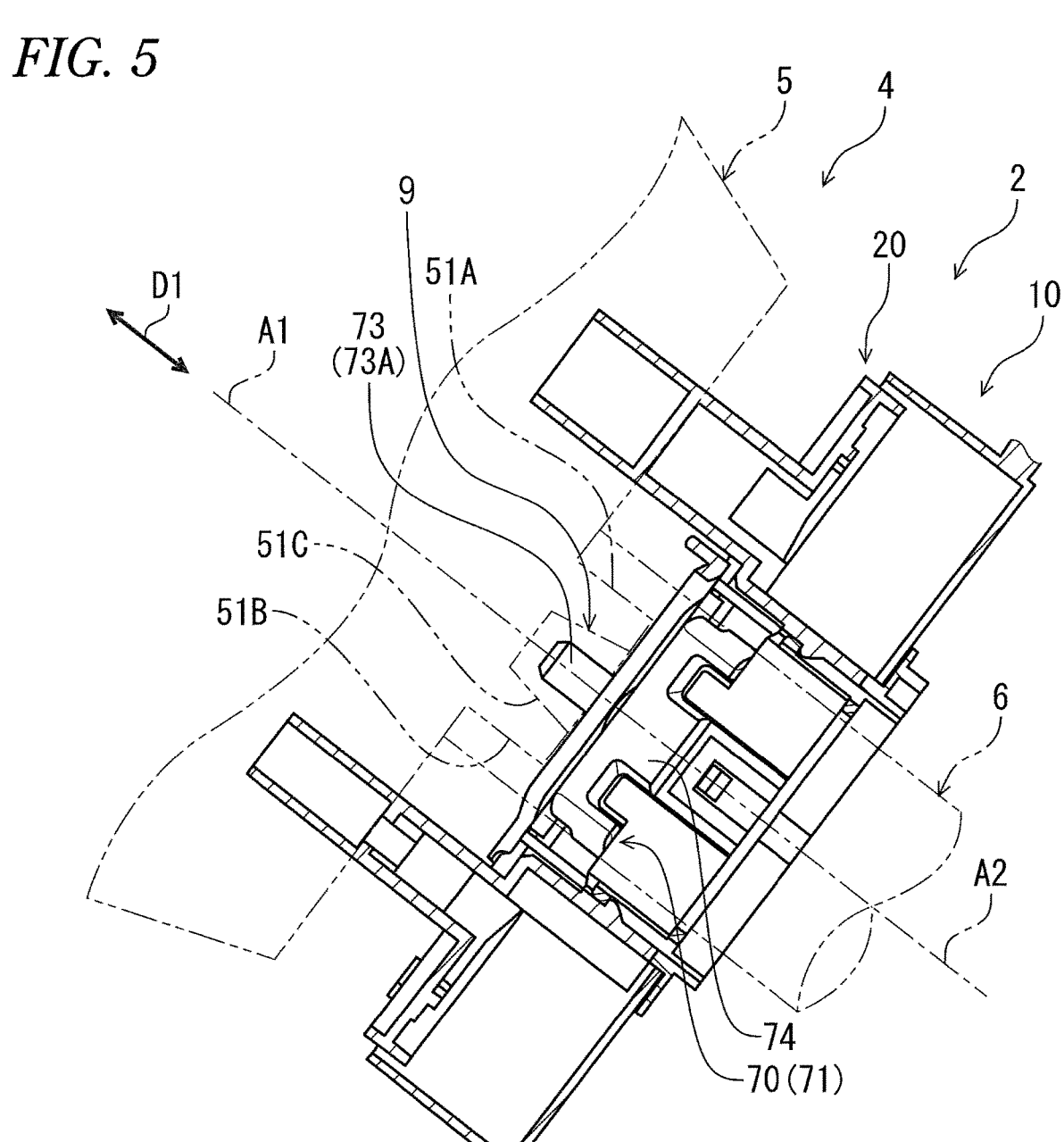
FIG. 5 is a cross-sectional view of the rotary connector apparatus taken along a line V-V in FIG. 3.

As illustrated in FIG. 5, the steering wheel 5 includes a first protrusion 51A, a second protrusion 51B, and an intermediate member 51C. The first protrusion 51A and the second protrusion 51B are disposed spaced apart from each other in the circumferential direction D3. The rotation input part 73 is disposed between the first protrusion 51A and the second protrusion 51B in the circumferential direction D3. The intermediate member 51C is attached to the rotation input part 73, and is disposed between the first protrusion 51A and the second protrusion 51B. The intermediate member 51C includes an elastic member. For example, the intermediate member 51C is made of rubber. The rotation of the steering wheel 5 is transmitted to the first rotation input part 73A of the first movable body 71 through the first protrusion 51A, the second protrusion 51B, and the intermediate member 51C. Note that the intermediate member 51C may be included in the movable member 70 as a torque pin cap attached to the first rotation input part 73A.

Figure 6:
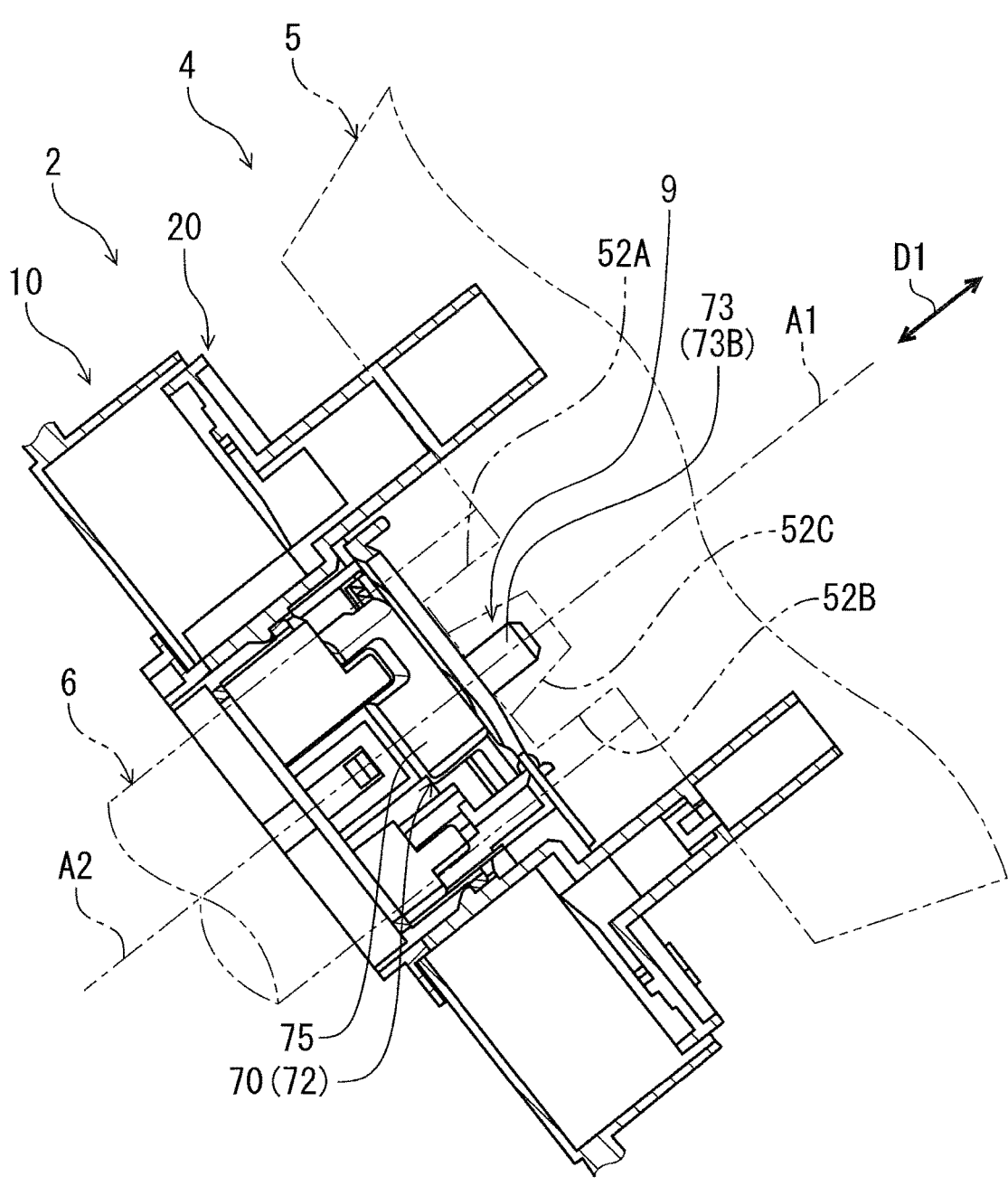
FIG. 6 is a cross-sectional view of the rotary connector apparatus taken along a line VI-VI in FIG. 3.

As illustrated in FIG. 6, the steering wheel 5 includes a first protrusion 52A, a second protrusion 52B, and an intermediate member 52C. The first protrusion 52A and the second protrusion 52B are disposed spaced apart from each other in the circumferential direction D3. The rotation input part 73 is disposed between the first protrusion 52A and the second protrusion 52B in the circumferential direction D3. The intermediate member 52C is attached to the rotation input part 73 and is disposed between the first protrusion 52A and the second protrusion 52B. The intermediate member 52C includes an elastic member. For example, the intermediate member 52C is made of rubber. The rotation of the steering wheel 5 is transmitted to the second rotation input part 73B of the second movable body 72 through the first protrusion 52A, the second protrusion 52B, and the intermediate member 52C. Note that the intermediate member 52C may be included in the movable member 70 as a torque pin cap attached to the second rotation input part 73B.

Figure 7:
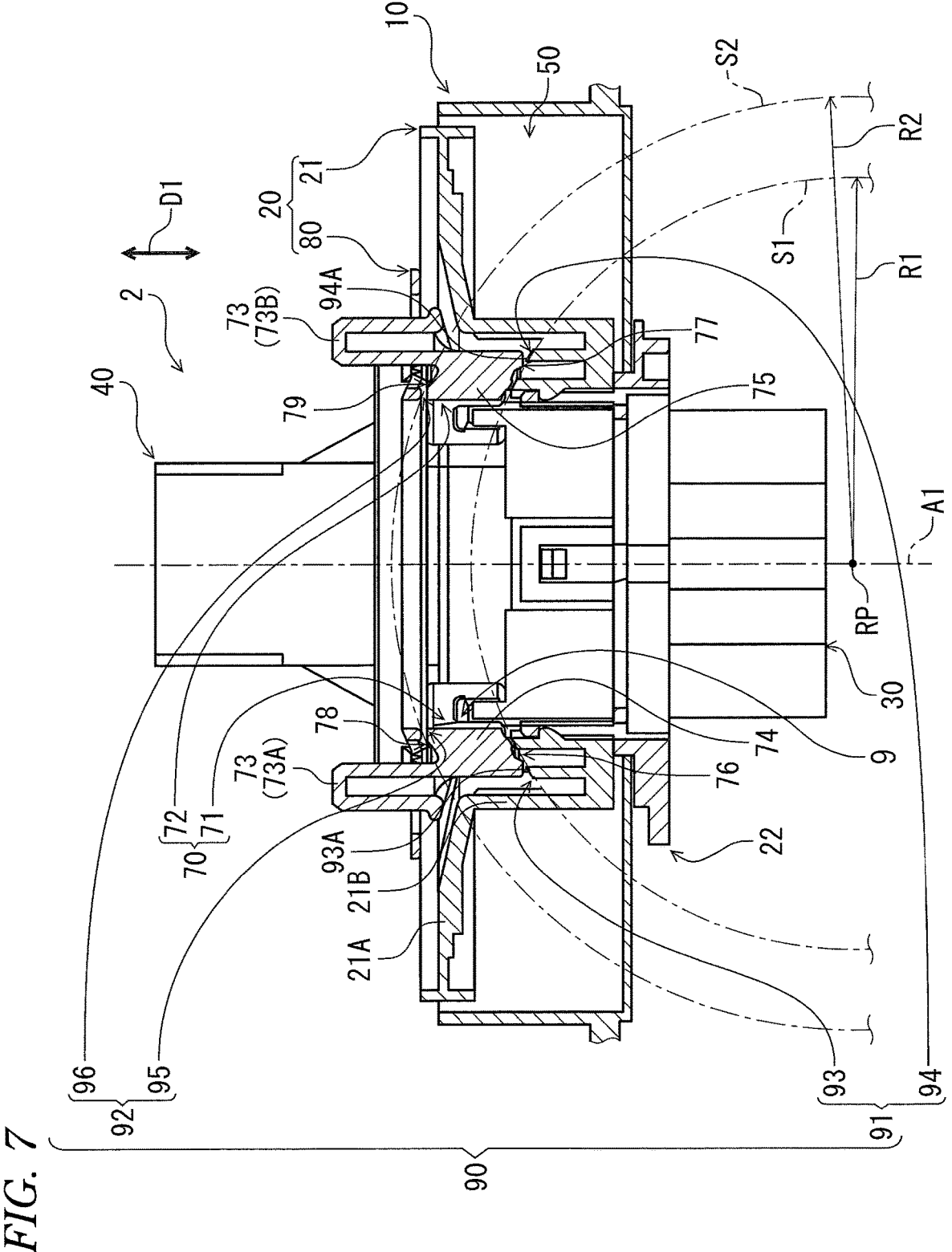
FIG. 7 is a cross-sectional view of the rotary connector apparatus taken along a line VII-VII in FIG. 3.

As illustrated in FIG. 7, the rotator 20 includes a support structure 90. The support structure 90 movably supports the movable member 70 to change the angle of the rotation input part 73 with respect to the rotator 20. The support structure 90 movably supports the first movable body 71 to change the angle of the first rotation input part 73A with respect to the rotator 20. The support structure 90 movably supports the second movable body 72 to change the angle of the second rotation input part 73B with respect to the rotator 20.

For example, the support structure 90 supports the movable member 70 movably within a predetermined range to change the angle of the rotation input part 73 with respect to the rotator 20. The support structure 90 supports the first movable body 71 movably within a predetermined range to change the angle of the first rotation input part 73A with respect to the rotator 20. The support structure 90 supports the second movable body 72 movably within a predetermined range to change the angle of the second rotation input part 73B with respect to the rotator 20.

The support structure 90 includes a first supporting body 91. The first supporting body 91 supports the movable member 70 movably along a first virtual sphere S1 centered at a reference point RP. The first supporting body 91 and the movable member 70 are contactable with each other on the first virtual sphere S1.

The support structure 90 includes a second supporting body 92. The second supporting body 92 supports the movable member 70 movably along a second virtual sphere S2 centered at the reference point RP. The second supporting body 92 and the movable member 70 are contactable with each other on the second virtual sphere S2.

The movable member 70 is disposed between the first supporting body 91 and the second supporting body 92. The first movable part 74 is movably held between first supporting part 93 and the holding member 80. The second movable part 75 is movably held between second supporting part 94 and the holding member 80.

In the present embodiment, the first supporting body 91 includes a first supporting part 93 and a second supporting part 94. The first supporting part 93 supports the first movable body 71 movably along the first virtual sphere S1. The second supporting part 94 supports the second movable body 72 movably along the first virtual sphere S1.

The second supporting body 92 includes a third supporting part 95 and a fourth supporting part 96. The third supporting part 95 supports the first movable body 71 movably along the second virtual sphere S2. The fourth supporting part 96 supports the second movable body 72 movably along the second virtual sphere S2.

The first movable body 71 is movably held between the first supporting part 93 and the third supporting part 95. The second movable body 72 is movably held between the second supporting part 94 and the fourth supporting part 96.

The first movable body 71 includes a first contact part 76. The first contact part 76 is contactable with the first supporting part 93 of the first supporting body 91 on the first virtual sphere S1. The first contact part 76 is provided at the first movable part 74.

The second movable body 72 includes a second contact part 77. The second contact part 77 is contactable with the second supporting part 94 of the first supporting body 91 on the first virtual sphere S1. The second contact part 77 is provided at the second movable part 75.

The first movable body 71 includes a third contact part 78. The third contact part 78 is contactable with the third supporting part 95 of the second supporting body 92 on the second virtual sphere S2. The third contact part 78 is provided at the first movable part 74.

The second movable body 72 includes a fourth contact part 79. The fourth contact part 79 is contactable with the fourth supporting part 96 of the second supporting body 92 on the second virtual sphere S2. The fourth contact part 79 is provided at the second movable part 75.

In the present embodiment, the reference point RP is defined on the rotation axis A1. The first virtual sphere S1 has a first curvature radius R1 defined from the reference point RP. The second virtual sphere S2 has a second curvature radius R2 defined from the reference point RP. The second curvature radius R2 is larger than the first curvature radius R1. However, the reference point RP may be shifted from the rotation axis A1. The second curvature radius R2 may be smaller than the first curvature radius R1.

In the present embodiment, the first supporting body 91 is provided at the rotator body 21. The second supporting body 92 is provided at the holding member 80. However, the first supporting body 91 may be provided at the holding member 80. The second supporting body 92 may be provided at the rotator body 21.

Figure 8:
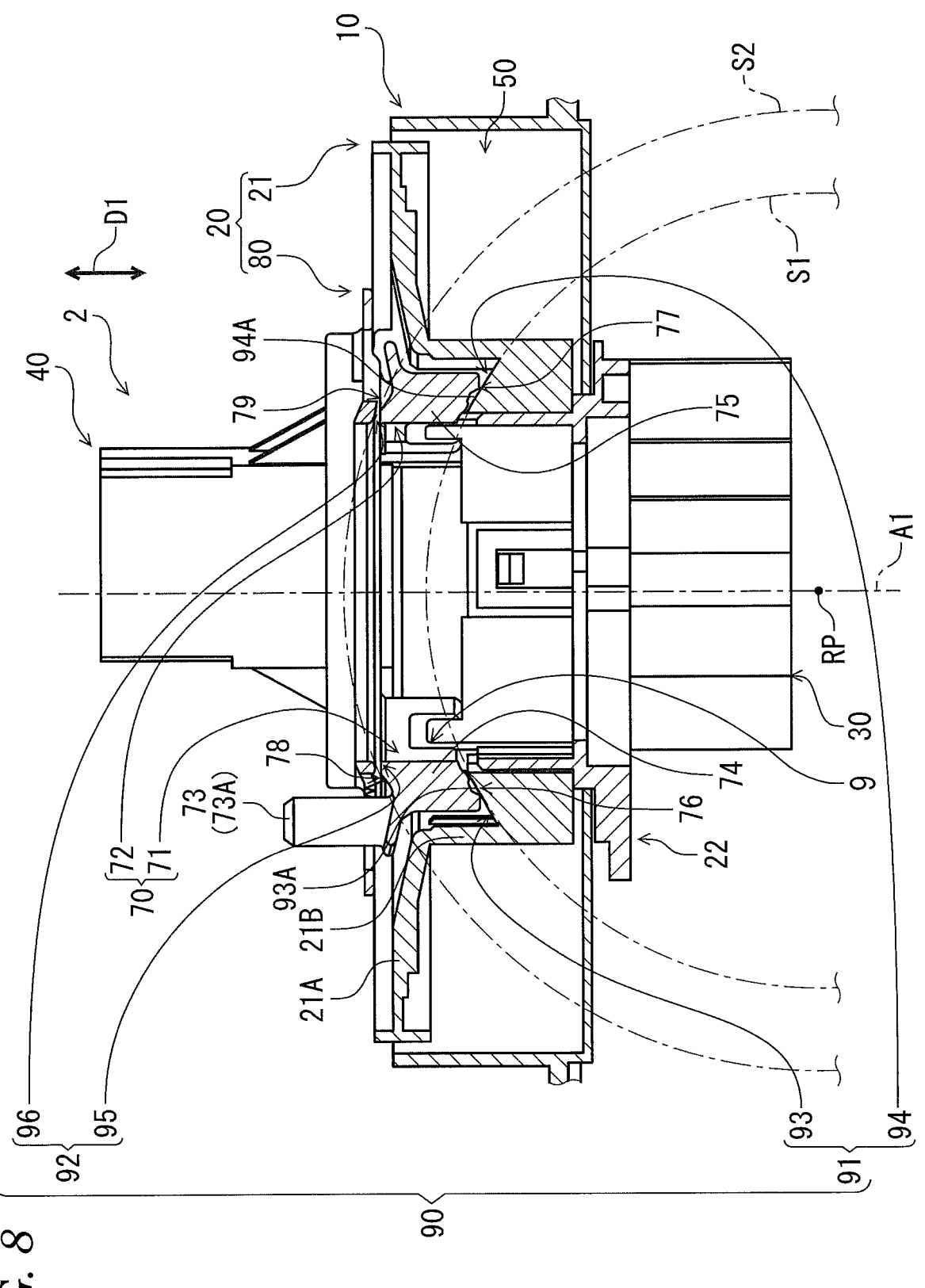
FIG. 8 is a cross-sectional view of the rotary connector apparatus taken along a line VIII-VIII in FIG. 3.

As illustrated in FIG. 8, at least one of the first supporting body 91 and the movable member 70 includes a first curved surface provided along the first virtual sphere S1. In the present embodiment, the first supporting body 91 includes first curved surfaces 93A and 94A provided along the first virtual sphere S1. The first supporting part 93 includes the first curved surface 93A. The second supporting part 94 includes the first curved surface 94A.

The movable member 70 can have surface contact, line contact, and/or point contact with the first curved surfaces 93A and 94A. The first contact part 76 can have surface contact, line contact, and/or point contact with the first curved surface 93A. The second contact part 77 can have surface contact, line contact, and/or point contact with the first curved surface 94A.

In the present embodiment, the movable member 70 can have surface contact and/or line contact with the first curved surfaces 93A and 94A. The first contact part 76 can have surface contact and/or line contact with the first curved surface 93A. The second contact part 77 can have surface contact and/or line contact with the first curved surface 94A. However, the manner of contact between the movable member 70 and the first supporting body 91 is not limited to the above-mentioned manner.

In addition, the first supporting body 91 and the movable member 70 (at least one of the first contact part 76 and the second contact part 77) may include the first curved surface. The movable member 70 (at least one of the first contact part 76 and the second contact part 77) may include the first curved surface, and the first supporting body 91 (at least one of the first supporting part 93 and the second supporting part 94) may have surface contact, line contact, and/or point contact with the first curved surface. Further, the first curved surface may be composed of a combination of flat surfaces at least in part.

Figure 9:
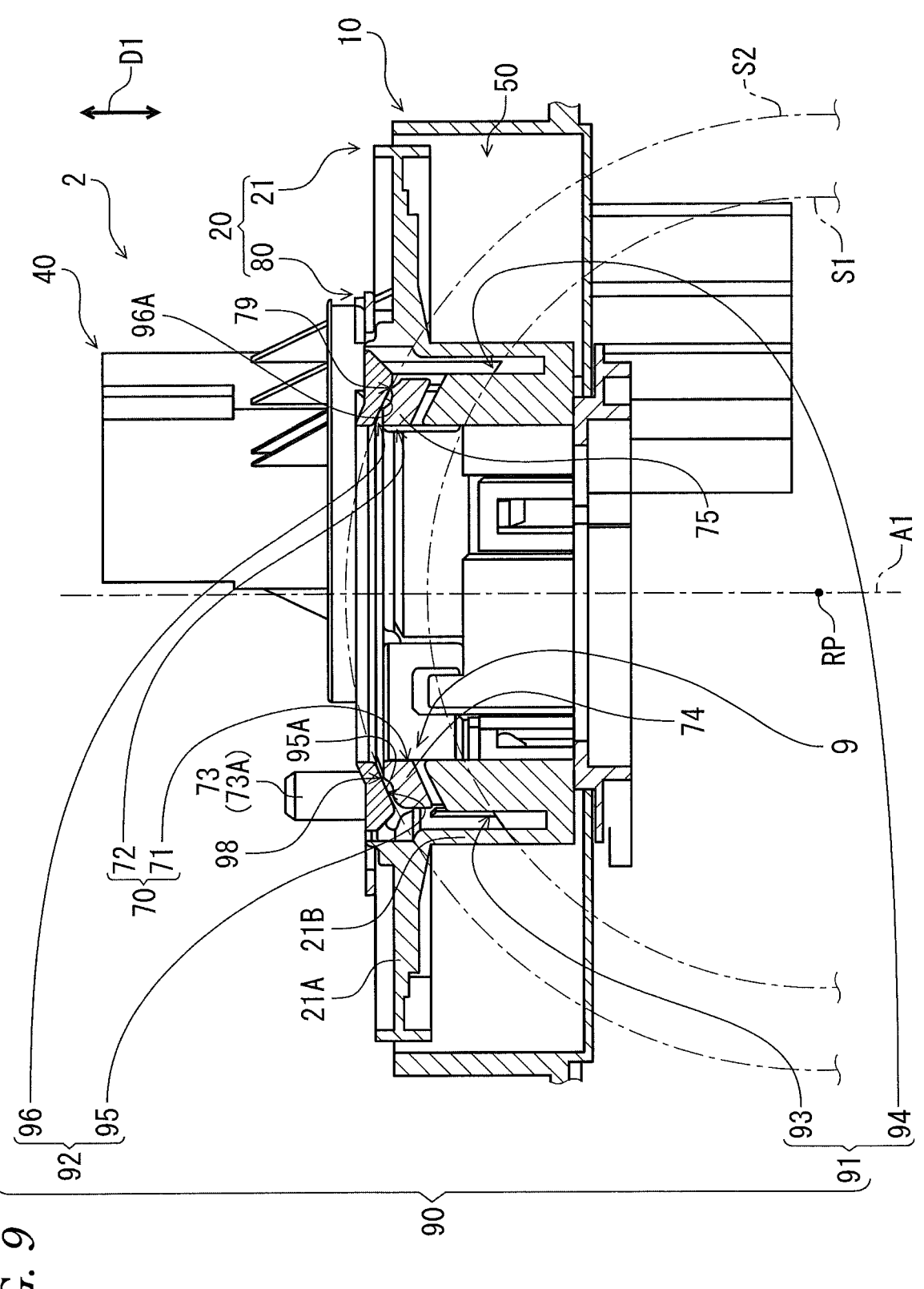
FIG. 9 is a cross-sectional view of the rotary connector apparatus taken along a line IX-IX in FIG. 3.

As illustrated in FIG. 9, at least one of the second supporting body 92 and the movable member 70 includes a second curved surface provided along the second virtual sphere S2. In the present embodiment, the second supporting body 92 includes second curved surfaces 95A and 96A provided along the second virtual sphere S2. The third supporting part 95 includes the second curved surface 95A. The fourth supporting part 96 includes the second curved surface 96A.

The movable member 70 can have surface contact, line contact, and/or point contact with the second curved surfaces 95A and 96A. The third contact part 78 can have surface contact, line contact, and/or point contact with the second curved surface 95A. The fourth contact part 79 can have surface contact, line contact, and/or point contact with the second curved surface 96A.

In the present embodiment, the movable member 70 can have surface contact and/or line contact with the second curved surfaces 95A and 96A. The third contact part 78 can have surface contact and/or line contact with the second curved surface 95A. The fourth contact part 79 can have surface contact and/or line contact with the second curved surface 96A. However, the manner of contact between the movable member 70 and the second supporting body 92 is not limited to the above-mentioned manner.

In addition, the second supporting body 92 and the movable member 70 (at least one of the third contact part 78 and the fourth contact part 79) may include the second curved surface. The movable member 70 (at least one of the third contact part 78 and the fourth contact part 79) may include the second curved surface, and the second supporting body 92 (at least one of the third supporting part 95 and the fourth supporting part 96) may have surface contact, line contact, and/or point contact with the second curved surface. Further, the second curved surface may be composed of a combination of flat surfaces at least in part.

Figure 10:
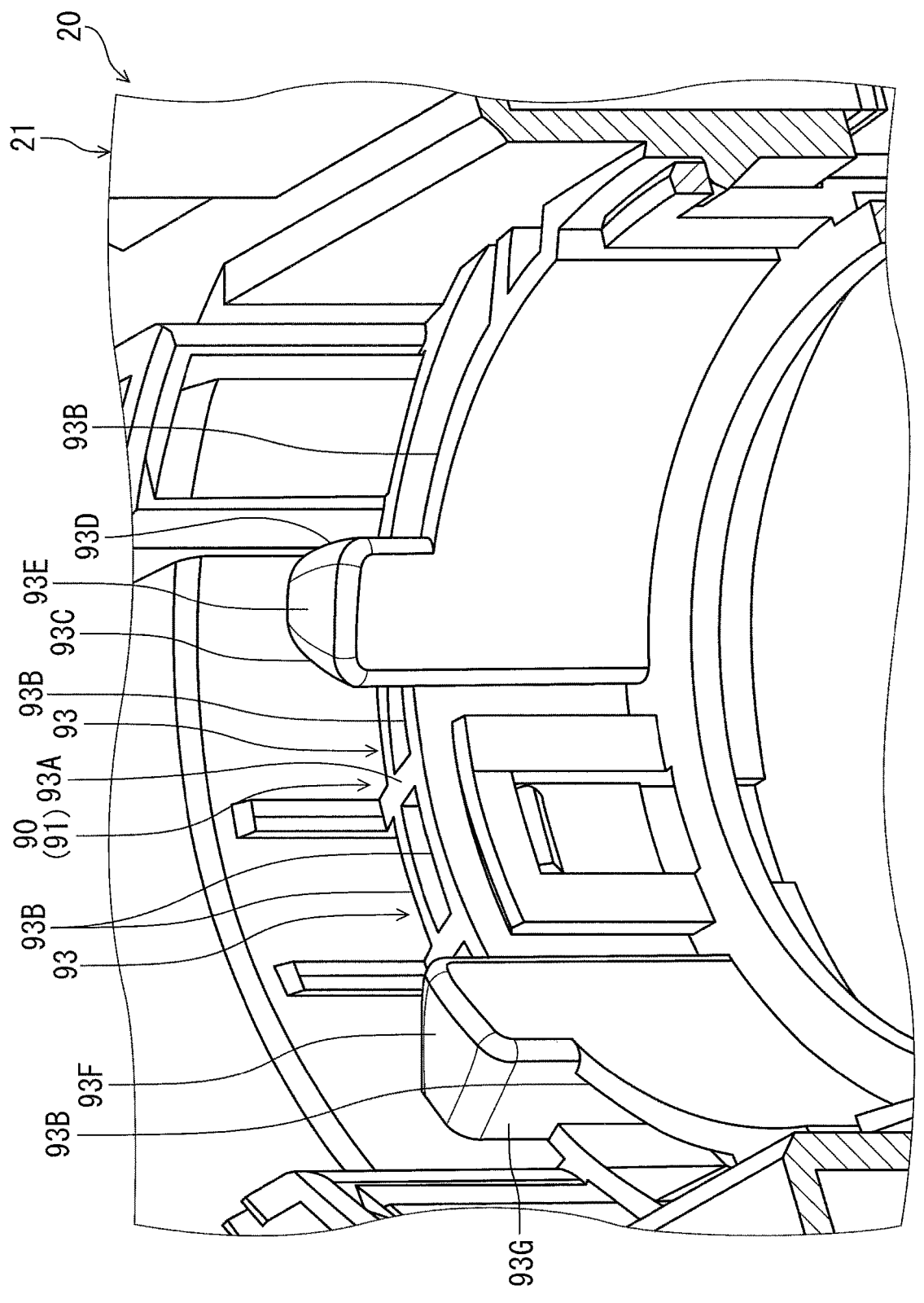
FIG. 10 is a perspective view of a rotator of the rotary connector apparatus illustrated in FIG. 1.

As illustrated in FIG. 10, the first curved surface 93A extends in the circumferential direction D3. The first supporting part 93 includes at least one first recess 93B. In the present embodiment, the first supporting part 93 includes a plurality of the first recesses 93B. The first recess 93B is provided in the first curved surface 93A. The first recess 93B may be omitted from the first supporting part 93.

Figure 11:
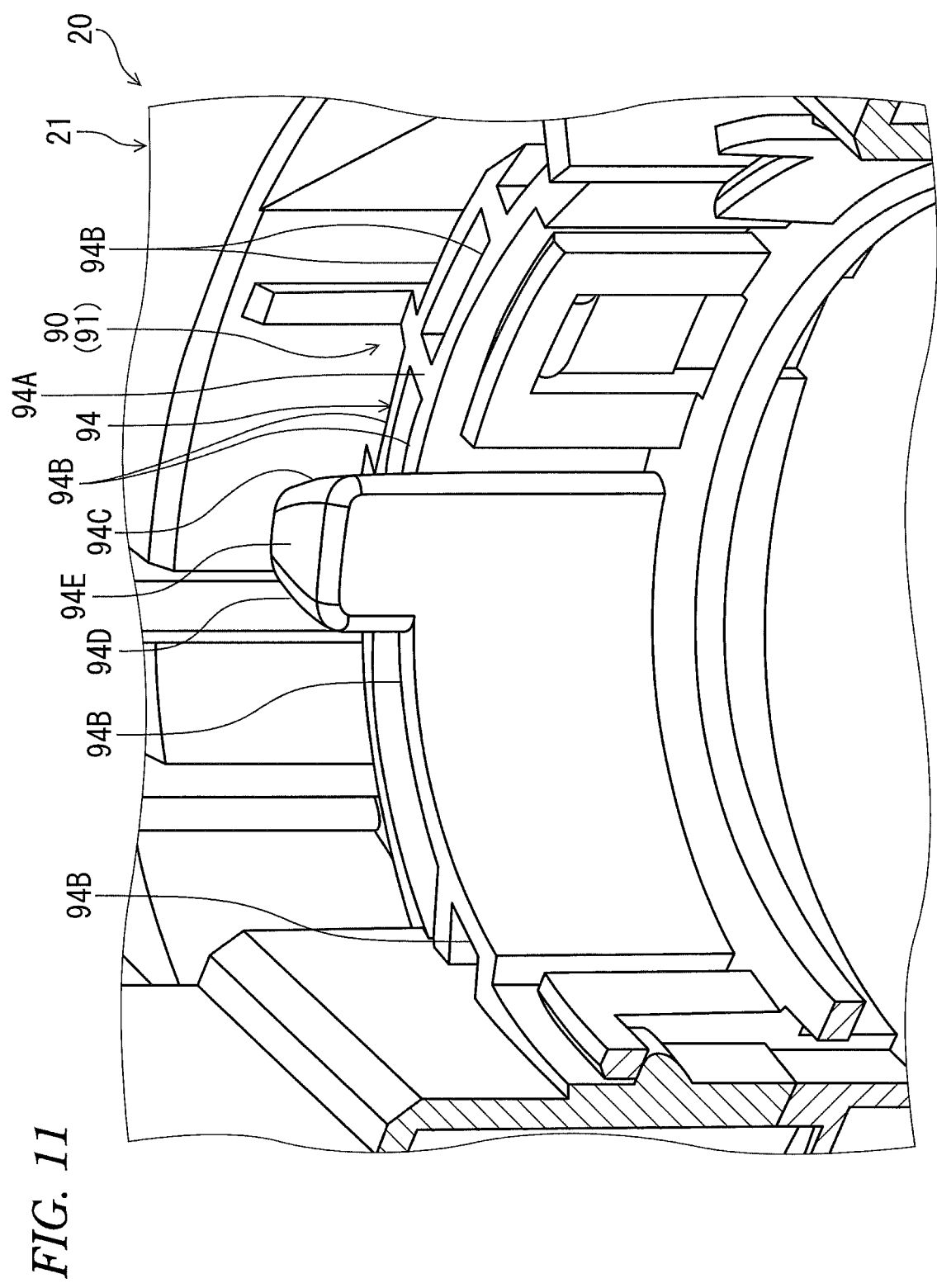
FIG. 11 is a perspective view of the rotator of the rotary connector apparatus illustrated in FIG. 1.

As illustrated in FIG. 11, the first curved surface 94A extends in the circumferential direction D3. The second supporting part 94 includes at least one second recess 94B. In the present embodiment, the second supporting part 94 includes a plurality of the second recesses 94B. The second recess 94B is provided in the first curved surface 94A. The second recess 94B may be omitted from the second supporting part 94.

Figure 12:
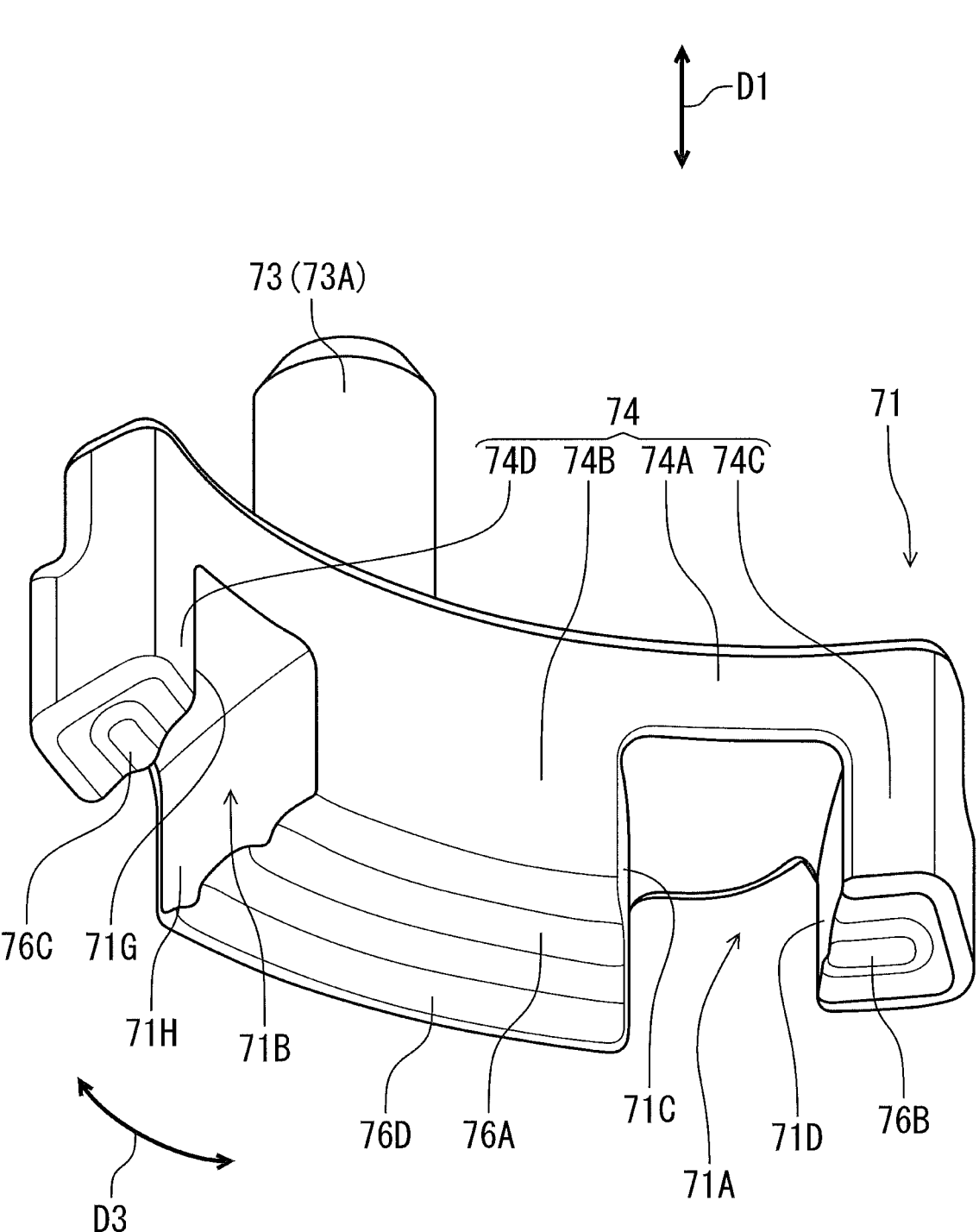
FIG. 12 is a perspective view of a movable member (first movable body) of the rotary connector apparatus illustrated in FIG. 1.

As illustrated in FIG. 12, the first contact part 76 includes a plurality of first contact protrusions 76A, 76B, 76C, and 76D. The first contact protrusions 76A, 76B, 76C, and 76D protrude in the axial direction D1 from the first movable part 74 and extend in the circumferential direction D3. The first contact protrusions 76A, 76B, and 76C are disposed at approximately the same radial position and are disposed spaced apart from each other in the circumferential direction D3. The first contact protrusion 76D is disposed radially outward of the first contact protrusion 76A and is disposed spaced apart from the first contact protrusion 76A in the radial direction. However, the first contact protrusions 76A, 76B, 76C, and 76D may be formed as a single contact protrusion at least in part. In addition, the first contact part 76 may include a curved surface such as that of the first curved surface 93A.

The first movable part 74 includes a first base 74A, and a plurality of first protruding parts 74B, 74C, and 74D. The first protruding parts 74B, 74C, and 74D protrude in the axial direction D1 from the first base 74A. The first contact protrusion 76A is provided at a first protruding part 74B and protrudes in the axial direction D1 from the first protruding part 74B. The first contact protrusion 76B is provided at the first protruding part 74C and protrudes in the axial direction D1 from the first protruding part 74C. The first contact protrusion 76C is provided at the first protruding part 74D and protrudes in the axial direction D1 from the first protruding part 74D.

The first movable body 71 includes a plurality of first grooves 71A and 71B. The first groove 71A is provided between the first protruding part 74B and 74C in the circumferential direction D3. The first groove 71B is provided between the first protruding part 74B and 74D in the circumferential direction D3.

Figure 13:
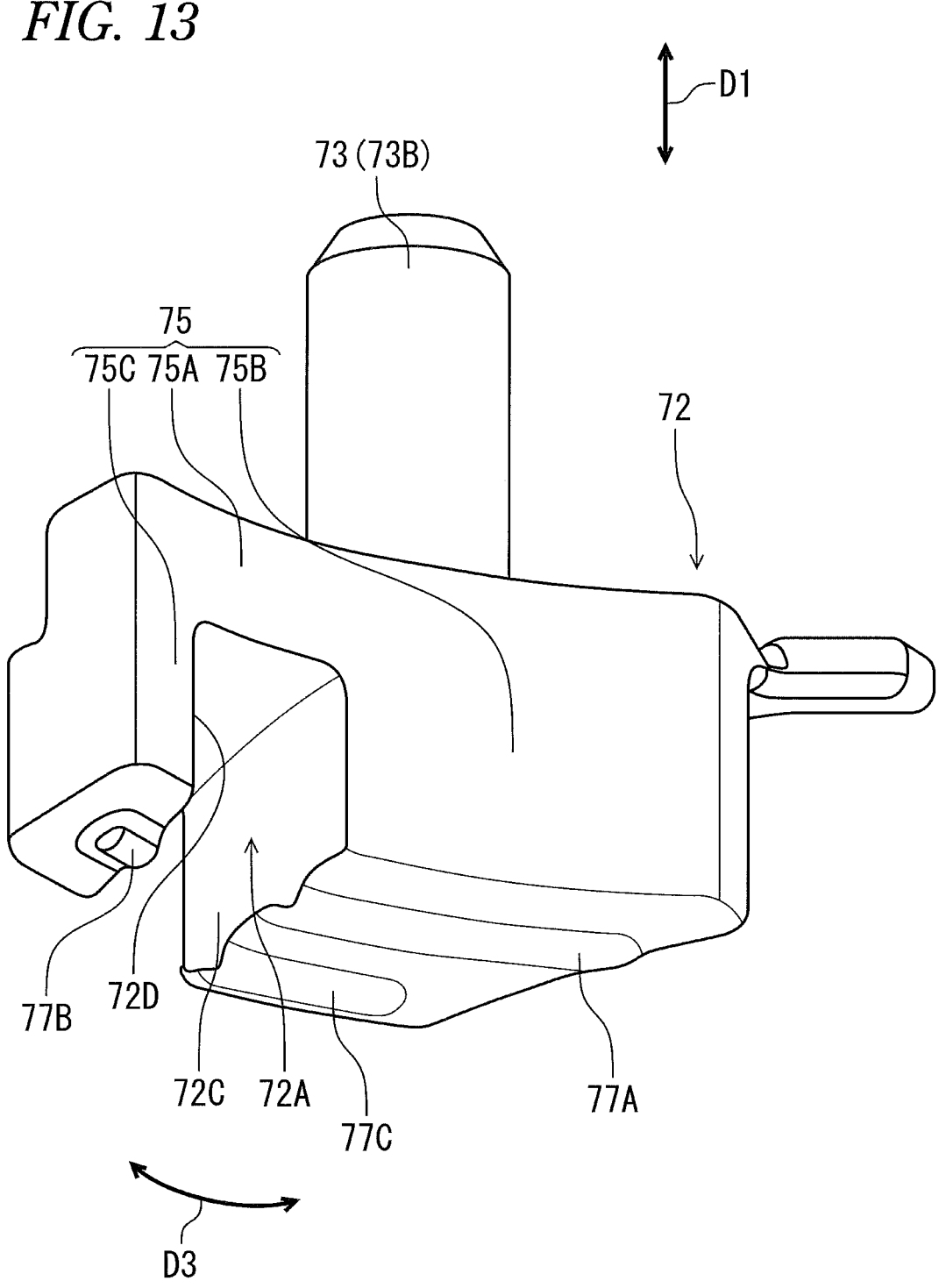
FIG. 13 is a perspective view of a movable member (second movable body) of the rotary connector apparatus illustrated in FIG. 1.

As illustrated in FIG. 13, the second contact part 77 includes a plurality of second contact protrusions 77A, 77B, and 77C. The second contact protrusions 77A, 77B, and 77C protrude in the axial direction D1 from the second movable part 75 and extend in the circumferential direction D3. The second contact protrusions 77A and 77B are disposed at approximately the same radial position and are disposed spaced apart from each other in the circumferential direction D3. The second contact protrusion 77C is disposed radially outward of the second contact protrusion 77A and is disposed spaced apart from the second contact protrusion 77A in the radial direction. However, the second contact protrusions 77A, 77B, and 77C may be formed as a single contact protrusion at least in part. In addition, the second contact part 77 may include a curved surface such as that of the first curved surface 94A.

The second movable part 75 includes a second base 75A, and a plurality of second protruding parts 75B and 75C. The second protruding parts 75B and 75C protrude in the axial direction D1 from the second base 75A. The second contact protrusion 77A is provided at the second protruding part 75B and protrudes in the axial direction D1 from the second protruding part 75B. The second contact protrusion 77B is provided at the second protruding part 75C and protrudes in the axial direction D1 from the second protruding part 75C. The second movable body 72 includes a second groove 72A. The second groove 72A is provided between the second protruding parts 75B and 75C in the circumferential direction D3.

Figure 14:
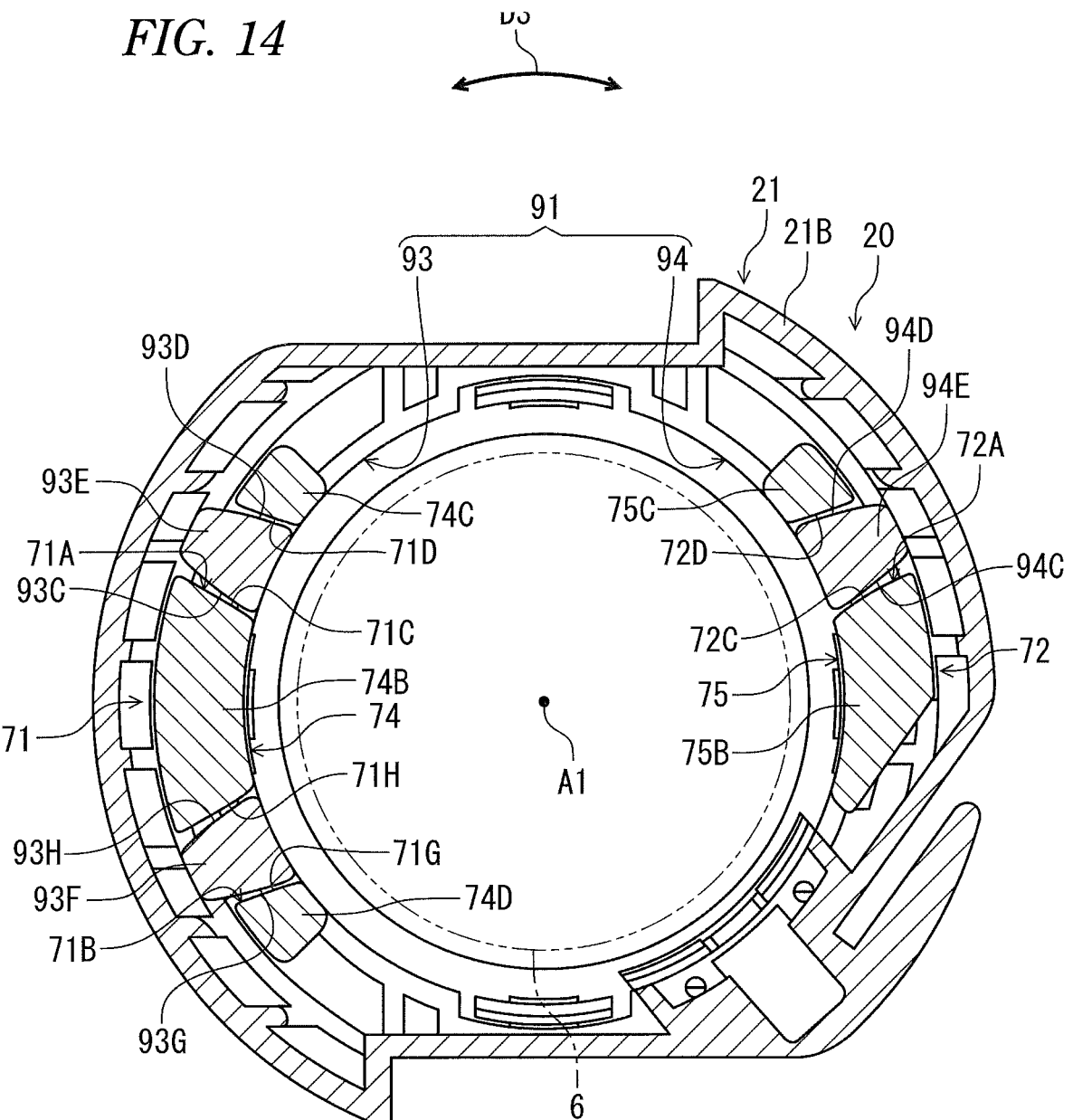
FIG. 14 is an enlarged partial cross-sectional view of the rotary connector apparatus illustrated in FIG. 1.

As illustrated in FIG. 14, the first supporting part 93 includes first rotation receiving surfaces 93C and 93G and second rotation receiving surfaces 93D and 93H. The first rotation receiving surfaces 93C and 93G are contactable with the movable member 70 in the circumferential direction D3. The second rotation receiving surfaces 93D and 93H are contactable with the movable member 70 in the circumferential direction D3. The first rotation receiving surfaces 93C and 93G include a curved surface. The second rotation receiving surfaces 93D and 93H include a curved surface.

In the present embodiment, the first supporting part 93 includes first rotation supporting parts 93E and 93F. The first rotation supporting part 93E includes a first rotation receiving surface 93C and a second rotation receiving surface 93D. The first rotation supporting part 93F includes a first rotation receiving surface 93G and a second rotation receiving surface 93H. However, one of the first rotation receiving surfaces 93C and 93G may be omitted, and another rotation receiving surface may be provided in addition to the first rotation receiving surfaces 93C and 93G. One of the second rotation receiving surfaces 93D and 93H may be omitted, and another rotation receiving surface may be provided in addition to the second rotation receiving surfaces 93D and 93H.

The first movable body 71 includes first circumferential direction surfaces 71C and 71G and second circumferential direction surfaces 71D and 71H. The first circumferential direction surface 71C is contactable with the first rotation receiving surface 93C. The second circumferential direction surface 71D is contactable with the second rotation receiving surface 93D. The first circumferential direction surface 71G is contactable with the first rotation receiving surface 93G. The second circumferential direction surface 71D is contactable with the second rotation receiving surface 93D. The second circumferential direction surface 71H is contactable with the second rotation receiving surface 93H. The first circumferential direction surfaces 71C and 71G include a curved surface. The second circumferential direction surfaces 71D and 71H include a curved surface.

The first protruding part 74B includes the first circumferential direction surface 71C and the second circumferential direction surface 71H. The first protruding part 74C includes the second circumferential direction surface 71D. The first protruding part 74D includes the first circumferential direction surface 71G. The first rotation supporting part 93E is provided between the first circumferential direction surface 71C and the second circumferential direction surface 71D in the circumferential direction D3. The first rotation supporting part 93F is provided between the first circumferential direction surface 71G and the second circumferential direction surface 71H in the circumferential direction D3. The first groove 71A is provided between the first circumferential direction surface 71C and the second circumferential direction surface 71D in the circumferential direction D3. The first groove 71B is provided between the first circumferential direction surface 71G and the second circumferential direction surface 71H in the circumferential direction D3.

As illustrated in FIG. 14, the second supporting part 94 includes a first rotation receiving surface 94C and a second rotation receiving surface 94D. The first rotation receiving surface 94C is contactable with the movable member 70 in the circumferential direction D3. The second rotation receiving surface 94D is contactable with the movable member 70 in the circumferential direction D3. The first rotation receiving surface 94C includes a curved surface. The second rotation receiving surface 94D includes a curved surface.

In the present embodiment, the second supporting part 94 includes a first rotation supporting part 94E. The first rotation supporting part 94E includes the first rotation receiving surface 94C and the second rotation receiving surface 94D. However, another rotation receiving surface may be provided in addition to the first rotation receiving surface 94C. Another rotation receiving surface may be provided in addition to the second rotation receiving surface 94D.

The second movable body 72 includes a first circumferential direction surface 72C and a second circumferential direction surface 72D. The first circumferential direction surface 72C is contactable with the first rotation receiving surface 94C. The second circumferential direction surface 72D is contactable with the second rotation receiving surface 94D. The first circumferential direction surface 72G is contactable with first rotation receiving surface 94G. The second circumferential direction surface 72D is contactable with the second rotation receiving surface 94D. The first circumferential direction surface 72C includes a curved surface. The second circumferential direction surface 72D includes a curved surface.

The second protruding part 75B includes the first circumferential direction surface 72C and a second circumferential direction surface 72H. The second protruding part 75C includes the second circumferential direction surface 72D. The second protruding part 75D includes the first circumferential direction surface 72G. The first rotation supporting part 94E is provided between the first circumferential direction surface 72C and the second circumferential direction surface 72D in the circumferential direction D3. The first rotation supporting part 94F is provided between the first circumferential direction surface 72G and the second circumferential direction surface 72H in the circumferential direction D3. The second groove 72A is provided between the first circumferential direction surface 72C and the second circumferential direction surface 72D in the circumferential direction D3.

Figure 15:
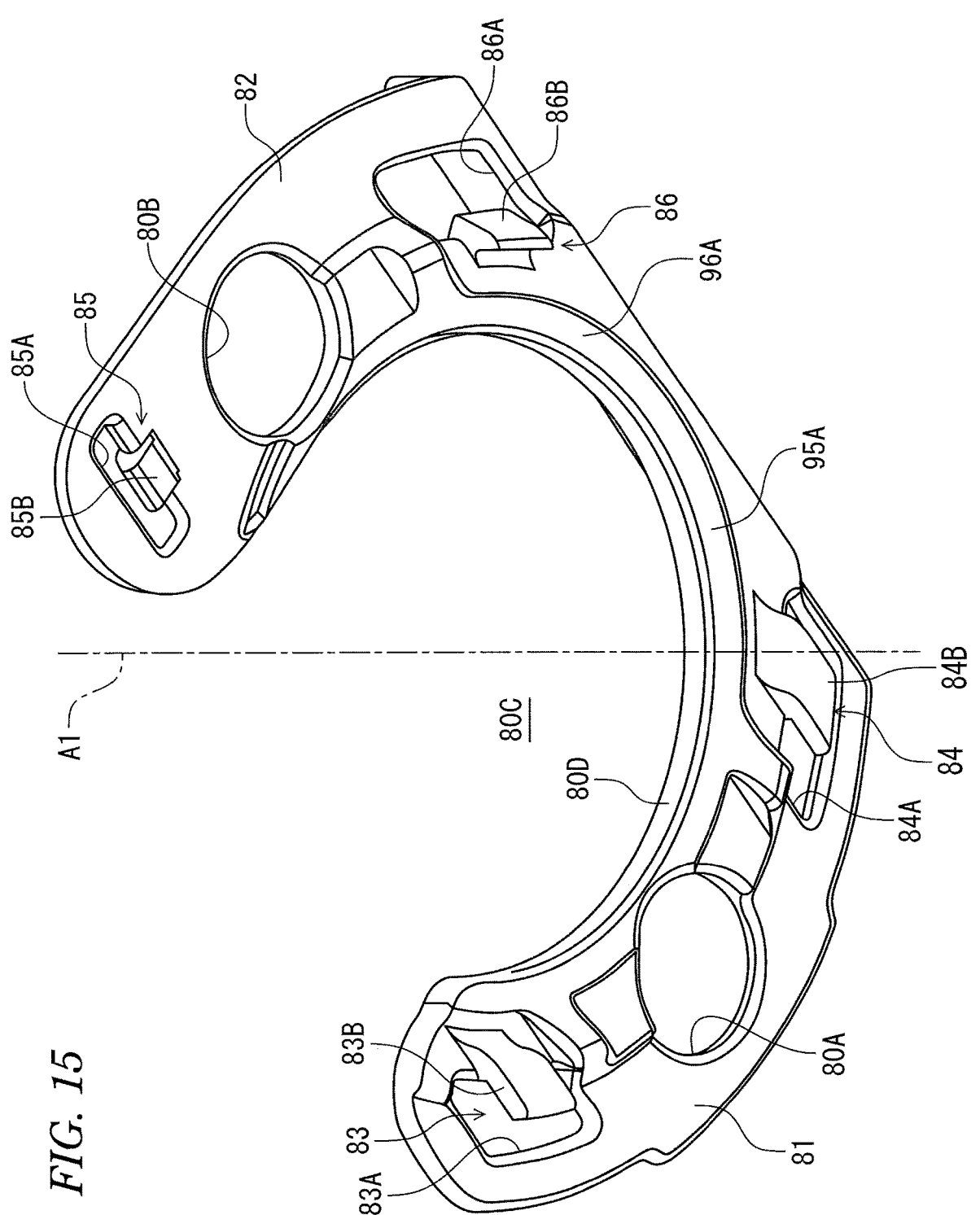
FIG. 15 is a perspective view of a holding member of the rotator of the rotary connector apparatus illustrated in FIG. 1.

As illustrated in FIG. 15, the second curved surface 95A extends in the circumferential direction D3. The second curved surface 96A extends in the circumferential direction D3. The second curved surface 95A is coupled to the second curved surface 96A. The holding member 80 includes a first holding part 81 and a second holding part 82. The second curved surface 95A is provided at the first holding part 81. The second curved surface 96A is provided at the second holding part 82. The first holding part 81 is coupled to the second holding part 82. The holding member 80 includes the center opening 80C and an inner peripheral edge 80D. The inner peripheral edge 80D defines the center opening 80C. The second curved surfaces 95A and 96A extend along the inner peripheral edge 80D.

Figure 16:
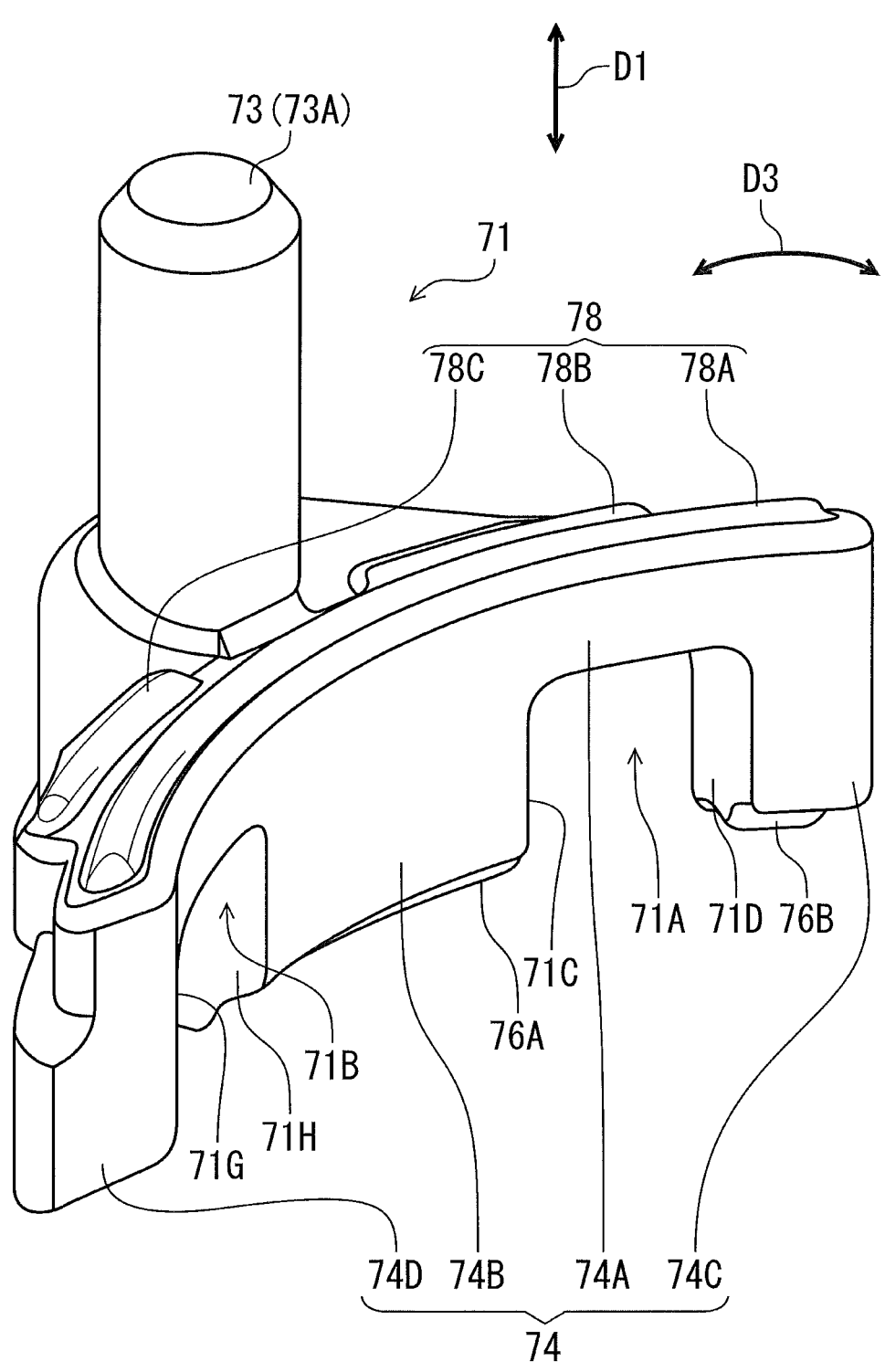
FIG. 16 is a perspective view of the movable member (first movable body) of the rotary connector apparatus illustrated in FIG. 1.

As illustrated in FIG. 16, the third contact part 78 includes a plurality of third contact protrusions 78A, 78B, and 78C. The third contact protrusions 78A, 78B, and 78C protrude in the axial direction D1 from the first movable part 74 and extend in the circumferential direction D3. The third contact protrusions 78A, 78B, and 78C protrude in the axial direction D1 from the first base 74A. The third contact protrusions 78B and 78C are disposed at approximately the same radial position and are disposed spaced apart from each other in the circumferential direction D3. The third contact protrusions 78B and 78C are disposed radially outward of the third contact protrusion 78A and are disposed spaced apart from the third contact protrusion 78A in the radial direction. However, the third contact protrusions 78A, 78B, and 78C may be formed as a single contact protrusion at least in part. In addition, the third contact part 78 may include a curved surface such as that of the second curved surface 95A.

Figure 17:
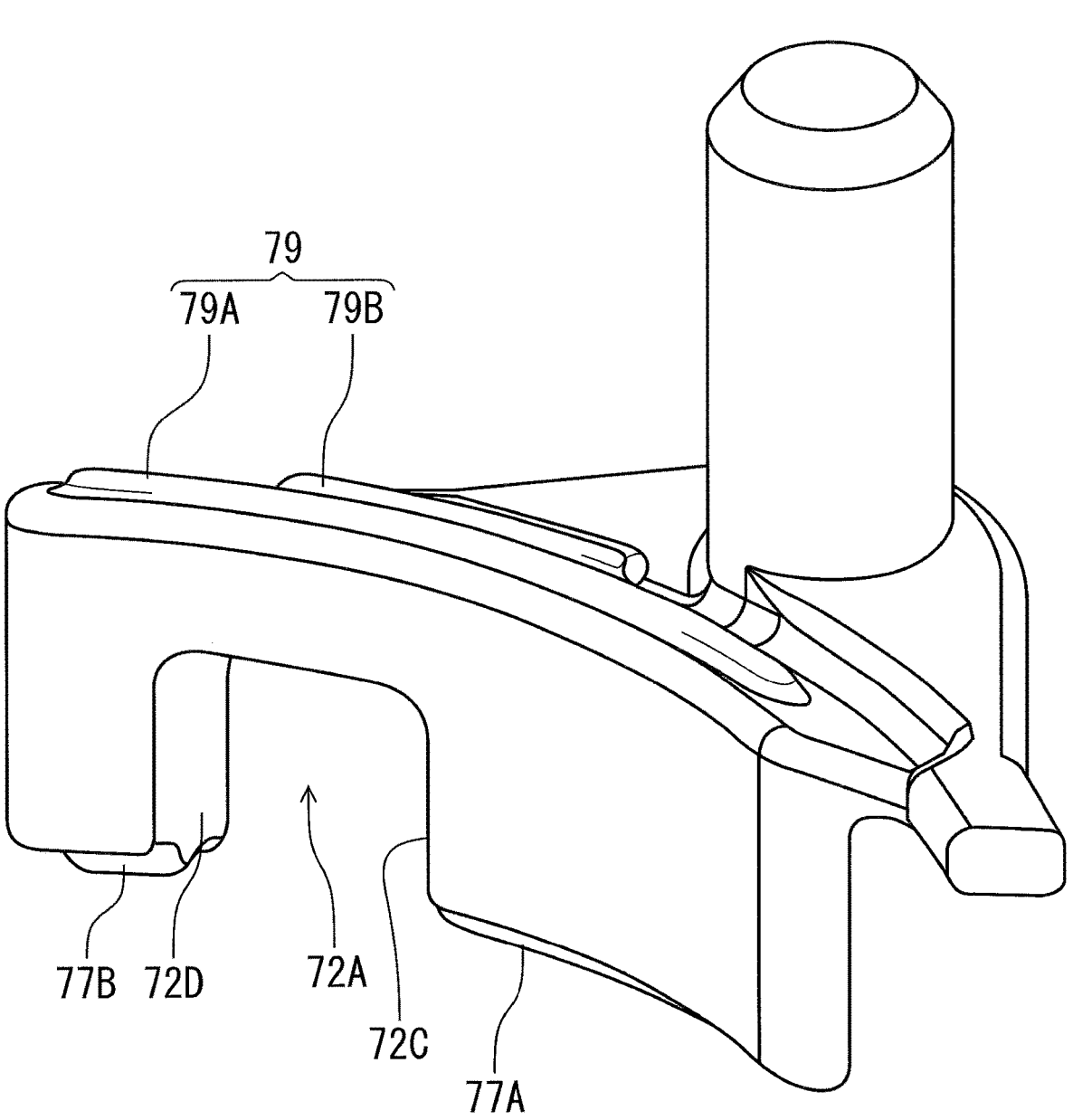
FIG. 17 is a perspective view of the movable member (second movable body) of the rotary connector apparatus illustrated in FIG. 1.

As illustrated in FIG. 17, the fourth contact part 79 includes a plurality of fourth contact protrusions 79A and 79B. The fourth contact protrusions 79A and 79B protrude in the axial direction D1 from the second movable part 75 and extend in the circumferential direction D3. The fourth contact protrusions 79A and 79B protrude in the axial direction D1 from the second base 75A. The fourth contact protrusion 79B is disposed radially outward of the fourth contact protrusion 79A and is disposed spaced apart from the fourth contact protrusion 79A in the radial direction. However, the fourth contact protrusions 79A and 79B may be formed as a single contact protrusion at least in part. In addition, the fourth contact part 79 may include a curved surface such as that of the second curved surface 96A.

Figure 18:
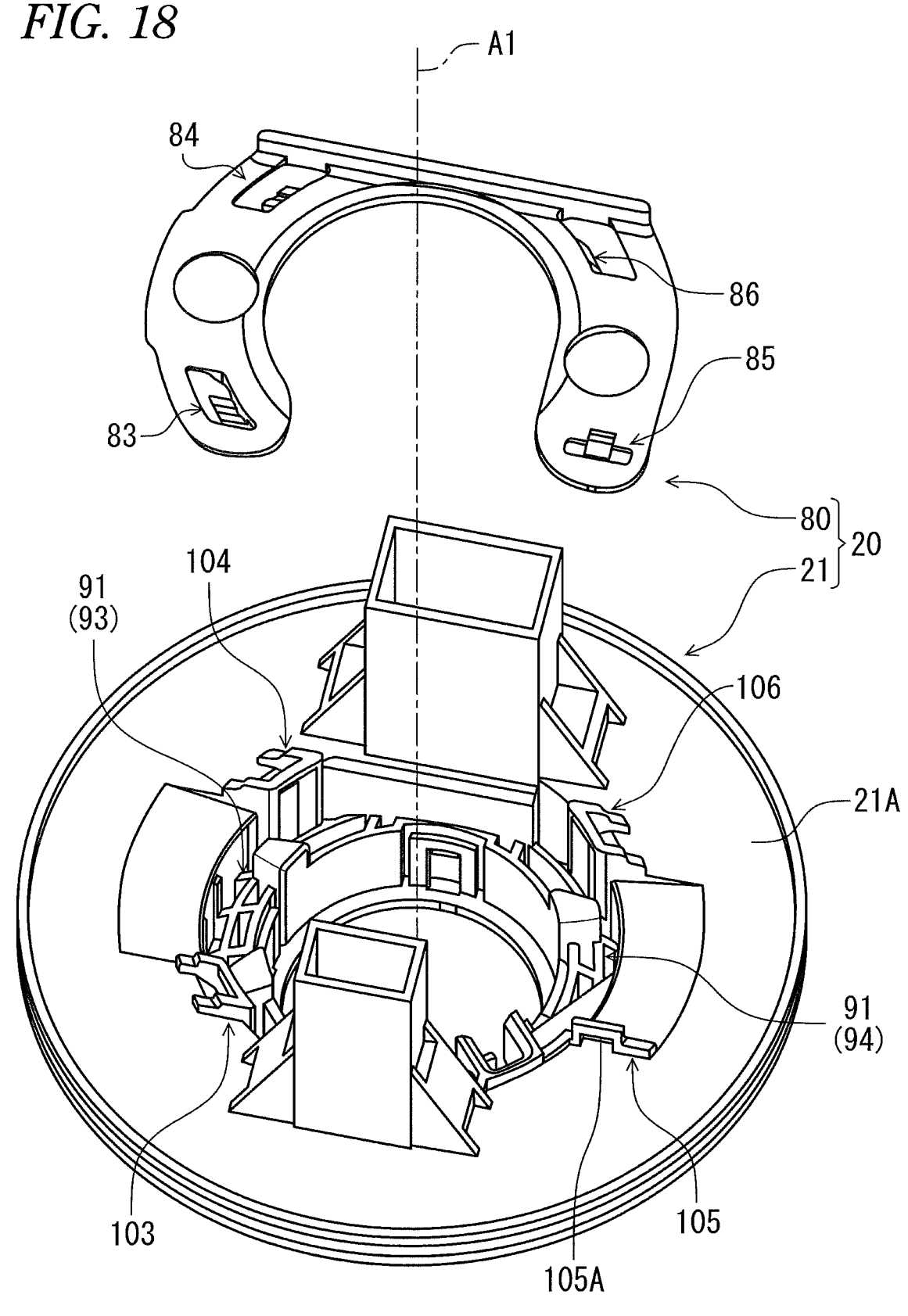
FIG. 18 is an exploded perspective view of the rotator of the rotary connector apparatus illustrated in FIG. 1.

As illustrated in FIG. 18, the rotator body 21 includes a plurality of attaching parts 103, 104, 105, and 106. The holding member 80 includes a plurality of engaging portions 83, 84, 85, and 86. The engaging portions 83, 84, 85, and 86 are configured to engage with the rotator body 21. The engaging portion 83 is configured to engage with the attaching part 103. The engaging portion 84 is configured to engage with the attaching part 104. The engaging portion 85 is configured to engage with the attaching part 105. The engaging portion 86 is configured to engage with the attaching part 106. The holding member 80 may be attached to the rotator body 21 with a structure other than the above-mentioned structure. For example, the holding member 80 may be fastened to the rotator body 21 with a fixing member such as a screw.

As illustrated in FIG. 15, the engaging portion 83 includes an opening 83A and an engaging claw 83B. The engaging claw 83B protrudes from the inner peripheral edge of the opening 83A. The engaging portion 84 includes an opening 84A and an engaging claw 84B. The engaging claw 84B protrudes from the inner peripheral edge of the opening 84A. The engaging portion 85 includes an opening 85A and an engaging claw 85B. The engaging claw 85B protrudes from the inner peripheral edge of the opening 85A. The engaging portion 86 includes an opening 86A and an engaging claw 86B. The engaging claw 86B protrudes from the inner peripheral edge of the opening 86A.

Figure 19:
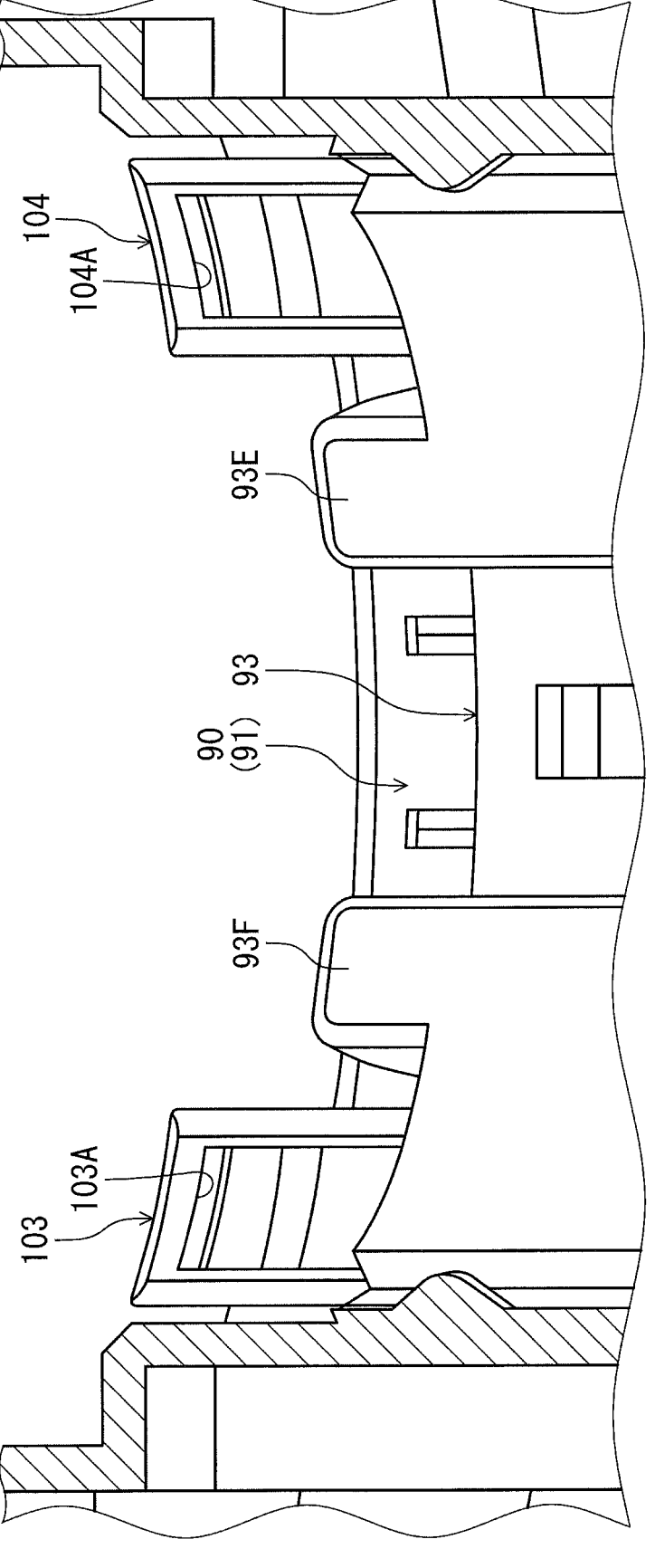
FIG. 19 is a perspective view of the rotator of the rotary connector apparatus illustrated in FIG. 1.

As illustrated in FIG. 19, the attaching part 103 includes an attaching opening 103A. In the state where the engaging portion 83 (see, for example, FIG. 15) is engaged with the attaching part 103, the engaging claw 83B (see, for example, FIG. 15) is fitted into the attaching opening 103A. The attaching part 104 includes an attaching opening 104A. In the state where the engaging portion 84 (see, for example, FIG. 15) is engaged with the attaching part 104, the engaging claw 84B (see, for example, FIG. 15) is fitted into the attaching opening 104A.

Figure 20:
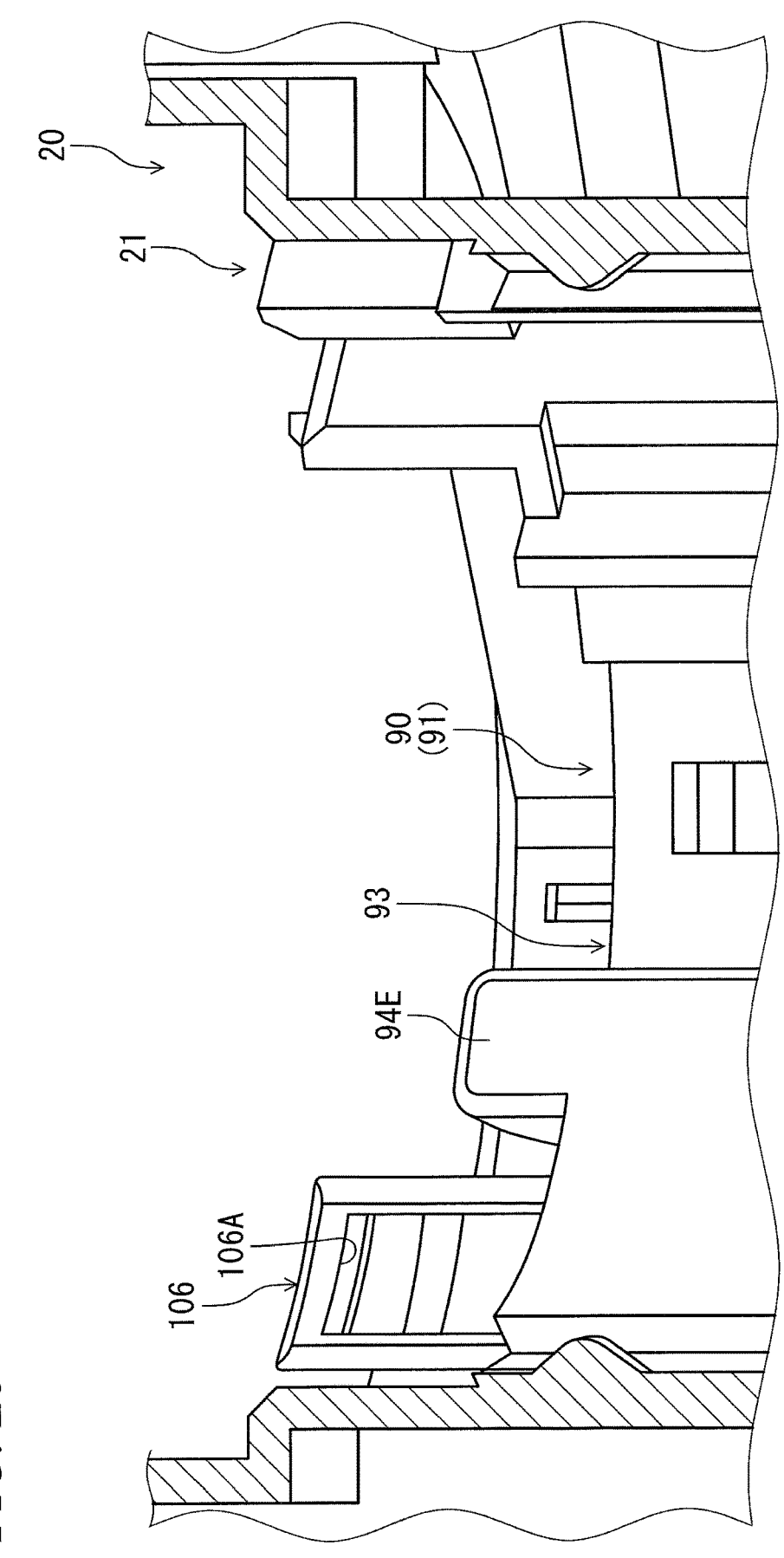
FIG. 20 is a perspective view of the rotator of the rotary connector apparatus illustrated in FIG. 1.

As illustrated in FIG. 18, the attaching part 105 includes an attaching opening 105A. In the state where the engaging portion 85 (see, for example, FIG. 15) is engaged with the attaching part 105, the engaging claw 85B (see, for example, FIG. 15) is fitted into the attaching opening 105A. As illustrated in FIG. 20, the attaching part 106 includes an attaching opening 106A. In the state where the engaging portion 86 (see, for example, FIG. 15) is engaged with the attaching part 106, the engaging claw 86B (see, for example, FIG. 15) is fitted into the attaching opening 106A.

As illustrated in FIG. 8, the rotary connector apparatus 2 includes the stator 10, the rotator 20, and the movable member 70. The stator 10 is configured to be fastened to the vehicle body 3. The rotator 20 is provided rotatably about the rotation axis A1 with respect to the stator 10. The movable member 70 is attached to the rotator 20 and is configured to transmit the rotation of the steering 4 to the rotator 20. The stator 10 and the rotator 20 define the cable housing space 50 provided to surround the rotation axis A1.

The movable member 70 includes the rotation input part 73 configured to receive the rotational force from the steering 4. The rotator 20 includes the support structure 90 movably supporting the movable member 70 to change the angle of the rotation input part 73 with respect to the rotator 20.

Figure 21:
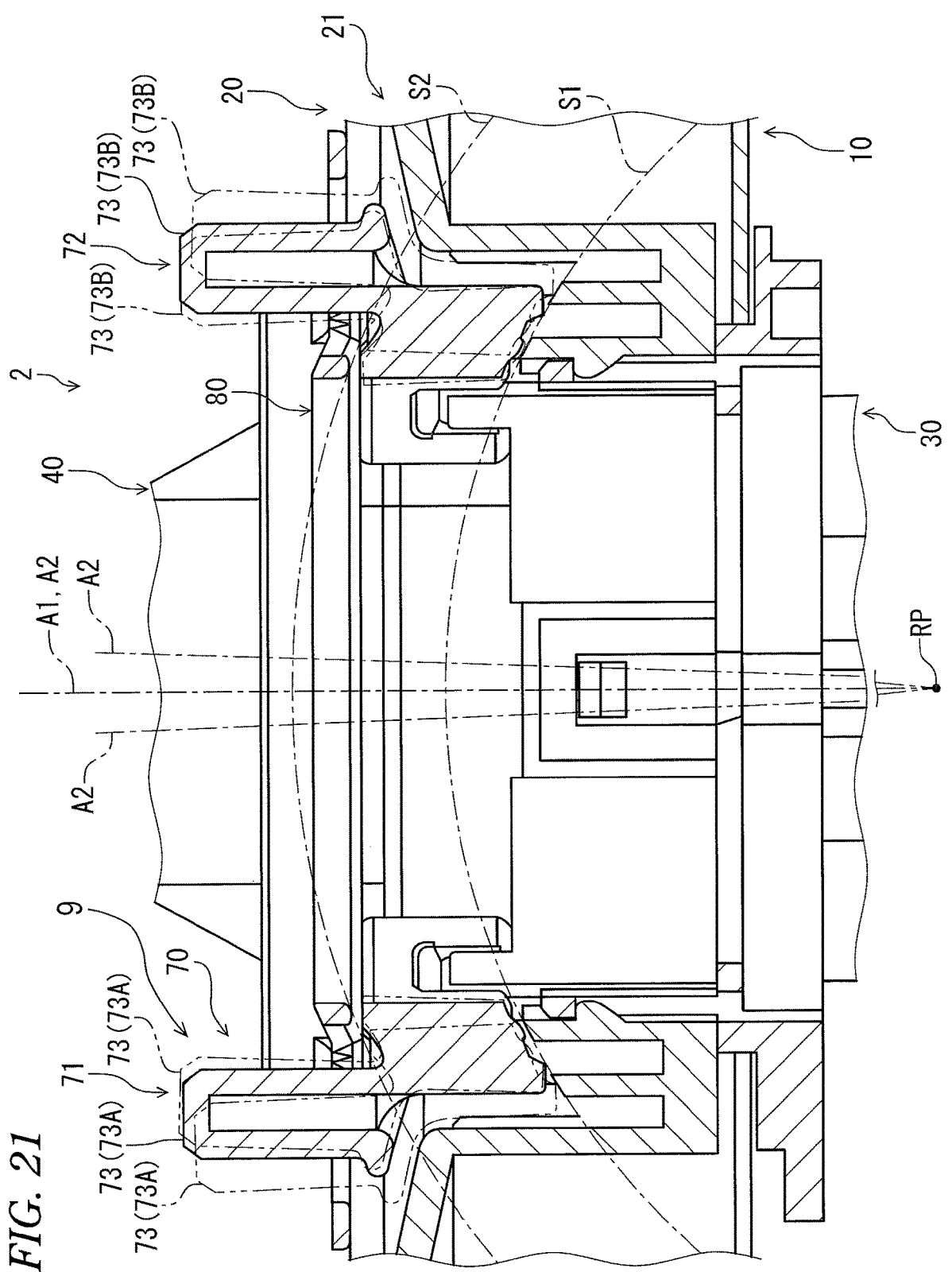
FIG. 21 is a partial cross-sectional view of the rotary connector apparatus illustrated in FIG. 1.
Figure 22:
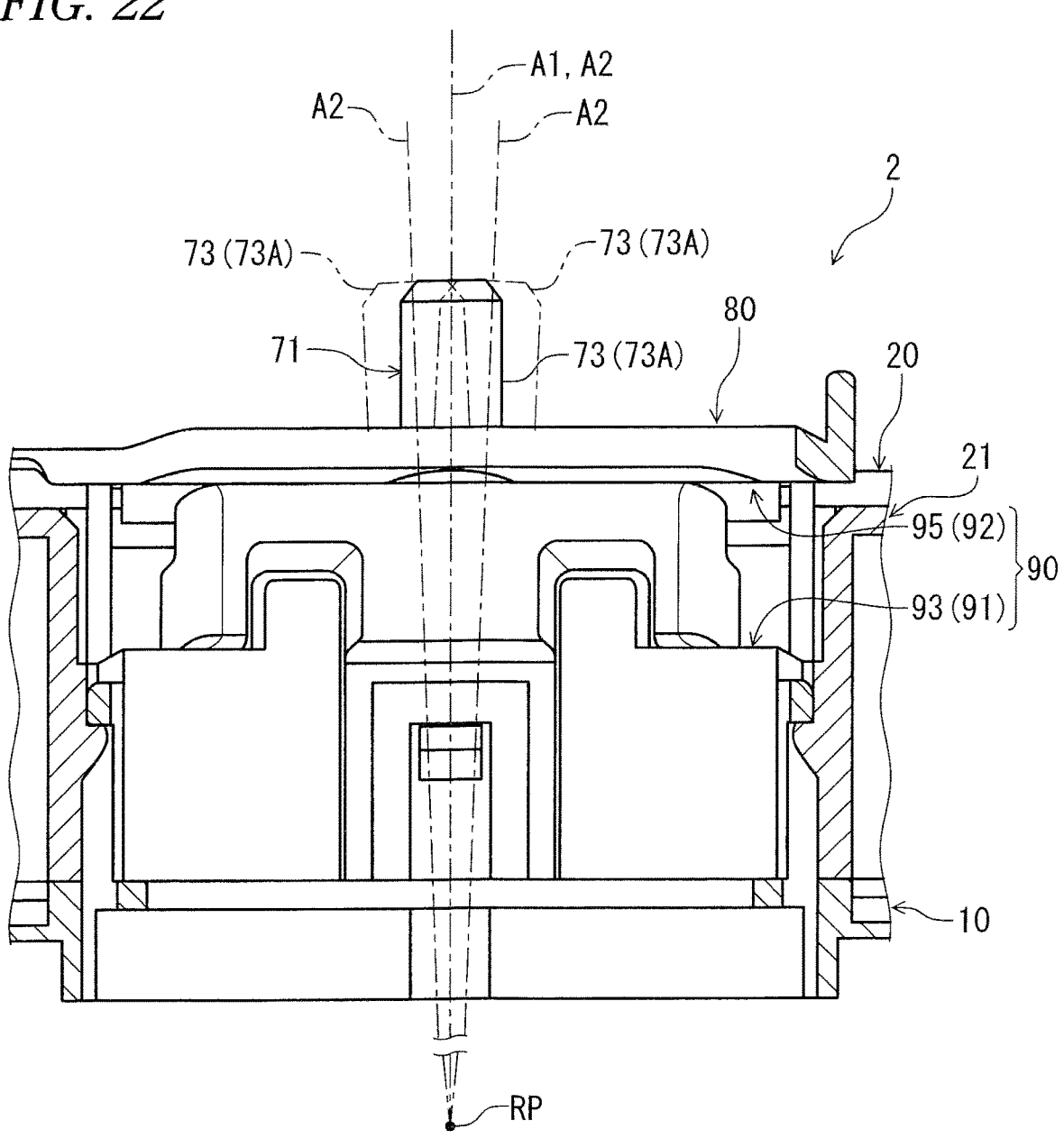
FIG. 22 is a partial cross-sectional view of the rotary connector apparatus illustrated in FIG. 1.
Figure 23:
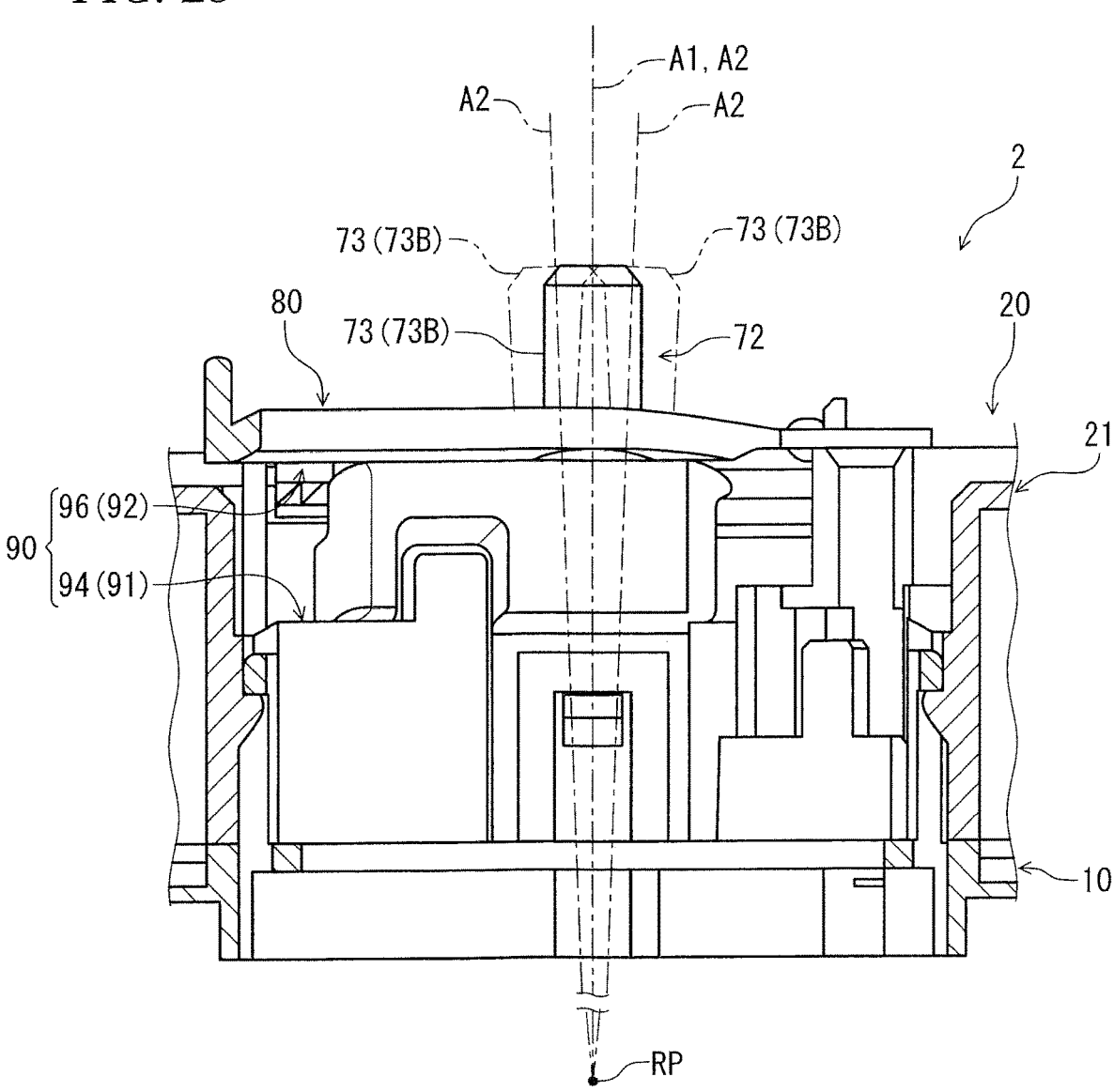
FIG. 23 is a partial cross-sectional view of the rotary connector apparatus illustrated in FIG. 1.

As illustrated in FIGS. 21 to 23, in the rotary connector apparatus 2, the support structure 90 movably supports the movable member 70 to change the angle of the rotation input part 73 with respect to the rotator 20, and thus even when the rotation axis A2 of the steering 4 is tilted with respect to the rotation axis A1 of the rotary connector apparatus 2, the rotation input part 73 of the movable member 70 can follow the inclination of the rotation axis A2 of the steering 4 in a predetermined range (for example, 2 degrees). Thus, the influence of the declination of the steering 4 can be reduced.

As described above, the rotary connector apparatus 2 includes the stator 10, the rotator 20, and the adjustment structure 9. The stator 10 is configured to be attached to the vehicle body 3. The rotator 20 is provided rotatably about the rotation axis A1 with respect to the stator 10. The adjustment structure 9 is configured to allow the rotation axis A1 to move with respect to the vehicle body 3 in the state where the stator 10 is attached to the vehicle body 3. The stator 10 and the rotator 20 define the cable housing space 50 provided to surround the rotation axis A1.

With the rotary connector apparatus 2, the rotation axis A1 can move with respect to the vehicle body 3 with the adjustment structure 9, and thus the influence of at least one of the declination and eccentricity of the steering 4 can be reduced with a simple structure.

Second Embodiment

Figure 24:
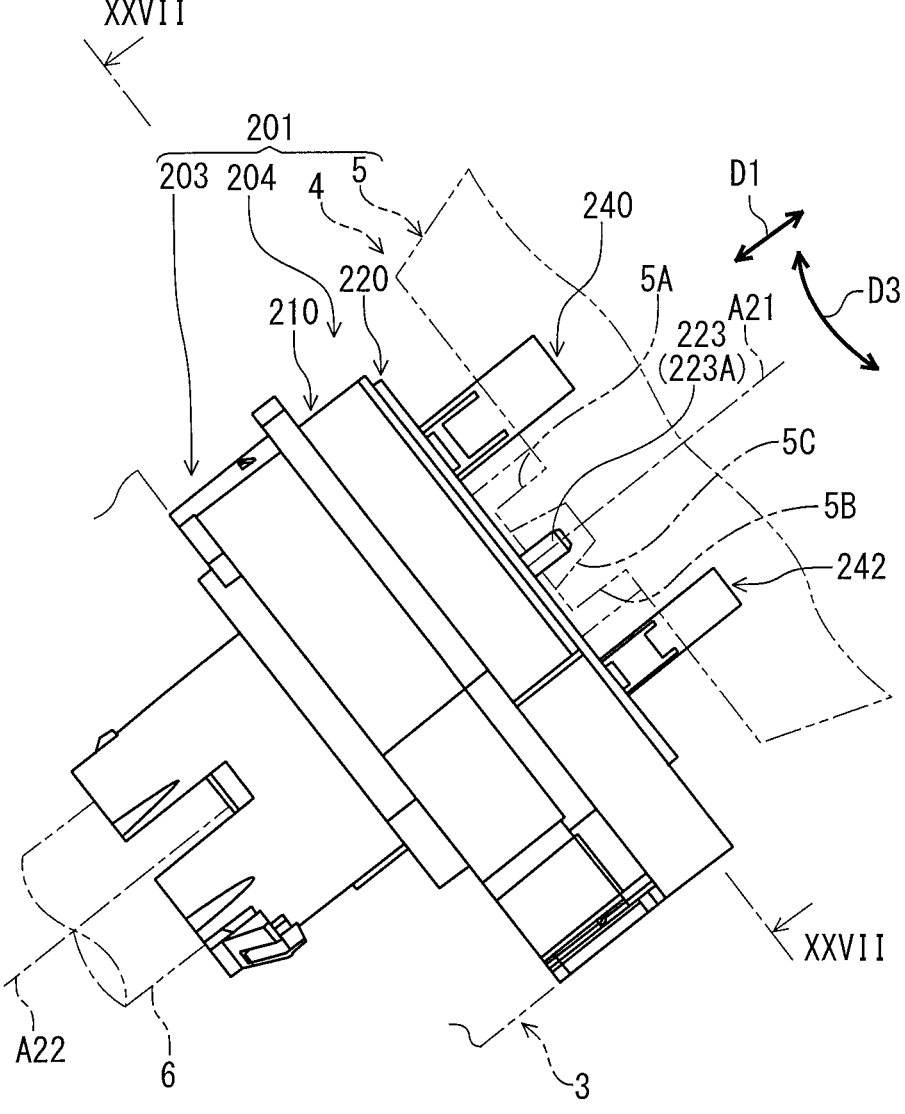
FIG. 24 is a side view of a steering apparatus according to a second embodiment.

As illustrated in FIG. 24, a steering apparatus 201 is an apparatus for changing the traveling direction of the vehicle and is provided rotatably with respect to the vehicle body 3. The steering apparatus 201 includes a supporting member 203 and a rotary connector apparatus 204. The supporting member 203 is included in the vehicle body 3. The supporting member 203 includes a housing for a combination switch, for example. The steering apparatus 201 includes the steering 4. The steering 4 is provided rotatably about a rotation axis A22 with respect to the supporting member 203. The steering 4 includes the steering wheel 5 and the steering shaft 6. The steering wheel 5 is fastened to an end portion of the steering shaft 6.

The rotary connector apparatus 204 includes a stator 210 and a rotator 220. The stator 210 is configured to be coupled to the vehicle body 3. The stator 210 is configured to be coupled to the supporting member 203. The rotator 220 is provided rotatably about the rotation axis A21 with respect to the stator 210. The rotator 220 is coupled to the steering 4 and is configured to rotate about the rotation axis A21 together with the steering 4 with respect to the stator 210.

Figure 25:
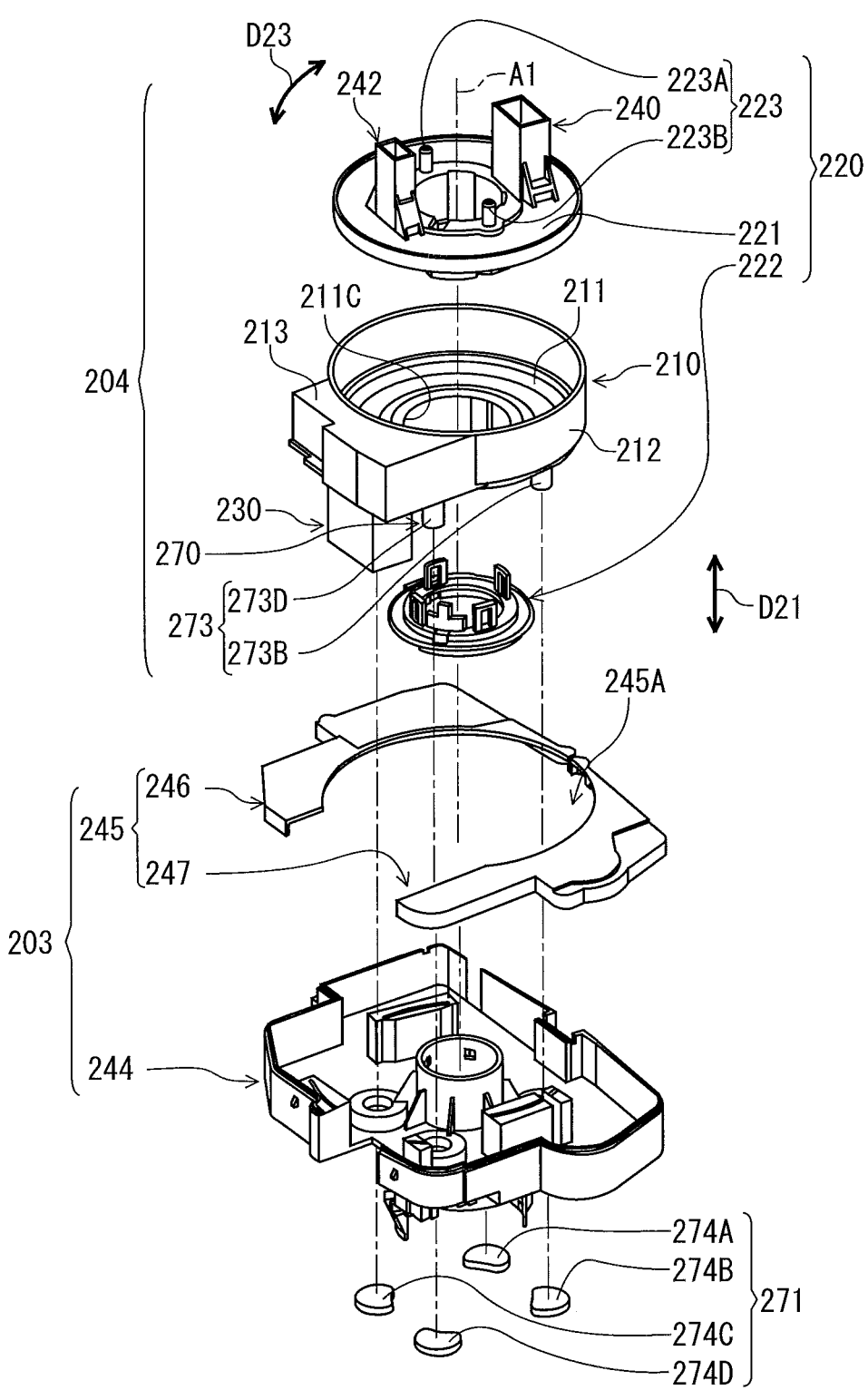
FIG. 25 is an exploded perspective view of a rotary connector apparatus of the steering apparatus illustrated in FIG. 24.

As illustrated in FIG. 25, the rotary connector apparatus 204 includes a first electrical connector 230 and second electrical connectors 240 and 242. The first electrical connector 230 is attached to the stator 210. The second electrical connectors 240 and 242 are attached to the rotator 220. The first electrical connector 230 is configured to be electrically connected to electrical equipment (such as a control apparatus and a battery) provided in the vehicle body 3, for example. The second electrical connectors 240 and 242 are configured to be electrically connected to a switch and the like of the steering wheel 5 and/or an electric circuit of an air bag apparatus and the like, for example.

The supporting member 203 includes a supporting body 244 and a cover 245. The cover 245 is configured to be attached to the supporting body 244. The cover 245 includes a first cover 246 and a second cover 247. The first cover 246 is a separate member from the second cover 247. The cover 245 includes an opening 245A. The stator 210 is disposed in the opening 245A in the state where the stator 210 and the cover 245 are attached to the supporting body 244. The opening 245A is defined by the first cover 246 and the second cover 247.

The stator 210 includes a baseplate 211, an outer periphery wall 212, and a cover 213. The baseplate 211 includes a center opening 211C. The outer periphery wall 212 extends from the baseplate 211 in an axial direction D21 defined along the rotation axis A21. The cover 213 is coupled to the baseplate 211 and the outer periphery wall 212 with the cover 213 covering the cable path from the outer periphery wall 212 to the first electrical connector 230.

The rotator 220 includes a rotator body 221, a sleeve 222, and a rotation input part 223. The sleeve 222 is fastened to the rotator body 221. With the rotator body 221 and the sleeve 222, the rotator 220 is held rotatably about the rotation axis A21 with respect to the stator 210.

The rotation input part 223 protrudes from the rotator body 221 in the axial direction D21. The rotation input part 223 is configured to receive the rotational force from the steering 4 (see, for example, FIG. 24). The rotation input part 223 includes a first rotation input part 223A and a second rotation input part 223B. The first rotation input part 223A protrudes from the rotator body 221 in the axial direction D21. The second rotation input part 223B protrudes from the rotator body 221 in the axial direction D21.

As illustrated in FIG. 24, the steering wheel 5 includes a first protrusion 5A, a second protrusion 5B, and an intermediate member 5C. The first protrusion 5A and the second protrusion 5B are disposed spaced apart from each other in a circumferential direction D23. The first rotation input part 223A is disposed between the first protrusion 5A and the second protrusion 5B in the circumferential direction D23. The intermediate member 5C is attached to the first rotation input part 223A, and is disposed between the first protrusion 5A and the second protrusion 5B. The intermediate member 5C includes an elastic member. For example, the intermediate member 5C is made of rubber. The rotation of the steering wheel 5 is transmitted to the first rotation input part 223A of the rotator 220 through the first protrusion 5A, the second protrusion 5B, and the intermediate member 5C. Note that the intermediate member 5C may be included in the rotator 220 as a torque pin cap attached to the first rotation input part 223A.

Figure 26:
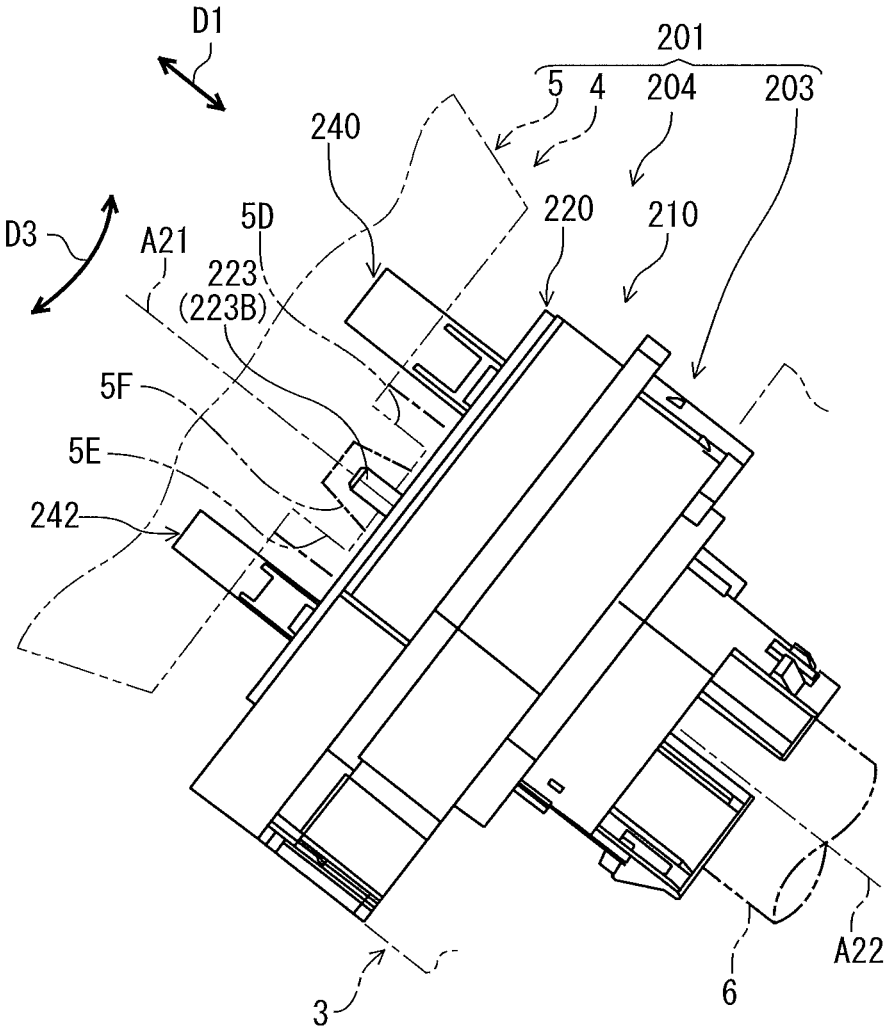
FIG. 26 is a side view of the steering apparatus illustrated in FIG. 24.

As illustrated in FIG. 26, the steering wheel 5 includes a first protrusion 5D, a second protrusion 5E, and an intermediate member 5F. The first protrusion 5D and the second protrusion 5E are disposed spaced apart from each other in the circumferential direction D23. The second rotation input part 223B is disposed between the first protrusion 5D and the second protrusion 5E in the circumferential direction D23. The intermediate member 5F is attached to the second rotation input part 223B, and is disposed between the first protrusion 5D and the second protrusion 5E. The intermediate member 5F includes an elastic member. For example, the intermediate member 5F is made of rubber. The rotation of the steering wheel 5 is transmitted to the second rotation input part 223B of the rotator 220 through the first protrusion 5D, the second protrusion 5E, and the intermediate member 5F. Note that the intermediate member 5F may be included in the rotator 220 as a torque pin cap attached to the second rotation input part 223B.

Figure 27:
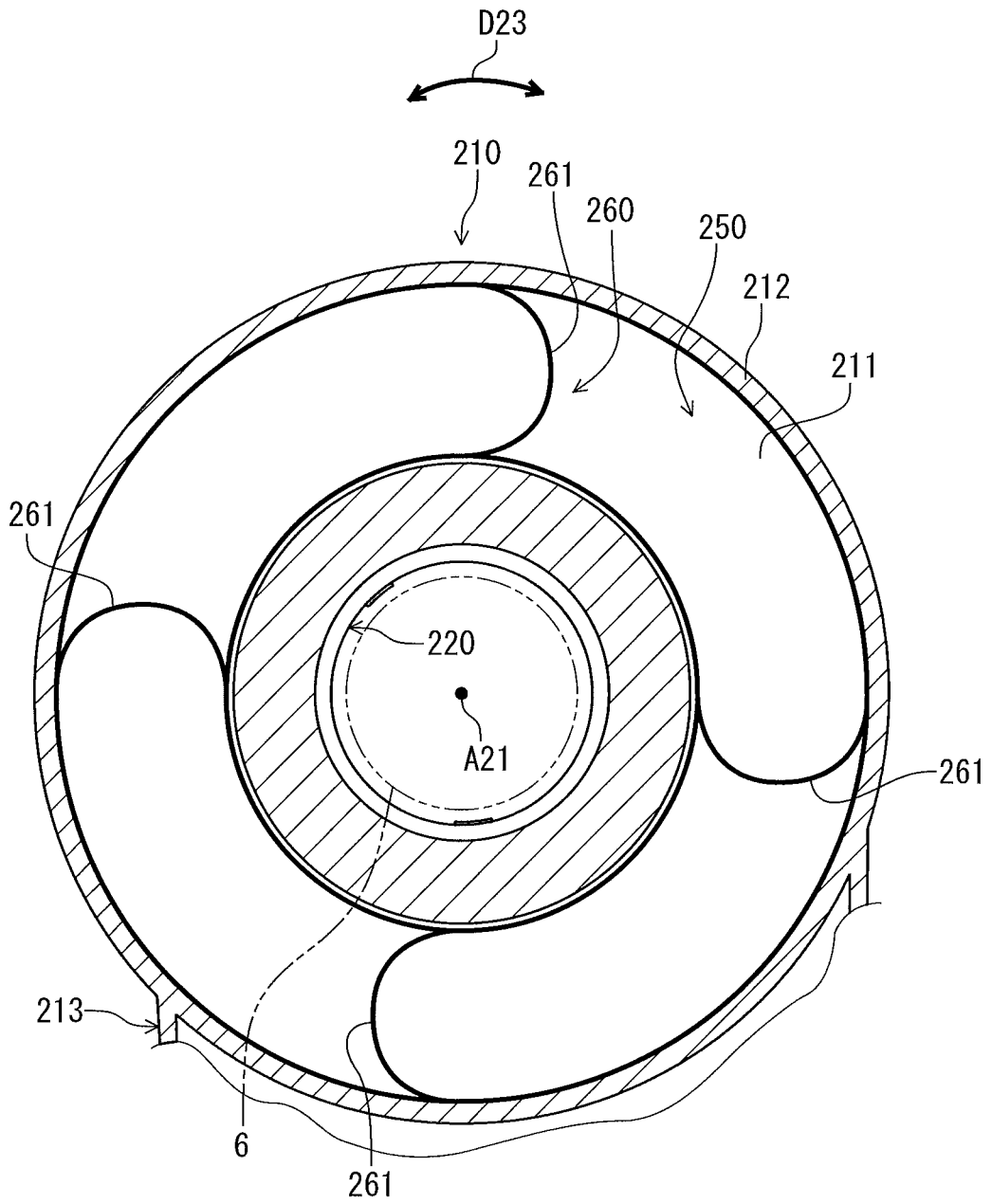
FIG. 27 is a cross-sectional view of the rotary connector apparatus taken along a line XXVII-XXVII in FIG. 24.

As illustrated in FIG. 27, the stator 210 and the rotator 220 define a cable housing space 250 provided to surround the rotation axis A21. For example, the cable housing space 250 has an annular shape, and extends in the circumferential direction D23 with respect to the rotation axis A21. The rotary connector apparatus 204 further includes an electrical cable 260 provided in the cable housing space 250. The electrical cable 260 is electrically connected to the first electrical connector 230 and the second electrical connectors 240 and 242 (see, for example, FIG. 25). The electrical cable 260 has a flat shape with flexibility. The electrical cable 260 may also be referred to as a flexible flat cable. In the present embodiment, the electrical cable 260 includes a plurality of flat cables 261.

Figure 28:
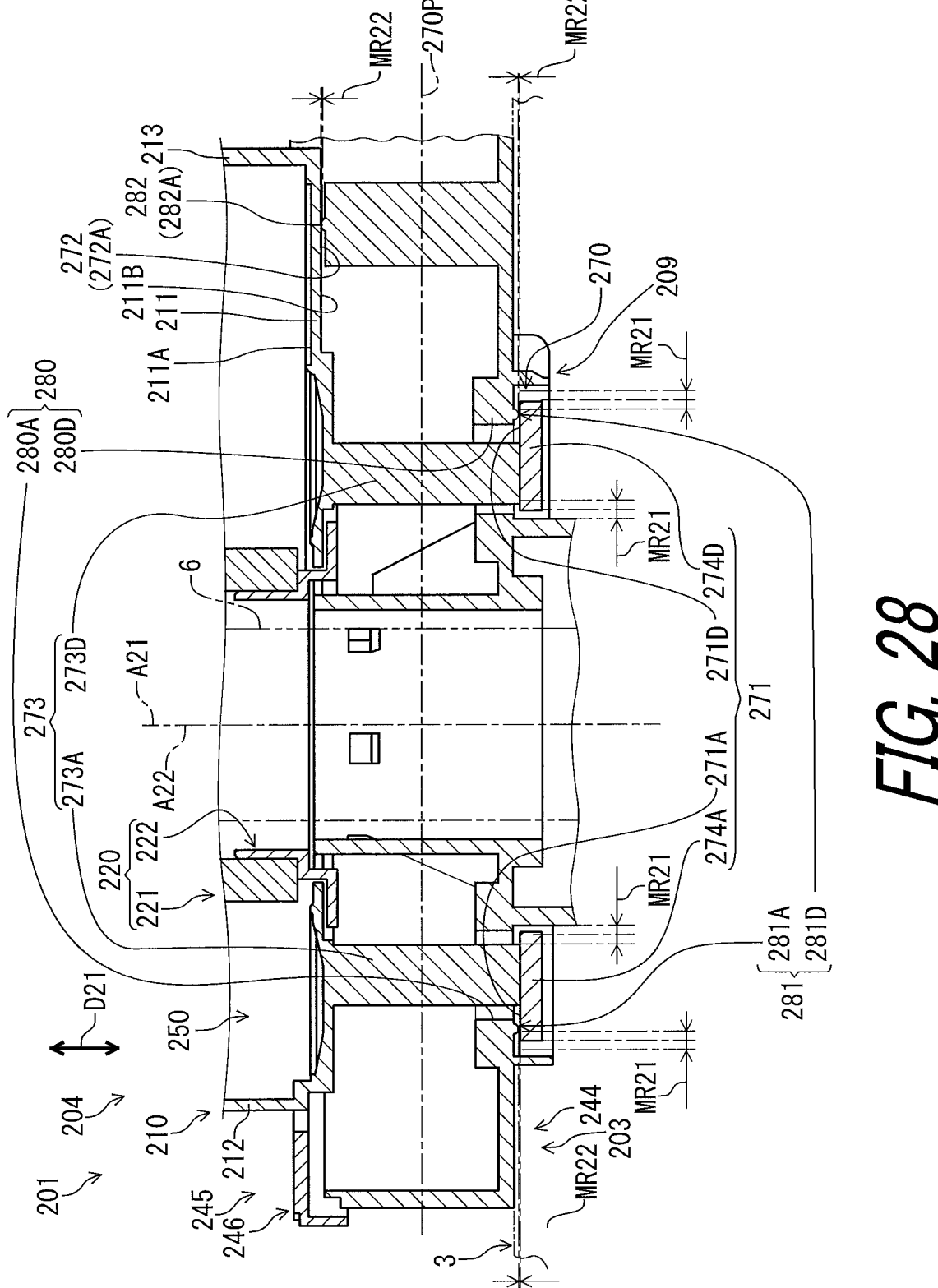
FIG. 28 is a cross-sectional view of the steering apparatus taken along a line XXVIII-XXVIII in FIG. 35.
Figure 29:
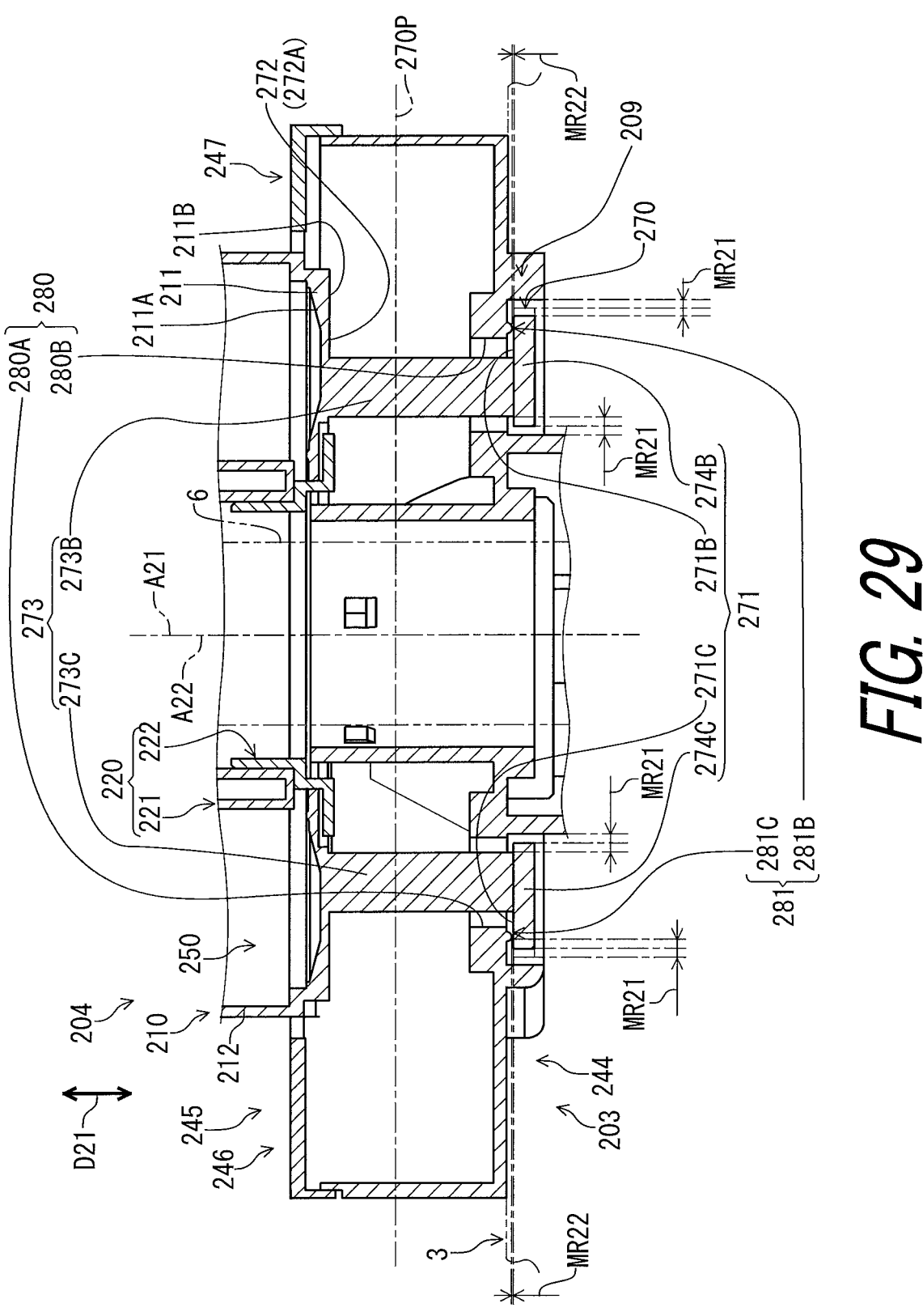
FIG. 29 is a cross-sectional view of the steering apparatus taken along a line XXIX-XXIX in FIG. 35.

As illustrated in FIGS. 28 and 29, the rotary connector apparatus 204 includes an adjustment structure 209. The adjustment structure 209 is configured to allow the rotation axis A21 to move with respect to the vehicle body 3 in the state where the stator 210 is attached to the vehicle body 3. The adjustment structure 209 includes a coupling structure 270. The coupling structure 270 is configured to couple the stator 210 to the vehicle body 3. The coupling structure 270 is configured to couple the stator 210 to the supporting member 203 of the vehicle body 3. The coupling structure 270 is configured to movably couple the stator 210 to the supporting member 203 of the vehicle body 3.

The coupling structure 270 is contactable with the vehicle body 3 to restrict the movement of the stator 210 with respect to the vehicle body 3 in the axial direction D21 defined along the rotation axis A21 and to allow the stator 210 to move with respect to the vehicle body 3 along a virtual plane 270P perpendicular to the rotation axis A21 in the state where the coupling structure 270 couples the stator 210 to the vehicle body 3. The coupling structure 270 is contactable with the supporting member 203 to restrict the movement of the stator 210 with respect to the supporting member 203 in the axial direction D21 and to allow the stator 210 to move with respect to the supporting member 203 along the virtual plane 270P in the state where the coupling structure 270 couples the stator 210 to the supporting member 203.

The coupling structure 270 includes a first sliding part 271 slidable with the vehicle body 3. The first sliding part 271 is slidable with the supporting member 203. The first sliding part 271 is disposed spaced apart from the stator 210 in the axial direction D21. In the state where the coupling structure 270 couples the stator 210 to the vehicle body 3, at least a part of the supporting member 203 is disposed between the stator 210 and the first sliding part 271 in the axial direction D21.

The coupling structure 270 includes a second sliding part 272 slidable with the vehicle body 3. The second sliding part 272 is disposed at a position different from that of the first sliding part 271 in the axial direction D21. The second sliding part 272 is disposed spaced apart from the first sliding part 271 in the axial direction D21. In the present embodiment, the second sliding part 272 is provided at the stator 210. The second sliding part 272 is provided at the baseplate 211 of the stator 210. The baseplate 211 includes a first surface 211A and a second surface 211B. The second surface 211B is provided on the rear side of the first surface 211A in the axial direction D21. The outer periphery wall 212 extends from the first surface 211A of the baseplate 211 in the axial direction D21. The second sliding part 272 is provided at the second surface 211B of the baseplate 211. The second sliding part 272 includes a second sliding surface 272A. The second sliding surface 272A is included in the second surface 211B of the baseplate 211. However, the second sliding part 272 may be provided at another portion of the stator 210 and a member other than the stator 210.

The coupling structure 270 includes a coupling member 273. The coupling member 273 extends from the stator 210 in the axial direction D21. The first sliding part 271 is provided at an end portion of the coupling member 273 and protrudes along the virtual plane 270P from the coupling member 273. The coupling member 273 extends from the stator 210 away from the cable housing space 250 in the axial direction D21.

The coupling member 273 is provided integrally with the stator 210 as a one-piece member. The first sliding part 271 is a separate member from the stator 210 and the coupling member 273. However, the first sliding part 271 may be provided integrally with at least one of the stator 210 and the coupling member 273 as a one-piece member. The coupling member 273 may be a separate member from the stator 210.

Figure 30:
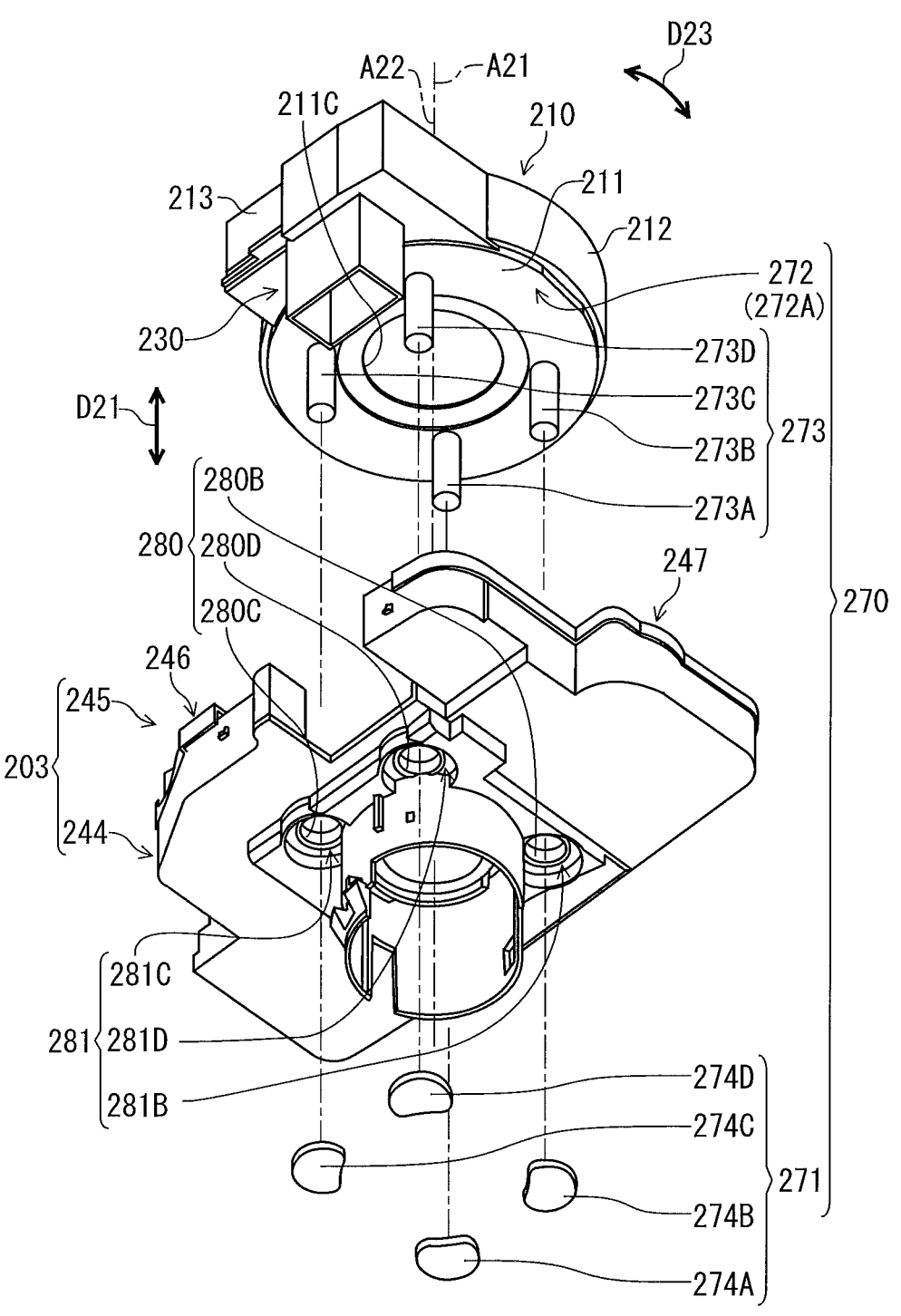
FIG. 30 is an exploded perspective view of the steering apparatus illustrated in FIG. 24.

As illustrated in FIG. 30, the coupling member 273 includes at least one coupling rod 273A, 273B, 273C, and/or 273D extending from the stator 210 in the axial direction D21. In the present embodiment, the coupling member 273 includes a plurality of the coupling rods 273A, 273B, 273C, and 273D extending from the stator 210 in the axial direction D21. However, the total number of the coupling rods 273A, 273B, 273C, and 273D is not limited to four. The structure of the coupling member 273 is not limited to the coupling rods 273A, 273B, 273C, and 273D.

The first sliding part 271 includes at least one restriction plate 274A, 274B, 274C, and/or 274D attached to the at least one coupling rod 273A, 273B, 273C, and/or 273D, respectively. In the present embodiment, the first sliding part 271 includes a plurality of the restriction plates 274A, 274B, 274C, and 274D attached to the plurality of coupling rods 273A, 273B, 273C, and 273D, respectively. However, the total number of the restriction plates is not limited to four. The structure of the first sliding part 271 is not limited to the restriction plates 274A, 274B, 274C, and 274D.

As illustrated in FIGS. 28 and 29, the at least one restriction plate 274A, 274B, 274C, and/or 274D protrudes along the virtual plane 270P from the at least one coupling rod 273A, 273B, 273C, and/or 273D, respectively. In the present embodiment, the plurality of restriction plates 274A, 274B, 274C, and 274D protrude along the virtual plane 270P from the plurality of coupling rods 273A, 273B, 273C, and 273D, respectively.

The first sliding part 271 includes at least one first sliding surface 271A, 271B, 271C, and/or 271D. The at least one first sliding surface 271A, 271B, 271C, and/or 271D is provided at the at least one restriction plate 274A, 274B, 274C, and/or 274D, respectively. In the present embodiment, a plurality of the first sliding surfaces 271A, 271B, 271C, and 271D is provided at the plurality of restriction plates 274A, 274B, 274C, and 274D, respectively. However, the total number of the first sliding surfaces is not limited to four. The first sliding surfaces 271A, 271B, 271C, and 271D may be provided at portions other than the restriction plates 274A, 274B, 274C, and 274D.

The supporting member 203 includes an opening 280, and a first supporting part 281 provided at a periphery of the opening 280. The coupling structure 270 is inserted into the opening 280 in the state where the coupling structure 270 couples the stator 210 to the supporting member 203. The coupling structure 270 is contactable with the first supporting part 281 to restrict the movement of the stator 210 with respect to the supporting member 203 in the axial direction D21 and to allow the stator 210 to move with respect to the supporting member 203 along the virtual plane 270P in the state where the coupling structure 270 couples the stator 210 to the supporting member 203. Note that the position of the virtual plane 270P illustrated in the drawing is merely an example, and the virtual plane 270P may be defined at a position other than the position illustrated in the drawing.

The opening 280 includes at least one opening 280A, 280B, 280C, and/or 280D. The first supporting part 281 includes at least one first supporting part 281A, 281B, 281C, and/or 281D. In the present embodiment, the opening 280 includes a plurality of the openings 280A, 280B, 280C, and 280D. The first supporting part 281 includes a plurality of the first supporting parts 281A, 281B, 281C, and 281D. However, the total number of the openings is not limited to four. The total number of the first supporting parts is not limited to four.

The coupling member 273 is inserted into the opening 280 in the state where the coupling structure 270 couples the stator 210 to the supporting member 203. The coupling rod 273A is inserted into the opening 280A in the state where the coupling structure 270 couples the stator 210 to the supporting member 203. The coupling rod 273B is inserted into the opening 280B in the state where the coupling structure 270 couples the stator 210 to the supporting member 203. The coupling rod 273C is inserted into the opening 280C in the state where the coupling structure 270 couples the stator 210 to the supporting member 203. The coupling rod 273D is inserted into the opening 280D in the state where the coupling structure 270 couples the stator 210 to the supporting member 203.

The first sliding part 271 is slidable with the first supporting part 281. The first sliding surface 271A is slidable with the first supporting part 281A. The first sliding surface 271B is slidable with the first supporting part 281B. The first sliding surface 271C is slidable with the first supporting part 281C. The first sliding surface 271D is slidable with the first supporting part 281D.

Figure 31:
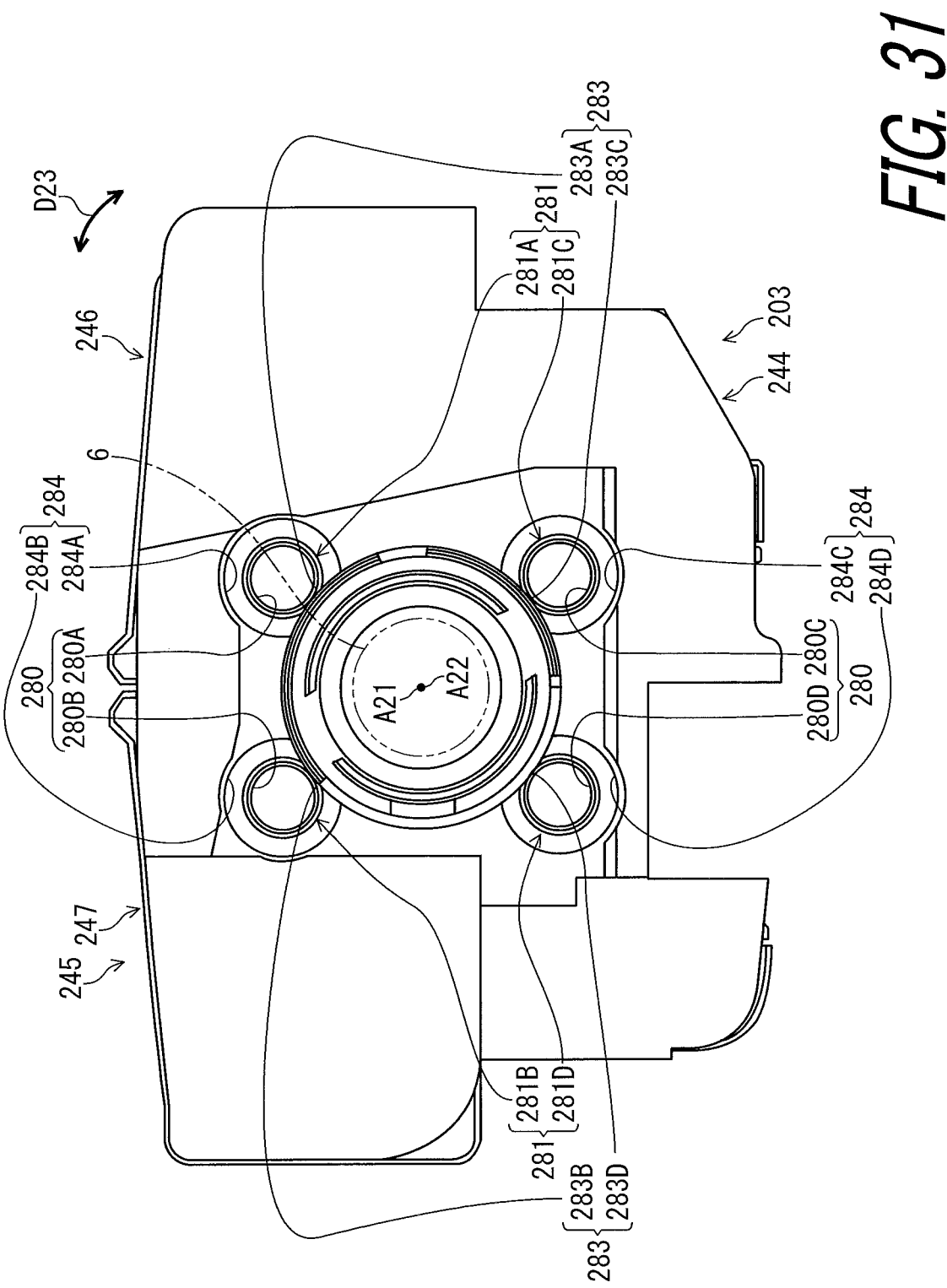
FIG. 31 is a bottom view of a supporting member of the steering apparatus illustrated in FIG. 24.

As illustrated in FIG. 31, the first supporting part 281A is provided on the outer periphery side of the opening 280A, and is disposed surrounding the opening 280A. The first supporting part 281B is provided on the outer periphery side of the opening 280B, and is disposed surrounding the opening 280B. The first supporting part 281C is provided on the outer periphery side of the opening 280C, and is disposed surrounding the opening 280C. The first supporting part 281D is provided on the outer periphery side of the opening 280D, and is disposed surrounding the opening 280D. As illustrated in FIGS. 28 and 29, the first supporting parts 281A, 281B, 281C, and 281D protrude in the axial direction D21.

Figure 32:
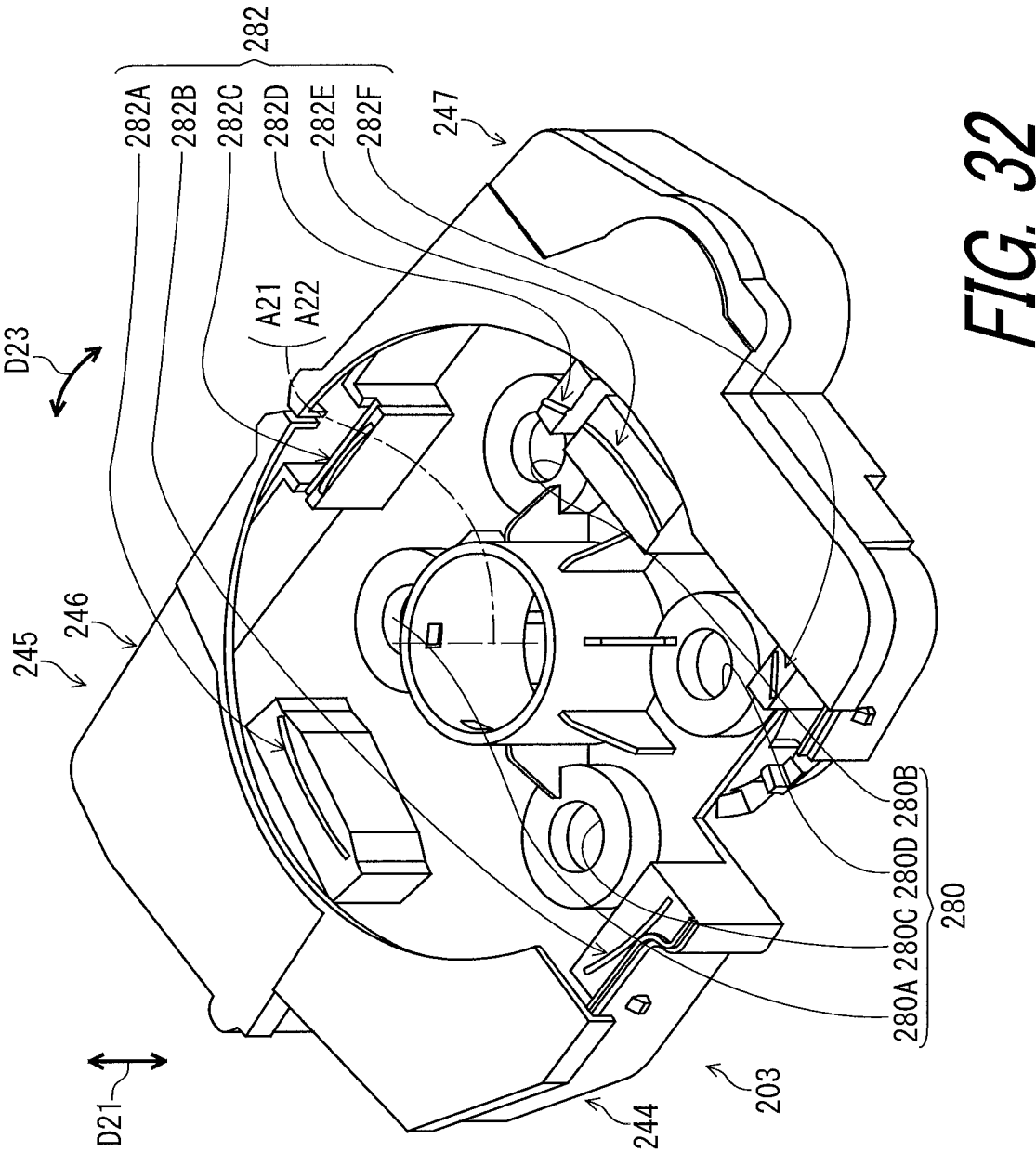
FIG. 32 is a perspective view of the supporting member of the steering apparatus illustrated in FIG. 24.

As illustrated in FIG. 32, the supporting member 203 includes a second supporting part 282. The second supporting part 282 includes at least one second supporting part 282A, 282B, 282C, 282D, 282E, and/or 282F. In the present embodiment, the second supporting part 282 includes a plurality of the second supporting parts 282A, 282B, 282C, 282D, 282E, and 282F. The second supporting parts 282A, 282B, 282C, 282D, 282E, and 282F are disposed spaced apart from each other in the circumferential direction D23. However, the total number of the second supporting parts is not limited to six. The arrangement of the second supporting parts 282A, 282B, 282C, 282D, 282E, and 282F is not limited to the arrangement illustrated in FIG. 32.

Figure 33:
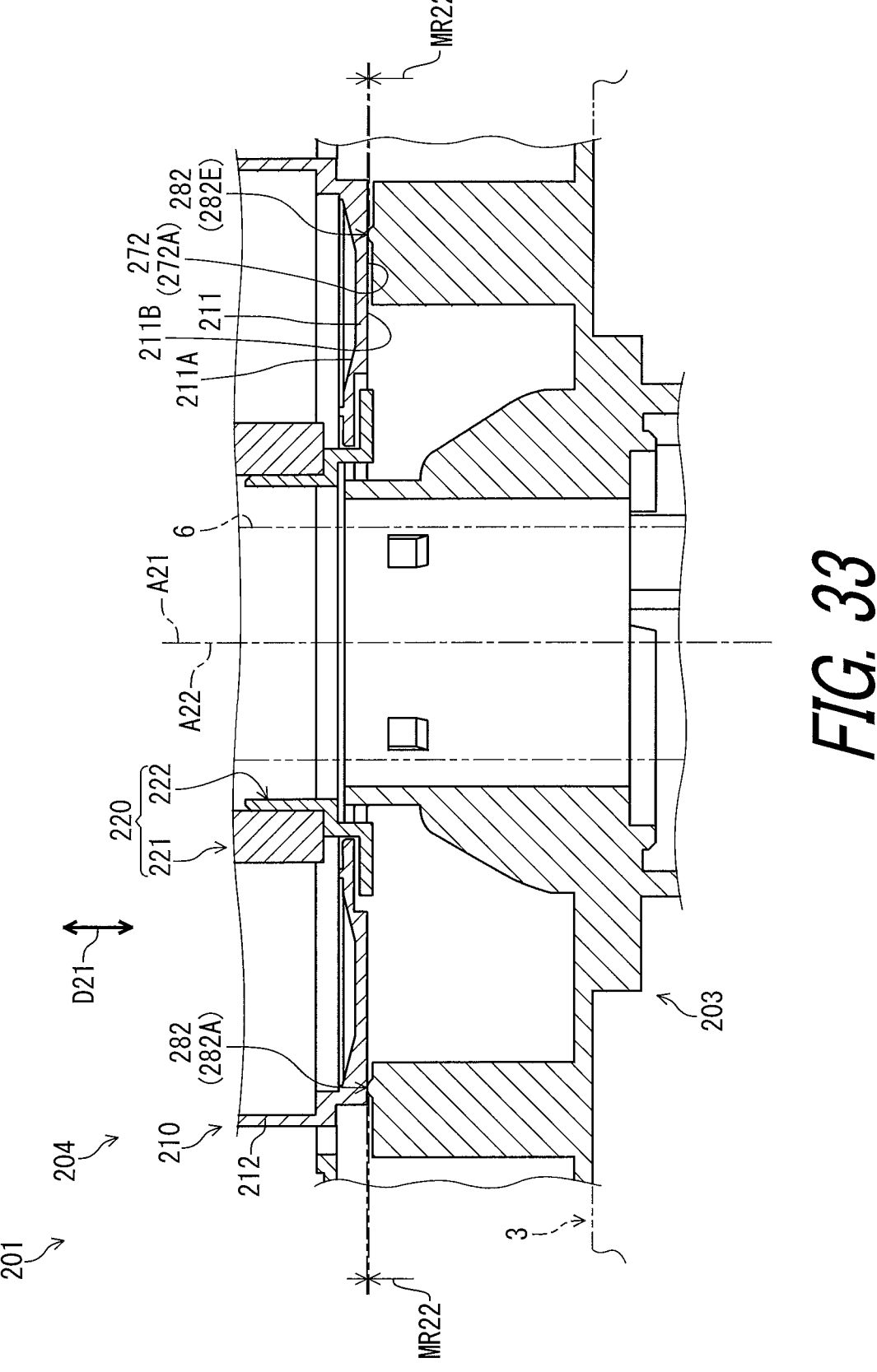
FIG. 33 is a cross-sectional view of the steering apparatus illustrated in FIG. 24.
Figure 34:
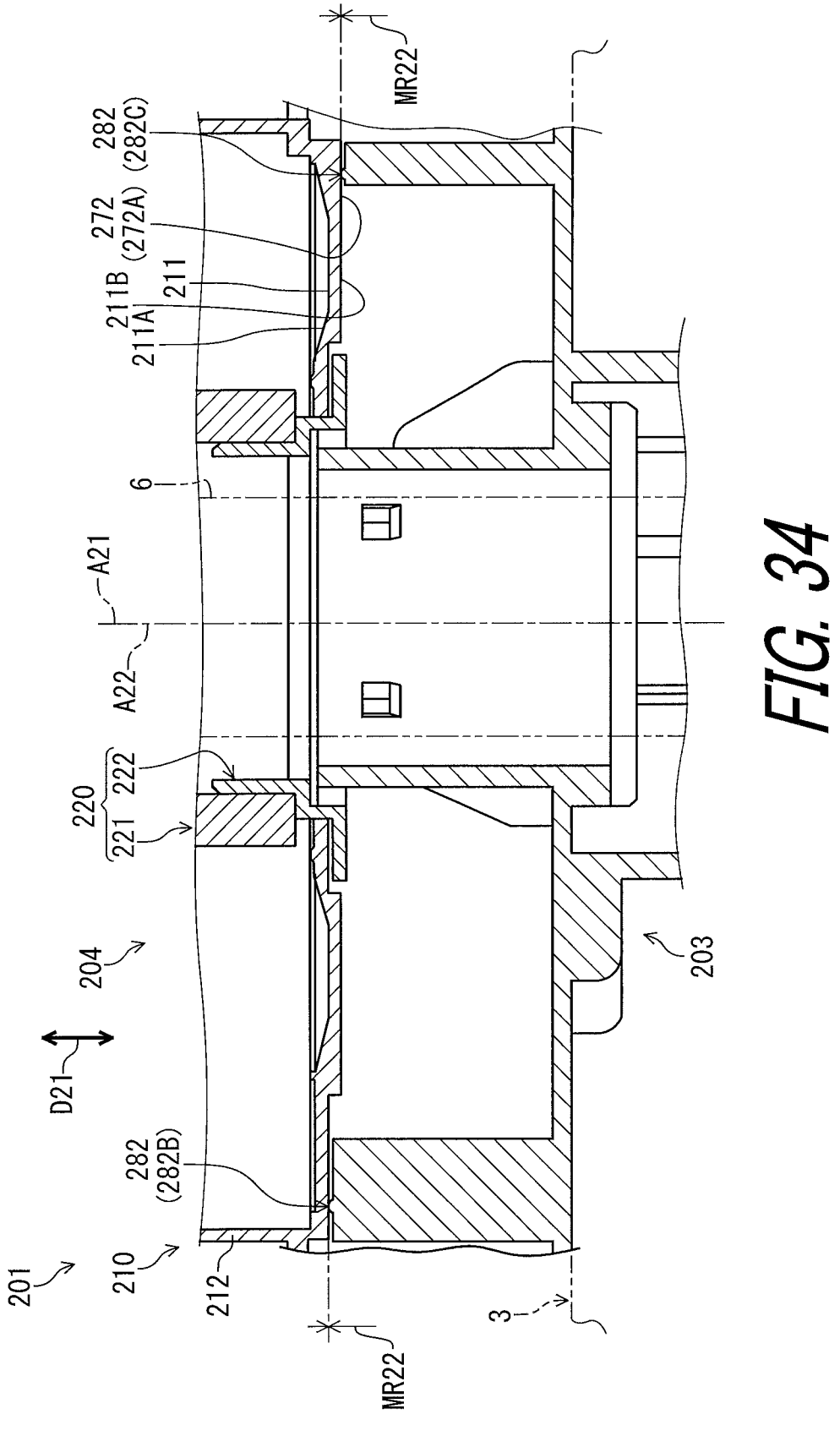
FIG. 34 is a cross-sectional view of the steering apparatus illustrated in FIG. 24.

As illustrated in FIGS. 28, 33, and 34, the second sliding part 272 is slidable with the second supporting part 282. The second sliding surface 272A is slidable with the second supporting part 282. The second sliding part 272 is slidable with the plurality of second supporting parts 282A, 282B, 282C, 282D, 282E, and 282F. The second sliding surface 272A is slidable with the plurality of second supporting parts 282A, 282B, 282C, 282D, 282E, and 282F.

As illustrated in FIGS. 28 and 29, the coupling structure 270 is contactable with the vehicle body 3 to restrict the movement of the stator 210 with respect to the vehicle body 3 along the virtual plane 270P perpendicular to the rotation axis A21 within a first movable range MR21 in the state where the coupling structure 270 couples the stator 210 to the vehicle body 3. The coupling structure 270 is contactable with the supporting member 203 to restrict the movement of the stator 210 with respect to the supporting member 203 along the virtual plane 270P within the first movable range MR21 in the state where the coupling structure 270 couples the stator 210 to the supporting member 203. The first movable range MR21 represents the movable range of the stator 210 with respect to the supporting member 203 along the virtual plane 270P, with a state where the rotation axis A21 of the rotary connector apparatus 204 coincides with the rotation axis A2 of the steering 4 as a reference. The first movable range MR21 is defined in the radial direction with respect to the rotation axis A21.

The coupling structure 270 is contactable with the vehicle body 3 to restrict the movement of the stator 210 with respect to the vehicle body 3 within a second movable range MR22 in the axial direction D21 in the state where the coupling structure 270 couples the stator 210 to the vehicle body 3. The coupling structure 270 is contactable with the supporting member 203 to restrict the movement of the stator 210 with respect to the supporting member 203 within the second movable range MR22 in the axial direction D21 in the state where the coupling structure 270 couples the stator 210 to the supporting member 203. The second movable range MR22 is defined by the axial direction D21. The first movable range MR21 is larger than the second movable range MR22. The second movable range MR22 is defined by the first sliding part 271, the second sliding part 272, the first supporting part 281, and the second supporting part 282.

Figure 35:
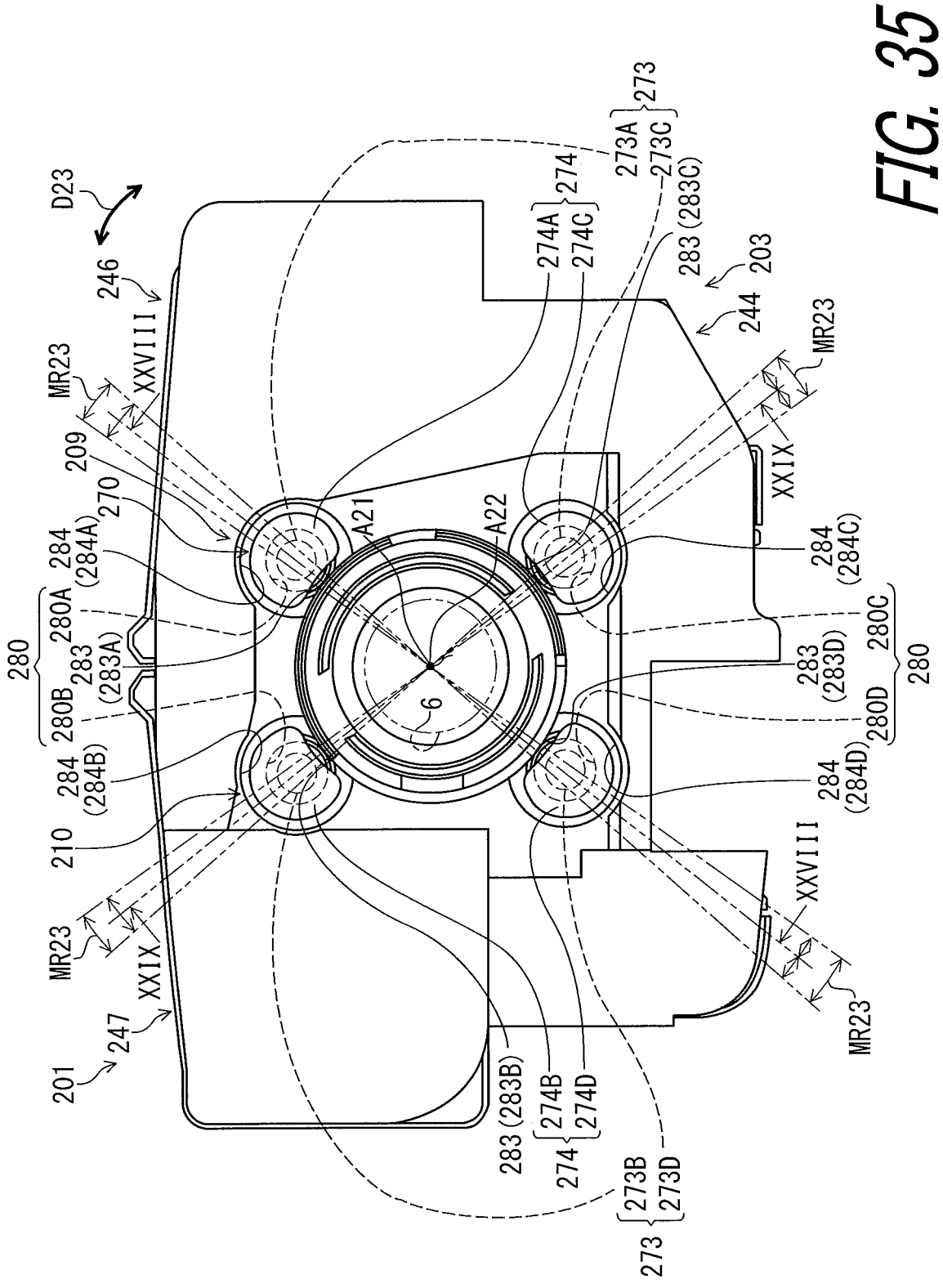
FIG. 35 is a bottom view of the steering apparatus illustrated in FIG. 24.

As illustrated in FIG. 35, the supporting member 203 includes a first restriction part 283. The first restriction part 283 is contactable with the first sliding part 271. The first restriction part 283 is contactable with the restriction plates 274A, 274B, 274C, and 274D. The first restriction part 283 includes a plurality of first restriction surfaces 283A, 283B, 283C, and 283D. The restriction plate 274A is contactable with the first restriction surface 283A. The restriction plate 274B is contactable with the first restriction surface 283B. The restriction plate 274C is contactable with the first restriction surface 283C. The restriction plate 274D is contactable with the first restriction surface 283D. The first restriction surface 283A is provided between the restriction plate 274A and the rotation axis A21 in the radial direction. The first restriction surface 283B is provided between the restriction plate 274B and the rotation axis A21 in the radial direction. The first restriction surface 283C is provided between the restriction plate 274C and the rotation axis A21 in the radial direction. The first restriction surface 283D is provided between the restriction plate 274D and the rotation axis A21 in the radial direction.

As illustrated in FIG. 35, the coupling structure 270 is contactable with the vehicle body 3 to restrict the rotation of the stator 210 about the rotation axis A21 with respect to the vehicle body 3 in the state where the coupling structure 270 couples the stator 210 to the vehicle body 3. The coupling structure 270 is contactable with the supporting member 203 to restrict the rotation of the stator 210 about the rotation axis A21 with respect to the supporting member 203 within a predetermined rotation range MR23 in the state where the coupling structure 270 couples the stator 210 to the supporting member 203.

The supporting member 203 includes a second restriction part 284. The second restriction part 284 is contactable with the first sliding part 271. The first sliding part 271 is contactable with the second restriction part 284 to restrict the rotation of the stator 210 about the rotation axis A21 with respect to the vehicle body 3 in the state where the coupling structure 270 couples the stator 210 to the supporting member 203. The first sliding part 271 is contactable with the second restriction part 284 to restrict the rotation of the stator 210 about the rotation axis A21 with respect to the vehicle body 3 within the predetermined rotation range MR23 in the state where the coupling structure 270 couples the stator 210 to the supporting member 203.

The second restriction part 284 is contactable with the restriction plates 274A, 274B, 274C, and 274D. The second restriction part 284 includes a plurality of second restriction surfaces 284A, 284B, 284C, and 284D. The restriction plate 274A is contactable with the second restriction surface 284A when the stator 210 rotates about the rotation axis A21 with respect to the supporting member 203. The restriction plate 274B is contactable with the second restriction surface 284B when the stator 210 rotates about the rotation axis A21 with respect to the supporting member 203. The restriction plate 274C is contactable with the second restriction surface 284C when the stator 210 rotates about the rotation axis A21 with respect to the supporting member 203. The restriction plate 274D is contactable with the second restriction surface 284D when the stator 210 rotates about the rotation axis A21 with respect to the supporting member 203. The rotation range MR23 is defined by the restriction plates 274A, 274B, 274C, and 274D and the second restriction surfaces 284A, 284B, 284C, and 284D.

In the present embodiment, the second restriction surface 284A is provided to surround the restriction plate 274A. The second restriction surface 284B is provided to surround the restriction plate 274B. The second restriction surface 284C is provided to surround the restriction plate 274C. The second restriction surface 284D is provided to surround the restriction plate 274D. However, the arrangement of the second restriction surfaces 284A, 284B, 284C, and 284D is not limited to the arrangement of the present embodiment.

As illustrated in FIGS. 28 and 29, the rotary connector apparatus 204 includes the stator 210, the rotator 220, and the coupling structure 270. The rotator 220 is provided rotatably about the rotation axis A21 with respect to the stator 210. The coupling structure 270 is configured to couple the stator 210 to the vehicle body 3. The stator 210 and the rotator 220 define the cable housing space 250 provided to surround the rotation axis A21. The coupling structure 270 is contactable with the vehicle body 3 to restrict the movement of the stator 210 with respect to the vehicle body 3 in the axial direction D21 defined along the rotation axis A21 and to allow the stator 210 to move with respect to the vehicle body 3 along the virtual plane 270P perpendicular to the rotation axis A21 in the state where the coupling structure 270 couples the stator 210 to the vehicle body 3.

When the steering 4 becomes eccentric, the load at the coupling part between the rotation input part 223 (for example, at least one of the first rotation input part 223A and the second rotation input part 223B illustrated in FIGS. 24 to 26) and the steering 4 (for example, the steering wheel 5 illustrated in FIGS. 24 and 26) increases, and consequently abnormal noise may be generated from the coupling part or the coupling part may be damaged.

However, with the rotary connector apparatus 204, even when the steering 4 becomes eccentric, the stator 210 follows the eccentricity of the steering 4, and thus the rotator 220 can also follow the eccentricity of the steering 4. Even when the steering 4 becomes eccentric, the load that acts on the coupling part between the rotation input part 223 and the steering wheel 5 can be reduced. Thus, the influence of the eccentricity of the steering 4 can be reduced with a simple structure.

As described above, the rotary connector apparatus 204 includes the stator 210, the rotator 220, and the adjustment structure 209. The stator 210 is configured to be attached to the vehicle body 3. The rotator 220 is provided rotatably about the rotation axis A21 with respect to the stator 210. The adjustment structure 209 is configured to allow the rotation axis A21 to move with respect to the vehicle body 3 in the state where the stator 210 is attached to the vehicle body 3. The stator 210 and the rotator 220 define the cable housing space 250 provided to surround the rotation axis A21.

With the rotary connector apparatus 204, the adjustment structure 209 allows the rotation axis A21 to move with respect to the vehicle body 3, and thus the influence of at least one of the declination and eccentricity of the steering 4 can be reduced with a simple structure.

Third Embodiment

Figure 36:
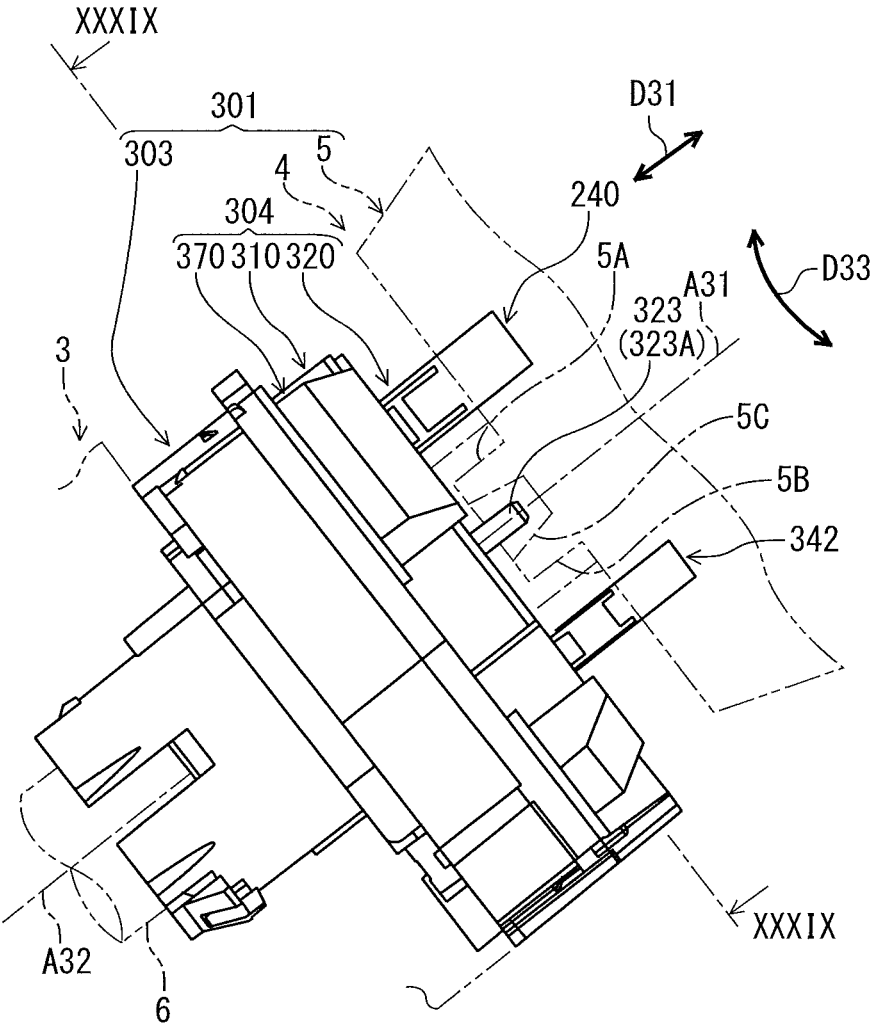
FIG. 36 is a side view of a steering apparatus according to a third embodiment.

As illustrated in FIG. 36, a steering apparatus 301 is an apparatus for changing the traveling direction of the vehicle, and is provided rotatably with respect to the vehicle body 3. The steering apparatus 301 includes a base member 303 and a rotary connector apparatus 304. The base member 303 is included in the vehicle body 3. The base member 303 includes a housing for a combination switch, for example. The steering apparatus 301 includes the steering 4. The steering 4 is provided rotatably about a rotation axis A32 with respect to the base member 303. The steering 4 includes the steering wheel 5 and the steering shaft 6. The steering wheel 5 is fastened to an end portion of the steering shaft 6.

The rotary connector apparatus 304 includes a stator 310 and a rotator 320. The stator 310 is configured to be coupled to the vehicle body 3. The stator 310 is configured to be coupled to the base member 303. The rotator 320 is provided rotatably about a rotation axis A31 with respect to the stator 310. The rotator 320 is coupled to the steering 4 and is configured to rotate about the rotation axis A31 together with the steering 4 with respect to the stator 310.

Figure 37:
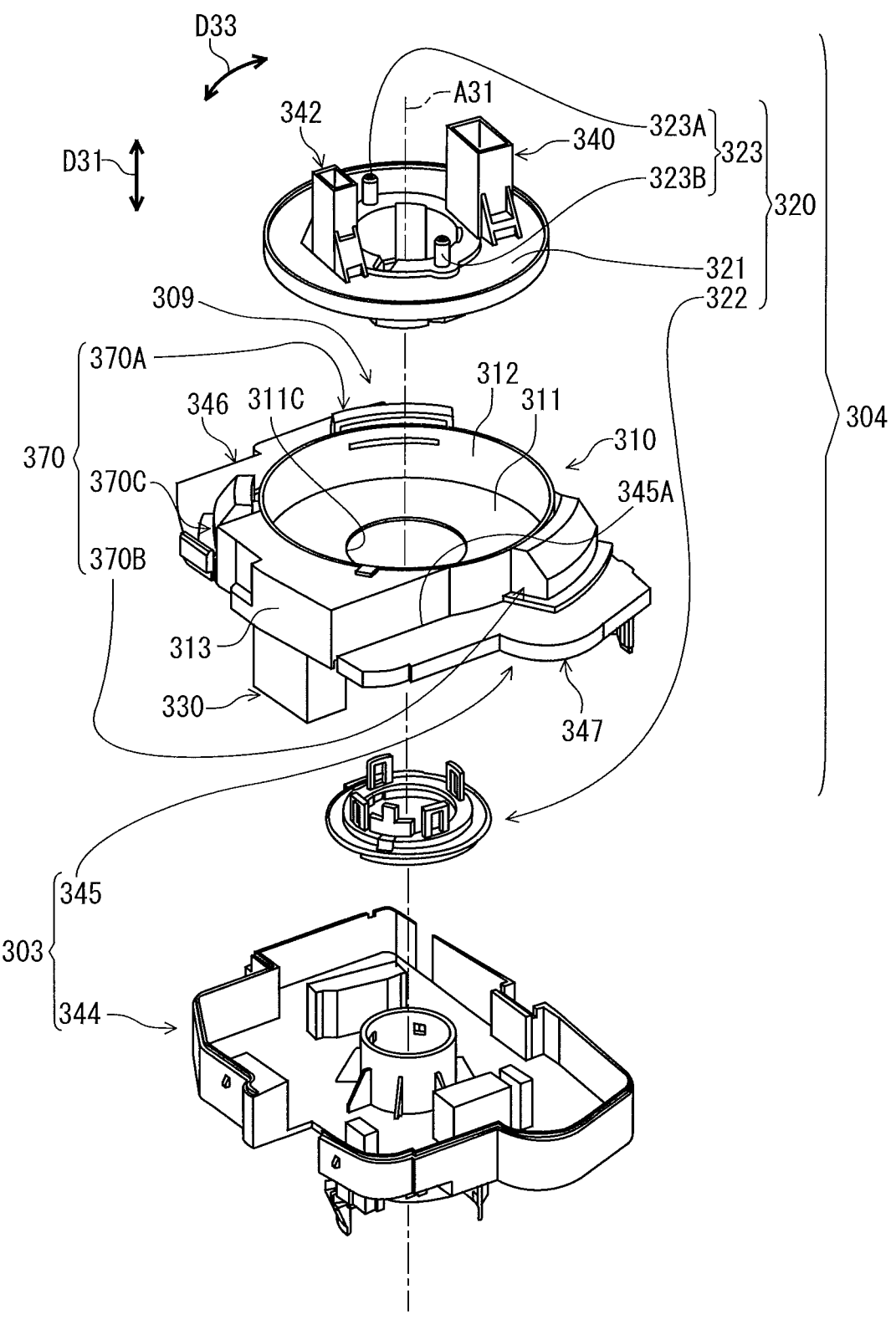
FIG. 37 is an exploded perspective view of a rotary connector apparatus of the steering apparatus illustrated in FIG. 36.

As illustrated in FIG. 37, the rotary connector apparatus 304 includes a first electrical connector 330 and second electrical connectors 340 and 342. The first electrical connector 330 is attached to the stator 310. The second electrical connectors 340 and 342 are attached to the rotator 320. The first electrical connector 330 is configured to be electrically connected to electrical equipment (such as a control apparatus and a battery) provided in the vehicle body 3, for example. The second electrical connectors 340 and 342 are configured to be electrically connected to a switch and the like of the steering wheel 5 and/or an electric circuit of an air bag apparatus and the like, for example.

Figure 42:
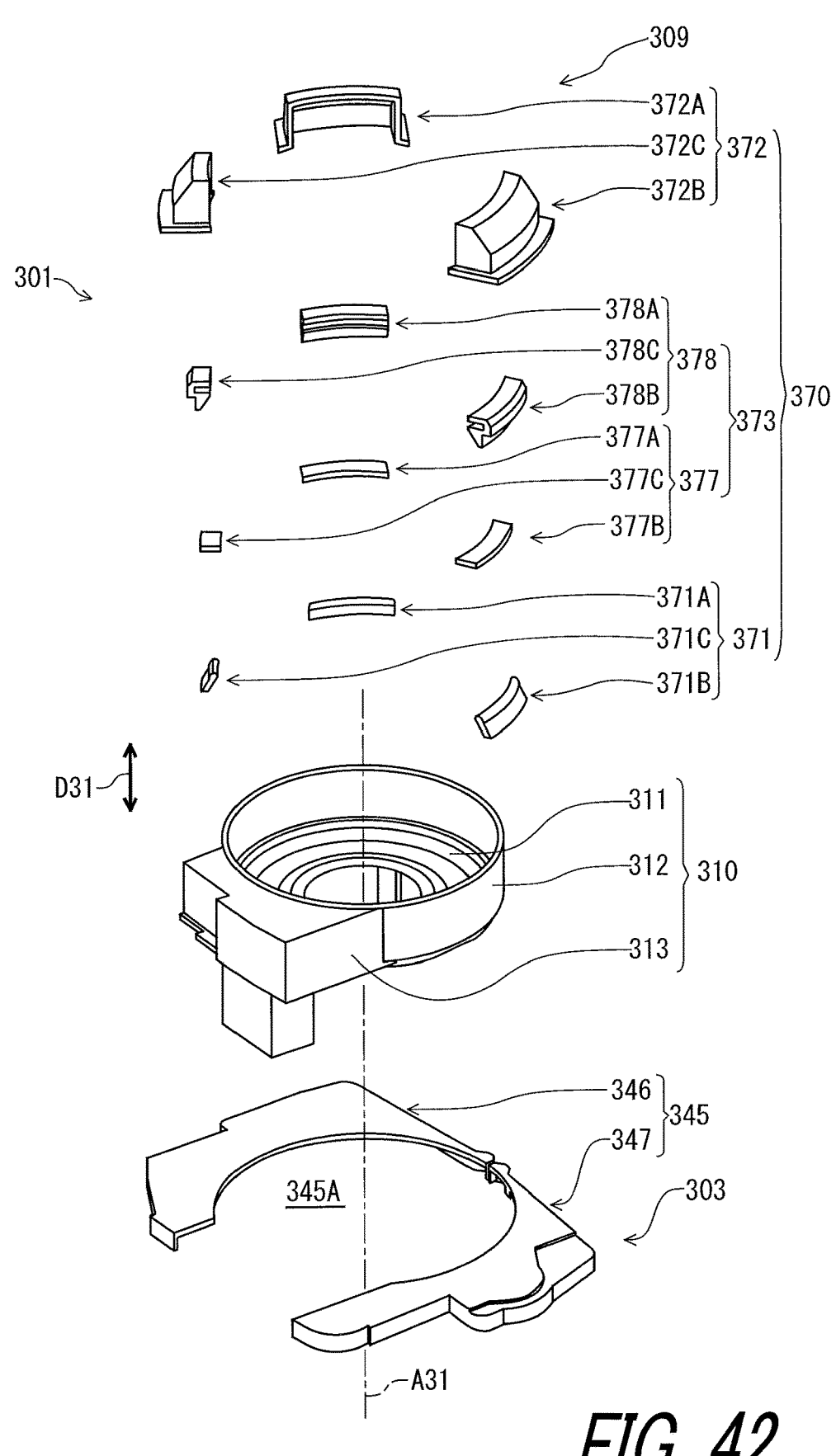
FIG. 42 is an exploded perspective view of the steering apparatus illustrated in FIG. 36.

The base member 303 includes a base 344 and a cover 345. The cover 345 is configured to be attached to the base 344. As illustrated in FIGS. 37 and 42, the cover 345 includes a first cover 346 and a second cover 347. The first cover 346 is a separate member from the second cover 347. The cover 345 includes an opening 345A. The stator 310 is disposed in the opening 345A in the state where the stator 310 and the cover 345 are attached to the base 344. The opening 345A is defined by the first cover 346 and the second cover 347.

As illustrated in FIG. 37, the stator 310 includes a baseplate 311, an outer periphery wall 312, and a cover part 313. The baseplate 311 includes a center opening 311C. The outer periphery wall 312 extends from the baseplate 311 in an axial direction D31 defined along the rotation axis A31. The cover part 313 is coupled to the baseplate 311 and the outer periphery wall 312 with the cover part 313 covering the cable path from the outer periphery wall 312 to the first electrical connector 330.

The rotator 320 includes a rotator body 321, a sleeve 322, and a rotation input part 323. The sleeve 322 is fastened to the rotator body 321. With the rotator body 321 and the sleeve 322, the rotator 320 is held rotatably about the rotation axis A31 with respect to the stator 310.

The rotation input part 323 protrudes in the axial direction D31 from the rotator body 321. The rotation input part 323 is configured to receive the rotational force from the steering 4 (see, for example, FIG. 36). The rotation input part 323 includes a first rotation input part 323A and a second rotation input part 323B. The first rotation input part 323A protrudes in the axial direction D31 from the rotator body 321. The second rotation input part 323B protrudes in the axial direction D31 from the rotator body 321.

As illustrated in FIG. 36, the steering wheel 5 includes the first protrusion 5A, the second protrusion 5B, and the intermediate member 5C. The first protrusion 5A and the second protrusion 5B are disposed spaced apart from each other in a circumferential direction D33. The first rotation input part 323A is disposed between the first protrusion 5A and the second protrusion 5B in the circumferential direction D33. The intermediate member 5C is attached to the first rotation input part 323A and is disposed between the first protrusion 5A and the second protrusion 5B. The intermediate member 5C includes an elastic member. For example, the intermediate member 5C is made of rubber. The rotation of the steering wheel 5 is transmitted to the first rotation input part 323A of the rotator 320 through the first protrusion 5A, the second protrusion 5B, and the intermediate member 5C. Note that the intermediate member 5C may be included in the rotator 320 as a torque pin cap attached to the first rotation input part 323A.

Figure 38:
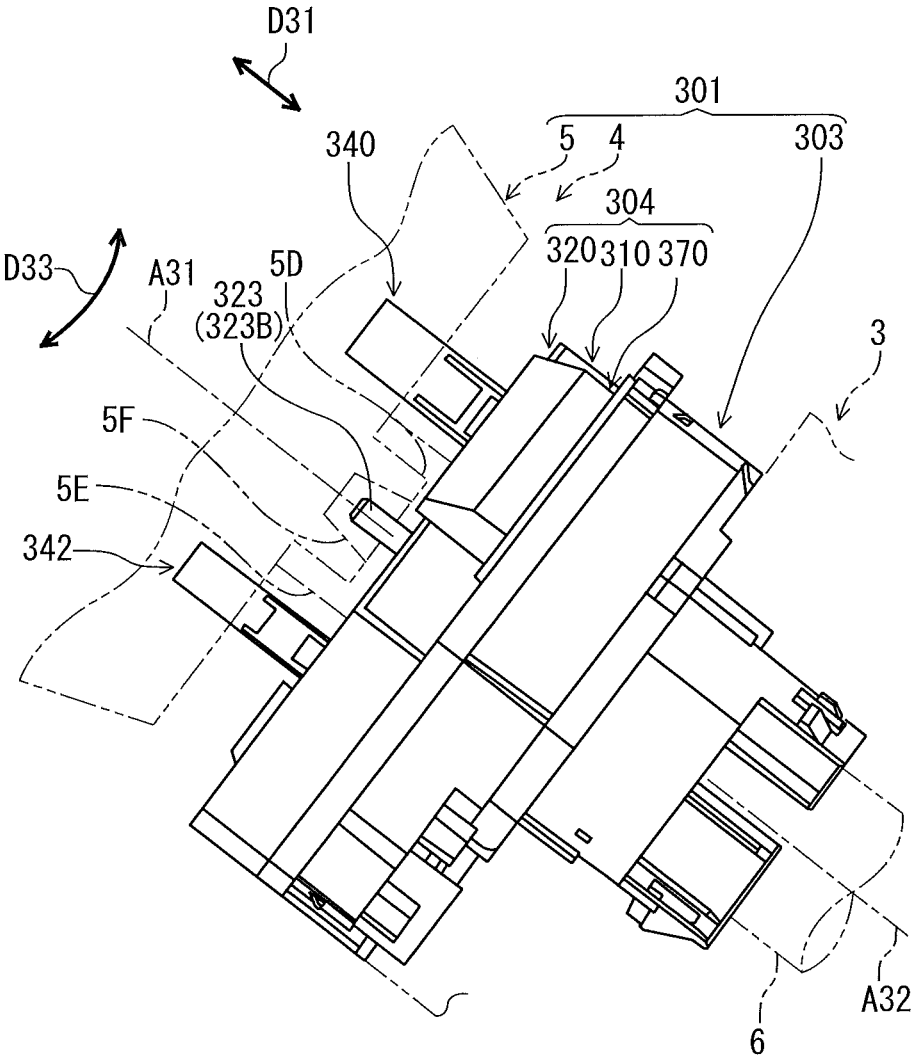
FIG. 38 is a side view of the steering apparatus illustrated in FIG. 36.

As illustrated in FIG. 38, the steering wheel 5 includes the first protrusion 5D, the second protrusion 5E, and the intermediate member 5F. The first protrusion 5D and the second protrusion 5E are disposed spaced apart from each other in the circumferential direction D33. The second rotation input part 323B is disposed between the first protrusion 5D and the second protrusion 5E in the circumferential direction D33. The intermediate member 5F is attached to the second rotation input part 323B and is disposed between the first protrusion 5D and the second protrusion 5E. The intermediate member 5F includes an elastic member. For example, the intermediate member 5F is made of rubber. The rotation of the steering wheel 5 is transmitted to the second rotation input part 323B of the rotator 320 through the first protrusion 5D, the second protrusion 5E, and the intermediate member 5F. Note that the intermediate member 5F may be included in the rotator 320 as a torque pin cap attached to the second rotation input part 323B.

Figure 39:
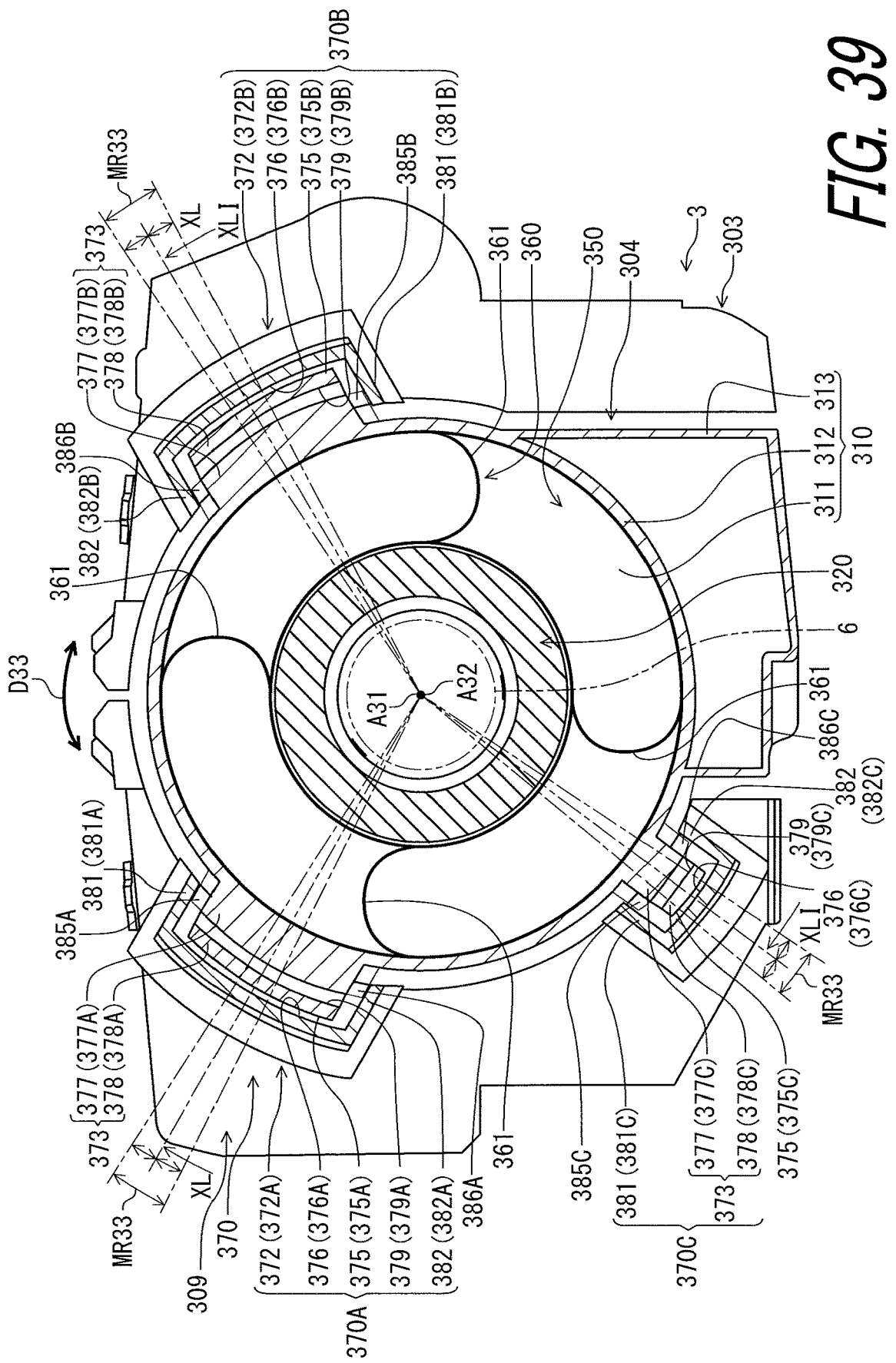
FIG. 39 is a cross-sectional view of the rotary connector apparatus taken along a line XXXIX-XXXIX in FIG. 36.

As illustrated in FIG. 39, the stator 310 and the rotator 320 define a cable housing space 350 provided to surround the rotation axis A31. For example, the cable housing space 350 has an annular shape, and extends in the circumferential direction D33 with respect to the rotation axis A31. The rotary connector apparatus 304 further includes the electrical cable 60 provided in the cable housing space 350. The electrical cable 60 is electrically connected to the first electrical connector 330 and the second electrical connectors 340 and 342 (see, for example, FIG. 37). The electrical cable 60 has a flat shape with flexibility. The electrical cable 60 may also be referred to as a flexible flat cable. In the present embodiment, the electrical cable 60 includes a plurality of flat cables 61.

Figure 40:
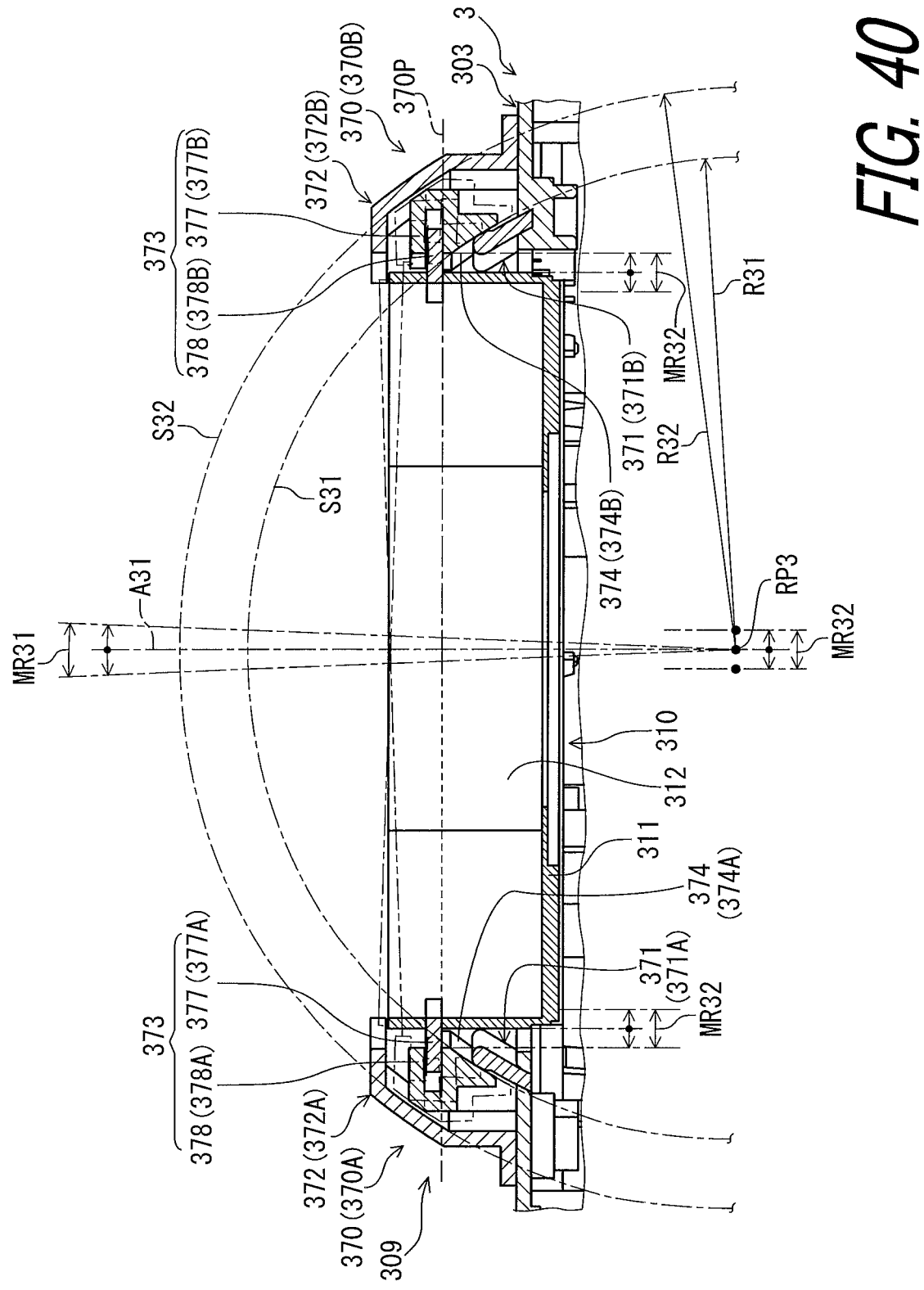
FIG. 40 is a cross-sectional view of the steering apparatus taken along a line XL-XL in FIG. 39.
Figure 41:
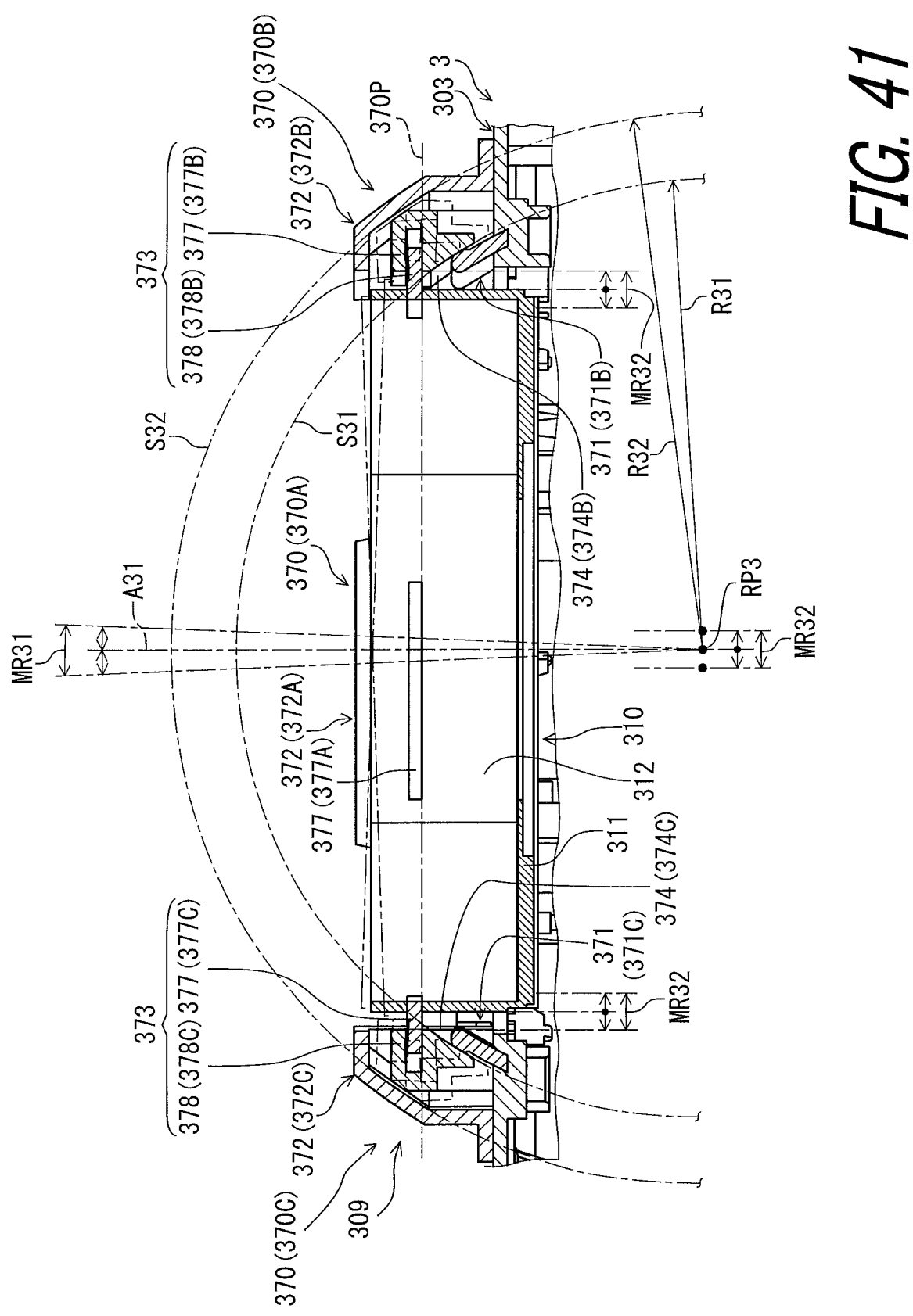
FIG. 41 is a cross-sectional view of the steering apparatus taken along a line XLI-XLI in FIG. 39.

As illustrated in FIGS. 40 and 41, the rotary connector apparatus 304 includes an adjustment structure 309. The adjustment structure 309 is configured to allow the rotation axis A31 to move with respect to the vehicle body 3 in the state where the stator 310 is attached to the vehicle body 3. The adjustment structure 309 includes a coupling structure 370. The coupling structure 370 is configured to couple the stator 310 to the vehicle body 3. The coupling structure 370 is configured to couple the stator 310 to the base member 303 of the vehicle body 3. The coupling structure 370 is configured to movably couple the stator 310 to the base member 303 of the vehicle body 3. The coupling structure 370 restricts the movement of the stator 310 with respect to the base member 303 of the vehicle body 3 in the axial direction D31 and allows the stator 310 to move with respect to the base member 303 of the vehicle body 3 in a direction other than the axial direction D31 within a predetermined movable range in the state where the coupling structure 370 couples the stator 310 to the vehicle body 3.

The coupling structure 370 supports the stator 310 movably with respect to vehicle body 3 to change the angle of the rotation axis A31 with respect to the vehicle body 3 in the state where the coupling structure 370 couples the stator 310 to the vehicle body 3. The coupling structure 370 supports the stator 310 movably with respect to the base member 303 to change the angle of the rotation axis A31 with respect to the base member 303 in the state where the coupling structure 370 couples the stator 310 to the base member 303. The coupling structure 370 supports the stator 310 movably with respect to the vehicle body 3 to change the angle of the rotation axis A31 with respect to the vehicle body 3 within a first movable range MR31 in the state where the coupling structure 370 couples the stator 310 to the vehicle body 3. The coupling structure 370 supports the stator 310 movably with respect to the base member 303 to change the angle of the rotation axis A31 with respect to the base member 303 within the first movable range MR31 in the state where the coupling structure 370 couples the stator 310 to the base member 303.

The coupling structure 370 supports the stator 310 movably with respect to the vehicle body 3 and to allow the stator 310 to move with respect to the vehicle body 3 along a virtual plane 370P perpendicular to the rotation axis A31 in the state where the coupling structure 370 couples the stator 310 to the vehicle body 3. The coupling structure 370 supports the stator 310 movably with respect to the base member 303 of the vehicle body 3 while restricting the movement of the stator 310 with respect to the base member 303 of the vehicle body 3 along the virtual plane 370P perpendicular to the rotation axis A31 within a second movable range MR32 in the state where the coupling structure 370 couples the stator 310 to the vehicle body 3.

However, the coupling structure 370 may be configured to restrict the movement of the stator 310 with respect to the vehicle body 3 along the virtual plane 370P perpendicular to the rotation axis A31 in the state where the coupling structure 370 couples the stator 310 to the vehicle body 3.

As illustrated in FIG. 42, the coupling structure 370 includes a first supporting member 371, a second supporting member 372, and a coupling member 373. The first supporting member 371 and the second supporting member 372 are coupled to the base member 303 of the vehicle body 3. The coupling member 373 is coupled to the stator 310.

In the present embodiment, the first supporting member 371 includes first supporting bodies 371A, 371B, and 371C. The first supporting bodies 371A, 371B, and 371C are separate members. However, the total number of components included in the first supporting member 371 is not limited to three. At least two of the first supporting bodies 371A, 371B, and 371C may be integrally provided as a one-piece member.

The second supporting member 372 includes second supporting bodies 372A, 372B, and 372C. The second supporting bodies 372A, 372B, and 372C are separate members. However, the total number of components included in the second supporting member 372 is not limited to three. At least two of the second supporting bodies 372A, 372B, and 372C may be integrally provided as a one-piece member.

In the present embodiment, the second supporting member 372 is a separate member from the first supporting member 371. The second supporting body 372A is a separate member from the first supporting body 371A. The second supporting body 372B is a separate member from the first supporting body 371B. The second supporting body 372C is a separate member from the first supporting body 371C. However, the second supporting member 372 may be provided integrally with the first supporting member 371 as a one-piece member. The second supporting body 372A may be provided integrally with the first supporting body 371A as a one-piece member. The second supporting body 372B may be provided integrally with the first supporting body 371B as a one-piece member. The second supporting body 372C may be provided integrally with the first supporting body 371C as a one-piece member.

The coupling member 373 includes a first coupling member 377 and a second coupling member 378. The first coupling member 377 is fastened to the stator 310. The second coupling member 378 is movably coupled to the coupling member 377.

In the present embodiment, the first coupling member 377 includes first couplers 377A, 377B, and 377C. The first couplers 377A, 377B, and 377C are fastened to the stator 310. The first couplers 377A, 377B, and 377C are separate members. However, the total number of components included in the first coupling member 377 is not limited to three. At least two of the first couplers 377A, 377B, and 377C may be integrally provided as a one-piece member.

The second coupling member 378 includes second couplers 378A, 378B, and 378C. The second coupler 378A is movably coupled to the first coupler 377A. The second coupler 378B is movably coupled to the first coupler 377B. The second coupler 378C is movably coupled to the first coupler 377C. The second couplers 378A, 378B, and 378C are separate members. However, the total number of components included in the second coupling member 378 is not limited to three. At least two of the second couplers 378A, 378B, and 378C may be integrally provided as a one-piece member.

In the present embodiment, the first supporting body 371B, the second supporting body 372B, the first coupler 377B, and the second coupler 378B have the same structures as the structures of the first supporting body 371A, the second supporting body 372A, the first coupler 377A, and the second coupler 378A. The first supporting body 371C, the second supporting body 372C, the first coupler 377C, and the second coupler 378C have substantially the same structures as the structures of the first supporting body 371A, the second supporting body 372A, the first coupler 377A, and the second coupler 378A.

However, the first supporting body 371B, the second supporting body 372B, the first coupler 377B, and the second coupler 378B may have structures substantially the same as or different from the structures of the first supporting body 371A, the second supporting body 372A, the first coupler 377A, and the second coupler 378A. The first supporting body 371C, the second supporting body 372C, the first coupler 377C, and the second coupler 378C may have structures the same as or different from the structures of the first supporting body 371A, the second supporting body 372A, the first coupler 377A, and the second coupler 378A.

Figure 43:
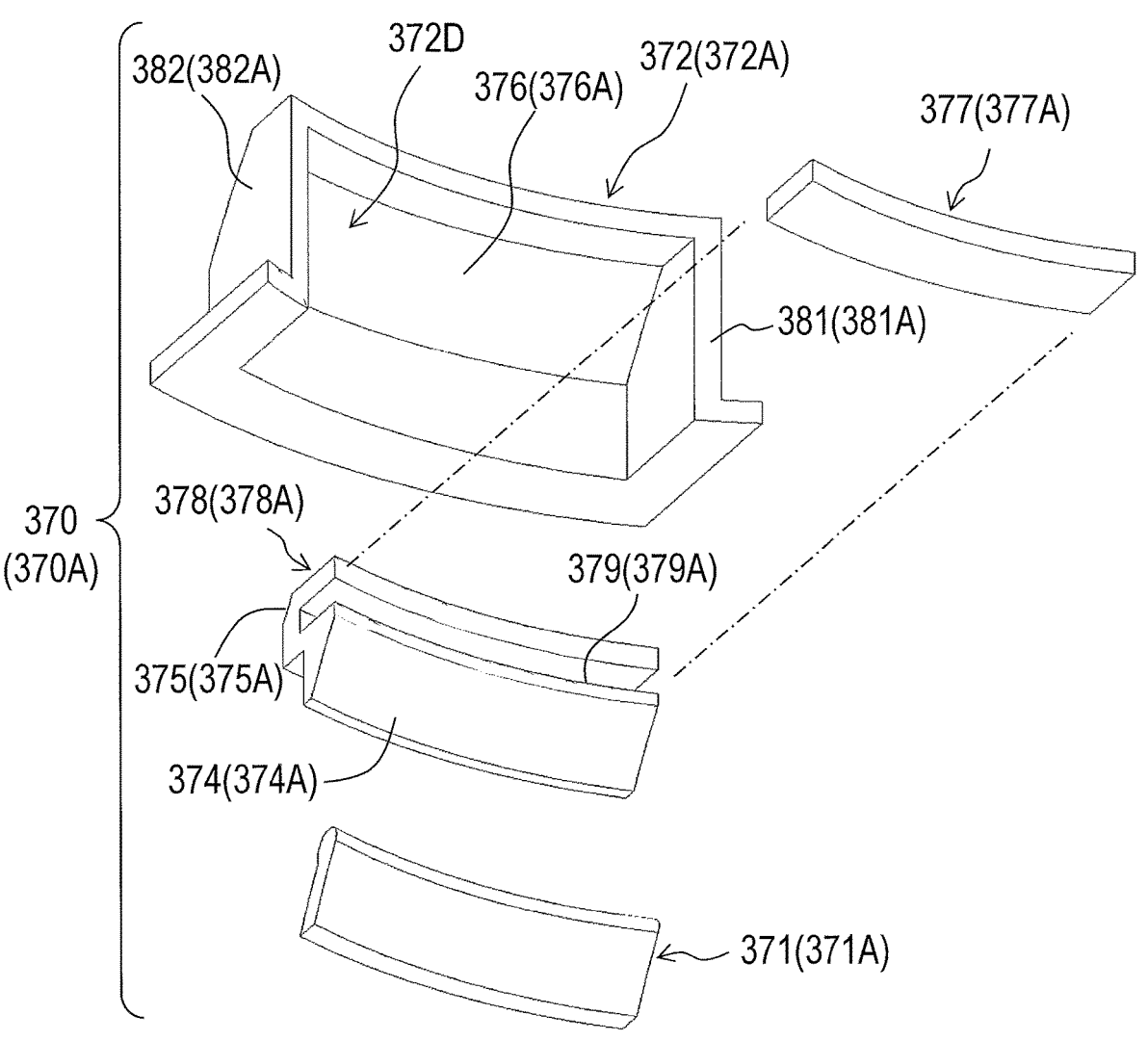
FIG. 43 is an exploded perspective view of a coupling structure of the rotary connector apparatus illustrated in FIG. 36.
Figure 44:
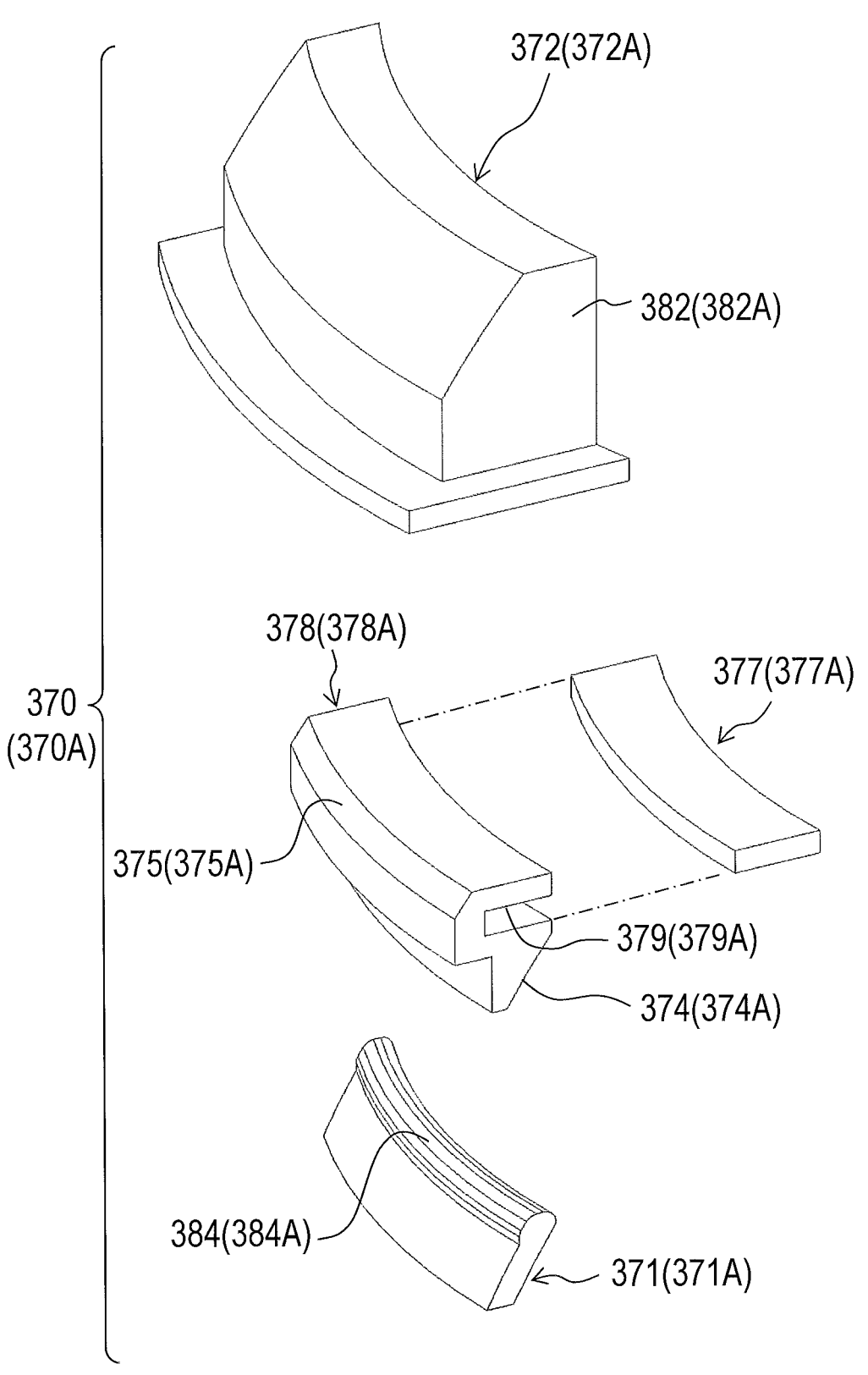
FIG. 44 is an exploded perspective view of the coupling structure of the rotary connector apparatus illustrated in FIG. 36.
Figure 45:
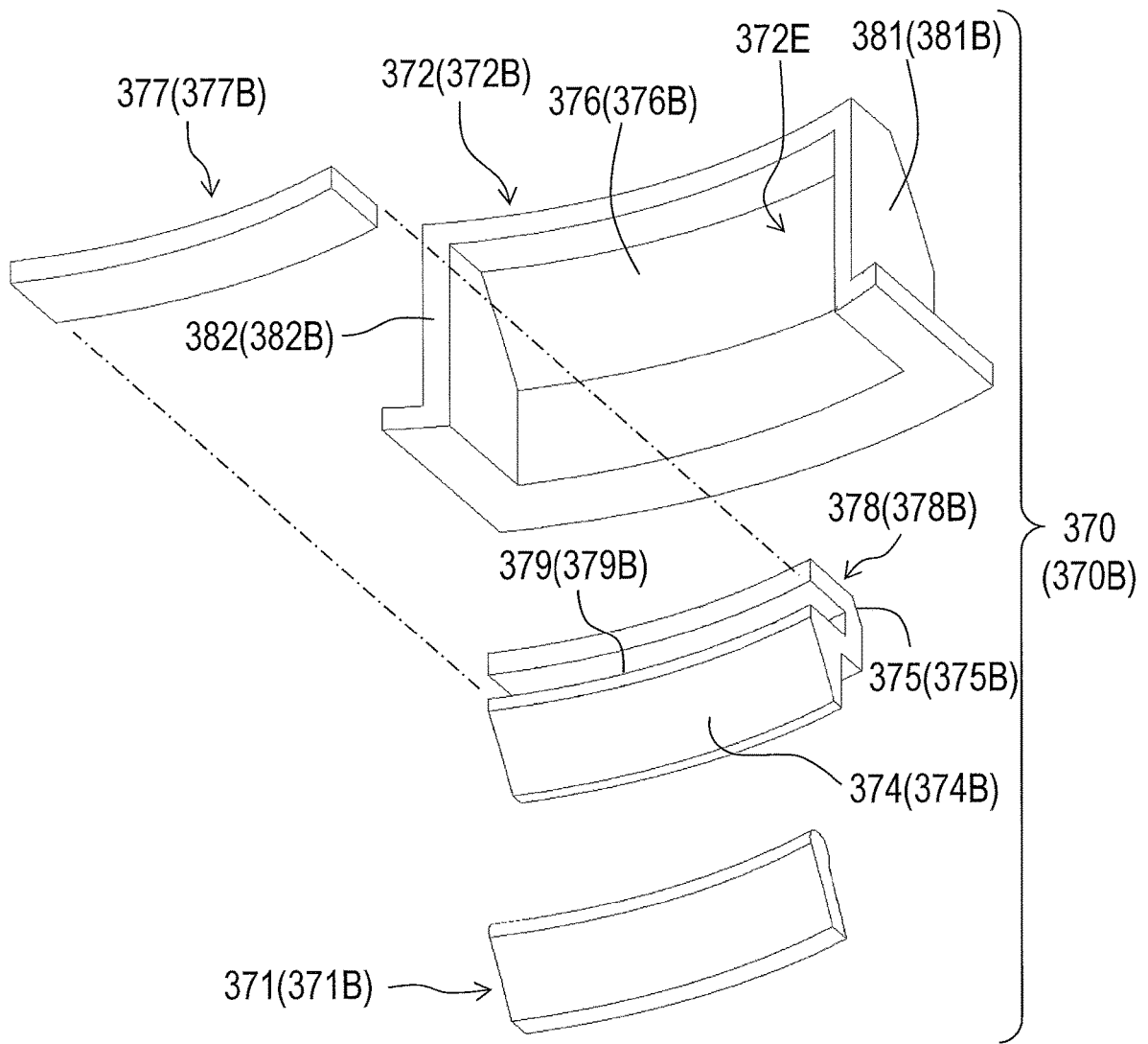
FIG. 45 is an exploded perspective view of the coupling structure of the rotary connector apparatus illustrated in FIG. 36.
Figure 46:
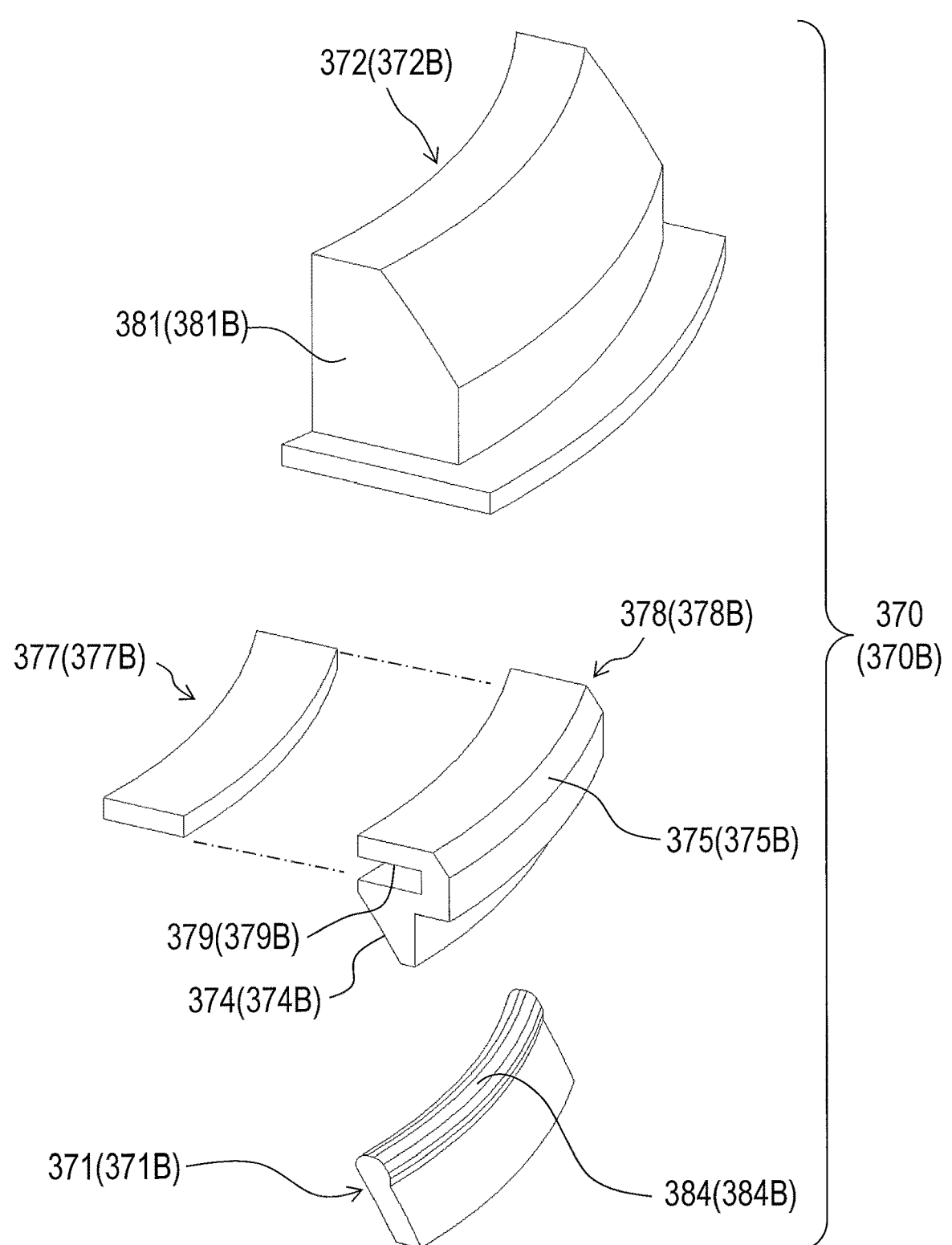
FIG. 46 is an exploded perspective view of the coupling structure of the rotary connector apparatus illustrated in FIG. 36.
Figure 47:
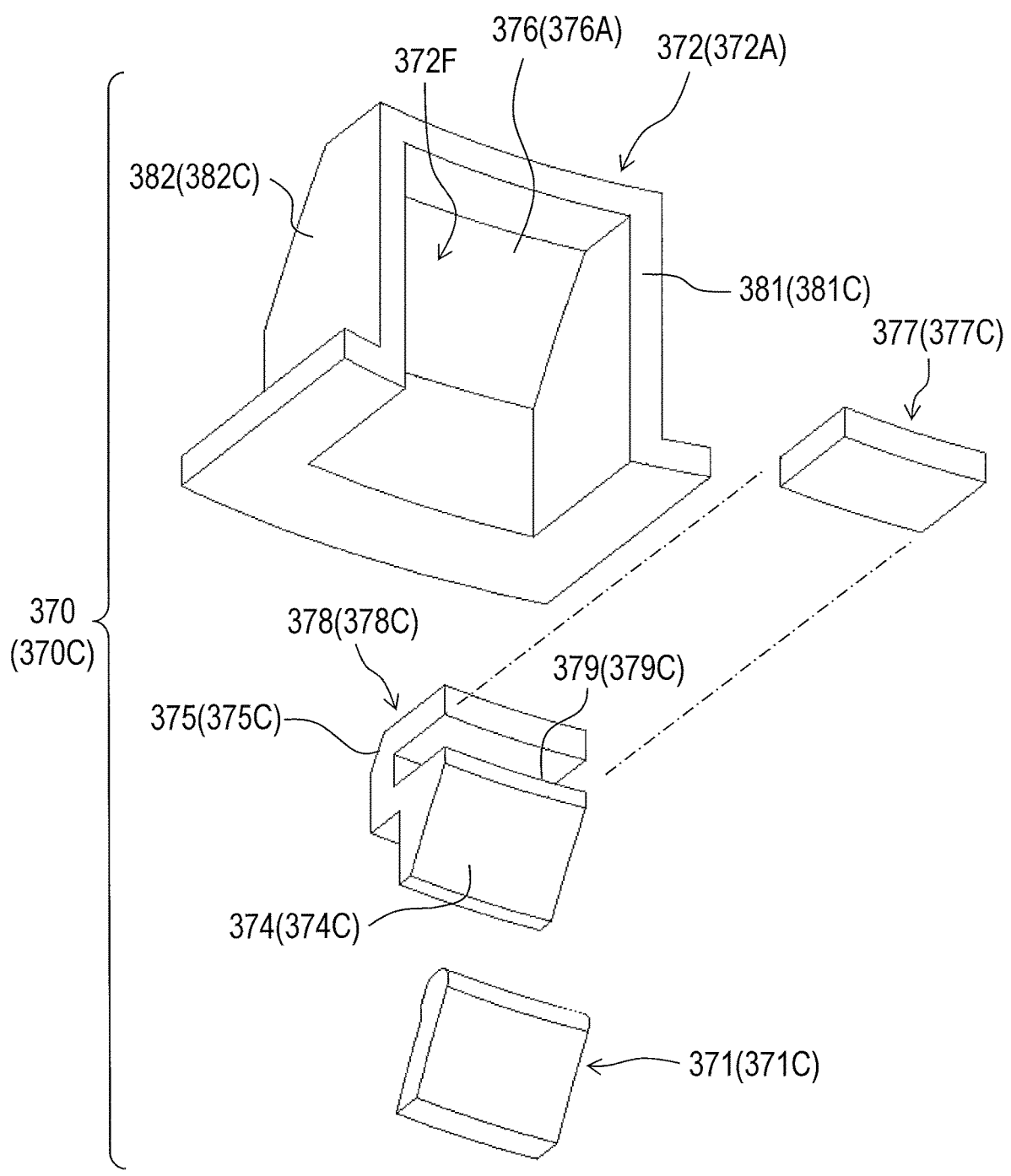
FIG. 47 is an exploded perspective view of the coupling structure of the rotary connector apparatus illustrated in FIG. 36.
Figure 48:
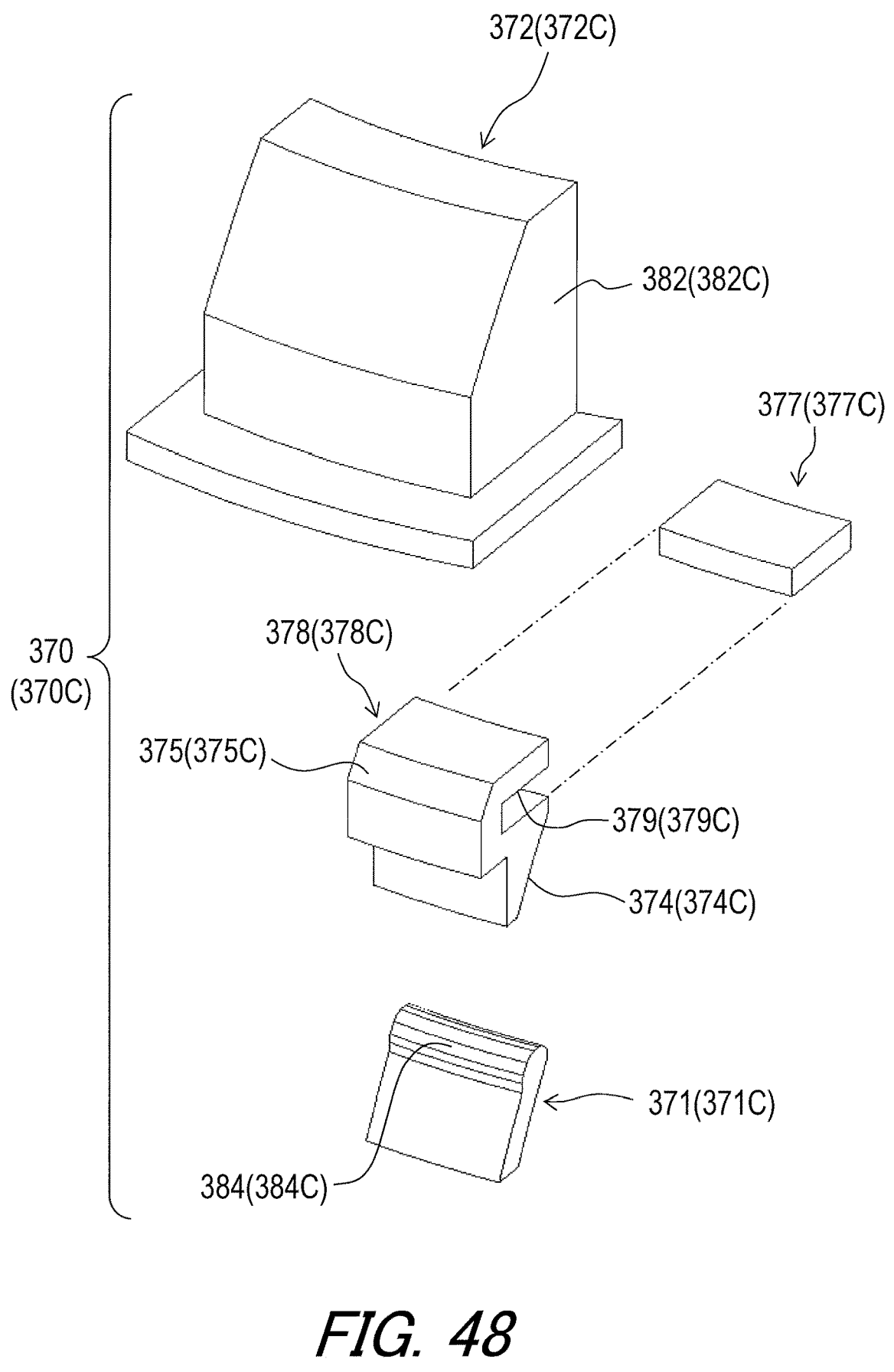

As illustrated in FIGS. 43 to 48, the coupling structure 370 includes a first coupling structure 370A, a second coupling structure 370B, and a third coupling structure 370C. As illustrated in FIGS. 43 and 44, the first coupling structure 370A includes the first supporting body 371A, the second supporting body 372A, the first coupler 377A, and the second coupler 378A. As illustrated in FIGS. 45 and 46, the second coupling structure 370B includes the first supporting body 371B, the second supporting body 372B, the first coupler 377B, and the second coupler 378B. As illustrated in FIGS. 47 and 48, the third coupling structure 370C includes the first supporting body 371C, the second supporting body 372C, the first coupler 377C, and the second coupler 378C.

As illustrated in FIG. 39, the first coupling structure 370A, the second coupling structure 370B, and the third coupling structure 370C are disposed spaced apart from each other in the circumferential direction D33. As viewed along the rotation axis A31, the coupling structure 370 is disposed radially outward of the stator 310. As viewed along the rotation axis A31, the first coupling structure 370A, the second coupling structure 370B, and the third coupling structure 370C are disposed radially outward of the stator 310. However, the arrangement of the coupling structure 370 is not limited to the arrangement illustrated in FIG. 39. The first coupling structure 370A, the second coupling structure 370B, and the third coupling structure 370C are not limited to the arrangement illustrated in FIG. 39. At least two of the first coupling structure 370A, the second coupling structure 370B, and the third coupling structure 370C may be integrally provided. The coupling structure 370 may include another structure in addition to the first coupling structure 370A, the second coupling structure 370B, and the third coupling structure 370C.

As illustrated in FIGS. 40 and 41, the first supporting member 371 supports the stator 310 movably with respect to the vehicle body 3 along a first virtual sphere S31 centered at a reference point RP3. The second supporting member 372 supports the stator 310 movably with respect to the vehicle body 3 along a second virtual sphere S32 centered at the reference point RP3.

In the present embodiment, the reference point RP3 is defined on the rotation axis A31. The first virtual sphere S31 has a first curvature radius R31 defined from the reference point RP3. The second virtual sphere S32 has a second curvature radius R32 defined from the reference point RP3. The second curvature radius R32 is larger than the first curvature radius R31. However, the reference point RP3 may be shifted from the rotation axis A31. The second curvature radius R32 may be smaller than the first curvature radius R31.

The second coupling member 378 is coupled to the first coupling member 377 and is movable with respect to the first coupling member 377 along the virtual plane 370P. The coupling structure 370 supports the stator 310 movably with respect to the base member 303 while restricting the movement of the stator 310 with respect to the base member 303 along the virtual plane 370P within the second movable range MR32 in the state where the coupling structure 370 couples the stator 310 to the base member 303.

Figure 49:
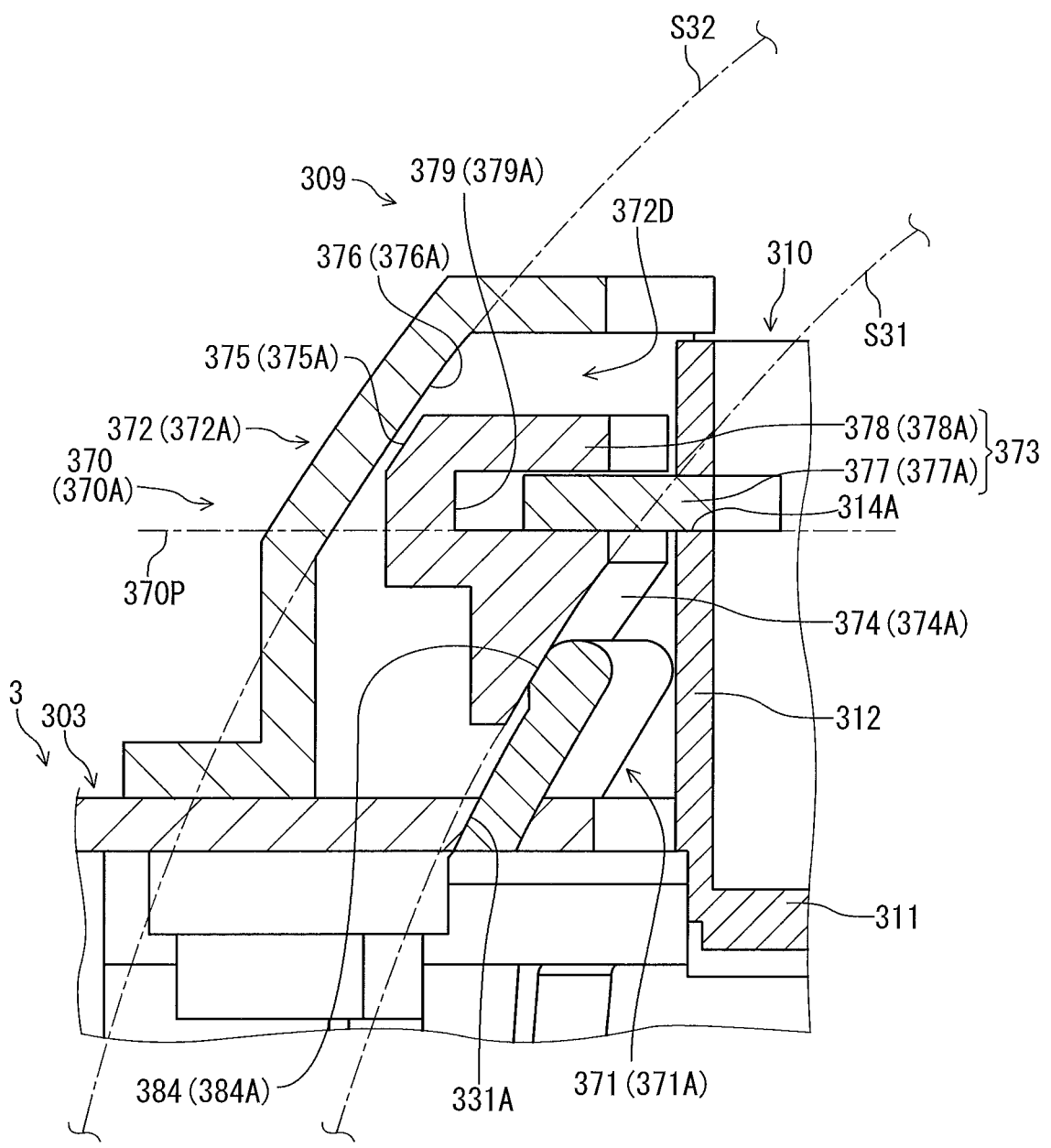
FIG. 49 is a partial cross-sectional view of the coupling structure of the rotary connector apparatus illustrated in FIG. 36.
Figure 50:
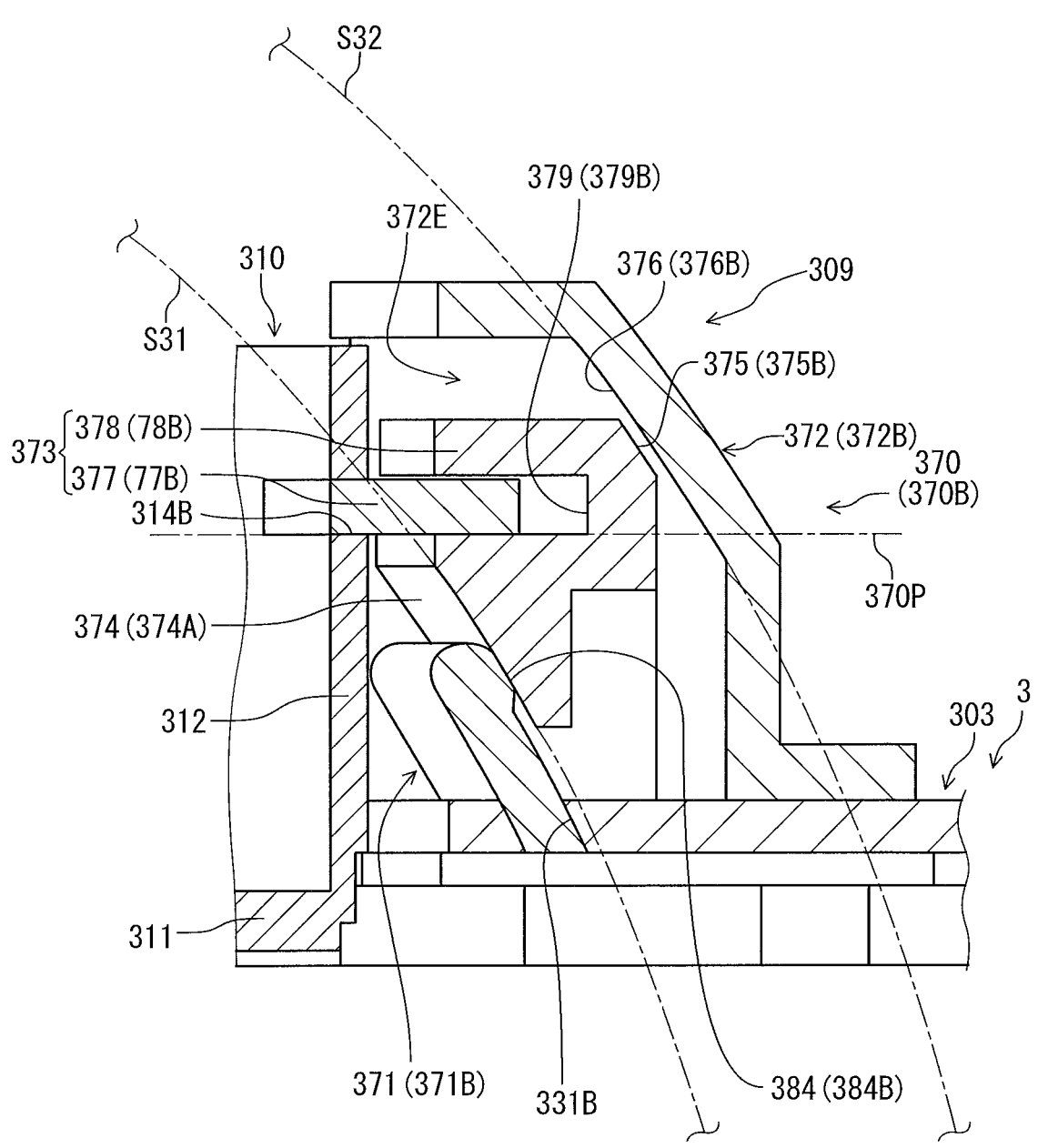
FIG. 50 is a partial cross-sectional view of the coupling structure of the rotary connector apparatus illustrated in FIG. 36.
Figure 51:
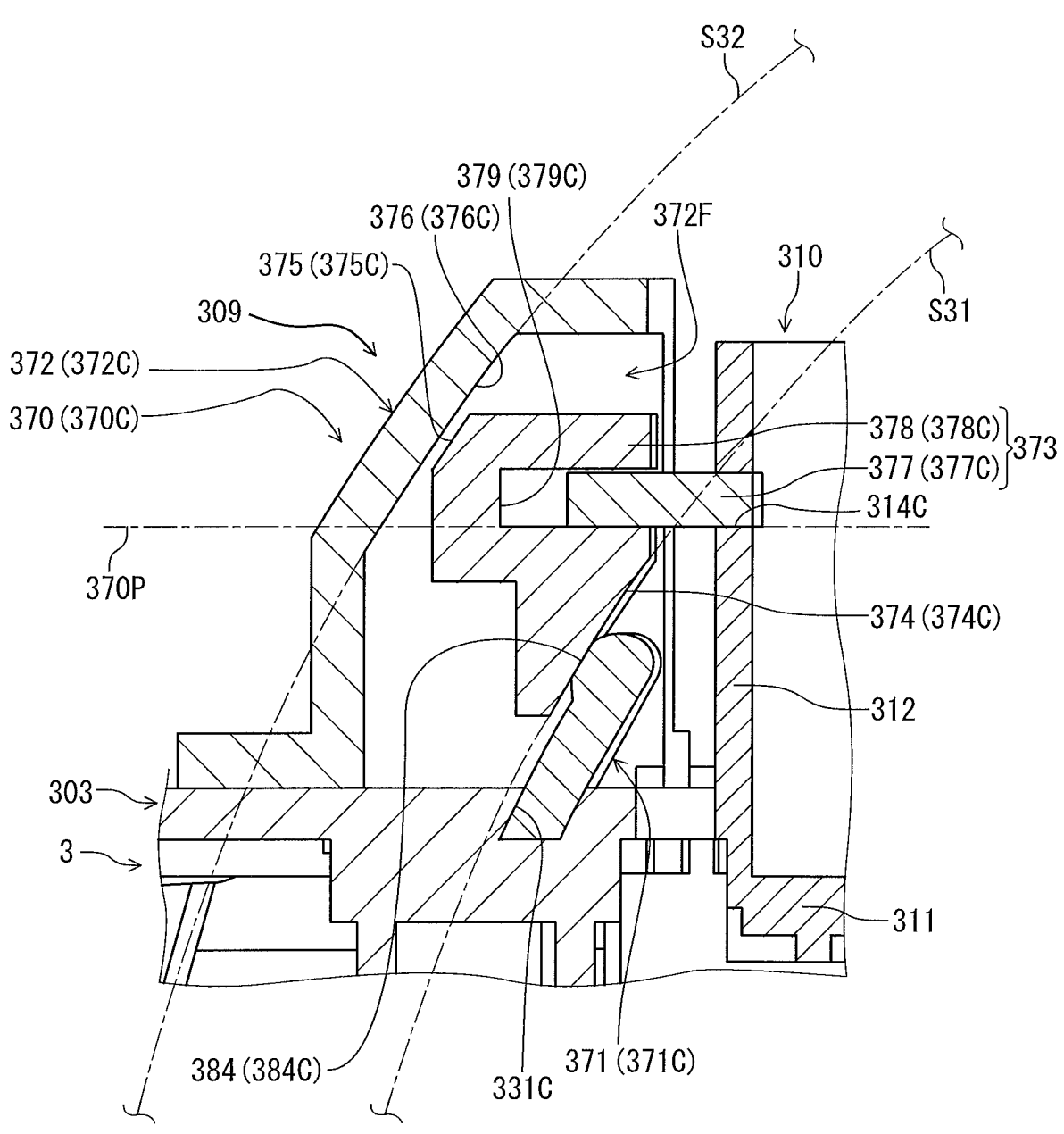
FIG. 51 is a partial cross-sectional view of the coupling structure of the rotary connector apparatus illustrated in FIG. 36.

As illustrated in FIGS. 49 to 51, the coupling member 373 is disposed between the first supporting member 371 and the second supporting member 372. The first supporting member 371 is contactable with the coupling member 373 on the first virtual sphere S31. The second supporting member 372 is contactable with the coupling member 373 on the second virtual sphere S32.

The first supporting member 371 is contactable with the coupling member 373 on the first virtual sphere S31. The first supporting member 371 is contactable with the second coupling member 378 on the first virtual sphere S31. At least one of the first supporting member 371 and the coupling member 373 includes a first curved surface 374 and/or a first curved surface 384 provided along the first virtual sphere S31. At least one of the first supporting member 371 and the second coupling member 378 includes the first curved surface 374 and/or the first curved surface 384 provided along the first virtual sphere S31.

In the present embodiment, the coupling member 373 includes the first curved surface 374. The second coupling member 378 includes the first curved surface 384. The first curved surface 374 includes first curved surfaces 374A, 374B, and 374C. The first curved surface 384 includes first curved surfaces 384A, 384B, and 384C. However, the total number of surfaces included in the first curved surface 374 is not limited to three. The total number of surfaces included in the first curved surface 384 is not limited to three. Only one of the first supporting member 371 and the coupling member 373 (for example, the second coupling member 378) may include the first curved surface 374 or the first curved surface 384.

The second supporting member 372 is contactable with the coupling member 373 on the second virtual sphere S32. The second supporting member 372 is contactable with the second coupling member 378 on the second virtual sphere S32. At least one of the second supporting member 372 and the coupling member 373 includes a second curved surface 375 and/or a second curved surface 376 provided along the second virtual sphere S32. For example, when the second coupling member 378 moves radially outward with respect to the stator 310 and the first coupling member 377, the second supporting member 372 comes into contact with the second coupling member 378 on the second virtual sphere S32. In this manner, the movement range of the second coupling member 378 with respect to the stator 310 and the first coupling member 377 can be restricted within a predetermined range and to allow the stator 310 to move with respect to the vehicle body 3 along the second virtual sphere S32, and thus dropout of the second coupling member 378 can be reduced.

In the present embodiment, the coupling member 373 includes the second curved surface 375. The second supporting member 372 includes the second curved surface 376 slidable with the second curved surface 375. The second curved surface 375 includes second curved surfaces 375A, 375B, and 375C. The second curved surface 376 includes second curved surfaces 376A, 376B, and 376C. However, the total number of surfaces included in the second curved surface 375 is not limited to three. The total number of surfaces included in the second curved surface 376 is not limited to three. Only one of the second supporting member 372 and the coupling member 373 may include the second curved surface 375 or the second curved surface 376.

One of the first coupling member 377 and the second coupling member 378 includes a guide groove 379. The other of the first coupling member 377 and the second coupling member 378 is movably provided in the guide groove 379. In the present embodiment, the second coupling member 378 includes the guide groove 379, and the first coupling member 377 is movably provided in the guide groove 379. The guide groove 379 includes guide grooves 379A, 379B, and 379C. However, the total number of grooves included in the guide groove 379 is not limited to three. The first coupling member 377 may include the guide groove 379, and the second coupling member 378 may be movably provided in the guide groove 379.

Note that the first coupling member 377 may be provided integrally with the second coupling member 378 as a one-piece member. Specifically, the first coupler 377A may be provided integrally with the second coupler 378A as a one-piece member. The first coupler 377B may be provided integrally with the second coupler 378B as a one-piece member. The first coupler 377C may be provided integrally with the second coupler 378C as a one-piece member. In this case, the coupling structure 370 is configured to restrict the movement of the stator 310 with respect to the vehicle body 3 along the virtual plane 370P perpendicular to the rotation axis A31 in the state where the coupling structure 370 couples the stator 310 to the vehicle body 3.

As illustrated in FIG. 49, the first supporting body 371A is contactable with the coupling member 373 on the first virtual sphere S31. The first supporting body 371A is contactable with the second coupler 378A on the first virtual sphere S31. The second coupler 378A includes the first curved surface 374A. The first supporting body 371A includes the first curved surface 384A slidable with the first curved surface 374A. The first supporting body 371A is contactable with the first curved surface 374A on the first virtual sphere S31. The second coupler 378A is contactable with the first curved surface 384A on the first virtual sphere S31.

The second supporting body 372A is contactable with the coupling member 373 on the second virtual sphere S32. The second supporting body 372A is contactable with the second coupler 378A on the second virtual sphere S32. The second coupler 378A includes the second curved surface 375A. The second supporting body 372A includes the second curved surface 376A slidable with the second curved surface 375A. The second supporting body 372A is contactable with the second curved surface 375A on the second virtual sphere S32. The second coupler 378A is contactable with the second curved surface 376A on the second virtual sphere S32.

The coupling member 373 is contactable with the second curved surface 376A on the second virtual sphere S32. The second coupler 378A is contactable with the second curved surface 376A on the second virtual sphere S32. The second coupler 378A is coupled to the first coupler 377A and is movable with respect to the first coupler 377A along the virtual plane 370P.

The first supporting body 371A is fastened to the base member 303. The base member 303 includes a fixing hole 331A. The first supporting body 371A is inserted into the fixing hole 331A. The first supporting body 371A is fastened to the base member 303 by an adhesive and/or press fitting, for example. However, the fixing structure of the first supporting body 371A is not limited to the adhesive and press fitting. The first supporting body 371A may be provided integrally with at least a part of the base member 303 as a one-piece member.

The second supporting body 372A includes a housing recess 372D. The first supporting body 371A, the first coupler 377A, and the second coupler 378A are disposed in the housing recess 372D.

The second supporting body 372A is fastened to the base member 303. The second supporting body 372A is fastened to the base member 303 by an adhesive, for example. However, the second supporting body 372A may be fastened to the base member 303 by a fixing method other than an adhesive. The second supporting body 372A may be provided integrally with at least a part of the base member 303 as a one-piece member.

The outer periphery wall 312 of the stator 310 includes a fixing hole 314A. The first coupler 377A is inserted into the fixing hole 314A. The first coupler 377A is fastened to the base member 303 by an adhesive and/or press fitting, for example. However, the fixing structure of the first coupler 377A is not limited to the adhesive and press fitting. The first coupler 377A may be provided integrally with the outer periphery wall 312 of the stator 310 as a one-piece member.

The first coupler 377A protrudes radially outward from the outer periphery wall 312 of the stator 310. The second coupler 378A includes the guide groove 379A. The first coupler 377A is provided in the guide groove 379A and is movable along the virtual plane 370P.

As illustrated in FIG. 50, the first supporting body 371B is contactable with the coupling member 373 on the first virtual sphere S31. The first supporting body 371B is contactable with the second coupler 378B on the first virtual sphere S31. The second coupler 378B includes a first curved surface 374B. The first supporting body 371B includes a first curved surface 384B slidable with the first curved surface 374B. The first supporting body 371B is contactable with the first curved surface 374B on the first virtual sphere S31. The second coupler 378B is contactable with the first curved surface 384B on the first virtual sphere S31.

The second supporting body 372B is contactable with the coupling member 373 on the second virtual sphere S32. The second supporting body 372B is contactable with the second coupler 378B on the second virtual sphere S32. The second coupler 378B includes a second curved surface 375B. The second supporting body 372B includes a second curved surface 376B slidable with the second curved surface 375B. The second supporting body 372B is contactable with the second curved surface 375B on the second virtual sphere S32. The second coupler 378B is contactable with the second curved surface 376B on the second virtual sphere S32.

The coupling member 373 is contactable with the second curved surface 376B on the second virtual sphere S32. The second coupler 378B is contactable with the second curved surface 376B on the second virtual sphere S32. The second coupler 378B is coupled to the first coupler 377B and is movable with respect to the first coupler 377B along the virtual plane 370P.

The first supporting body 371B is fastened to the base member 303. The base member 303 includes a fixing hole 31B. The first supporting body 371B is inserted into the fixing hole 31B. The first supporting body 371B is fastened to the base member 303 by an adhesive and/or press fitting, for example. However, the fixing structure of the first supporting body 371B is not limited to the adhesive and press fitting. The first supporting body 371B may be provided integrally with at least a part of the base member 303 as a one-piece member.

The second supporting body 372B includes a housing recess 372E. The first supporting body 371B, the first coupler 377B, and the second coupler 378B are disposed in the housing recess 372E.

The second supporting body 372B is fastened to the base member 303. The second supporting body 372B is fastened to the base member 303 by an adhesive, for example. However, the second supporting body 372B may be fastened to the base member 303 by a fixing method other than an adhesive. The second supporting body 372B may be provided integrally with at least a part of the base member 303 as a one-piece member.

The outer periphery wall 312 of the stator 310 includes a fixing hole 14B. The first coupler 377B is inserted into the fixing hole 14B. The first coupler 377B is fastened to the base member 303 by an adhesive and/or press fitting, for example. However, the fixing structure of the first coupler 377B is not limited to the adhesive and press fitting. The first coupler 377B may be provided integrally with the outer periphery wall 312 of the stator 310 as a one-piece member.

The first coupler 377B protrudes radially outward from the outer periphery wall 312 of the stator 310. The second coupler 378B includes the guide groove 379B. The first coupler 377B is provided in the guide groove 379B and is movable along the virtual plane 370P.

As illustrated in FIG. 51, the first supporting body 371C is contactable with the coupling member 373 on the first virtual sphere S31. The first supporting body 371C is contactable with the second coupler 378C on the first virtual sphere S31. The second coupler 378C includes the first curved surface 374C. The first supporting body 371C includes the first curved surface 384C slidable with the first curved surface 374C. The first supporting body 371C is contactable with the first curved surface 374C on the first virtual sphere S31. The second coupler 378C is contactable with the first curved surface 384C on the first virtual sphere S31.

The second supporting body 372C is contactable with the coupling member 373 on the second virtual sphere S32. The second supporting body 372C is contactable with the second coupler 378C on the second virtual sphere S32. The second coupler 378C includes the second curved surface 375C. The second supporting body 372C includes the second curved surface 376C slidable with the second curved surface 375C. The second supporting body 372C is contactable with the second curved surface 375C on the second virtual sphere S32. The second coupler 378C is contactable with the second curved surface 376C on the second virtual sphere S32.

The coupling member 373 is contactable with the second curved surface 376C on the second virtual sphere S32. The second coupler 378C is contactable with the second curved surface 376C on the second virtual sphere S32. The second coupler 378C is coupled to the first coupler 377C and is movable with respect to the first coupler 377C along the virtual plane 370P.

The first supporting body 371C is fastened to the base member 303. The base member 303 includes a fixing hole 31C. The first supporting body 371C is inserted into the fixing hole 31C. The first supporting body 371C is fastened to the base member 303 by an adhesive and/or press fitting, for example. However, the fixing structure of the first supporting body 371C is not limited to the adhesive and press fitting. The first supporting body 371C may be provided integrally with at least a part of the base member 303 as a one-piece member.

The second supporting body 372C includes a housing recess 372F. The first supporting body 371C, the first coupler 377C, and the second coupler 378C are disposed in the housing recess 372F.

The second supporting body 372C is fastened to the base member 303. The second supporting body 372C is fastened to the base member 303 by an adhesive, for example. However, the second supporting body 372C may be fastened to the base member 303 by a fixing method other than an adhesive. The second supporting body 372C may be provided integrally with at least a part of the base member 303 as a one-piece member.

The outer periphery wall 312 of the stator 310 includes a fixing hole 314C. The first coupler 377C is inserted into the fixing hole 314C. The first coupler 377C is fastened to the base member 303 by an adhesive and/or press fitting, for example. However, the fixing structure of the first coupler 377C is not limited to the adhesive and press fitting. The first coupler 377C may be provided integrally with the outer periphery wall 312 of the stator 310 as a one-piece member.

The first coupler 377C protrudes radially outward from the outer periphery wall 312 of the stator 310. The second coupler 378C includes the guide groove 379C. The first coupler 377C is provided in the guide groove 379C and is movable along the virtual plane 370P.

As illustrated in FIG. 39, the coupling structure 370 restricts the rotation of the stator 310 about the rotation axis A31 with respect to the base member 303 of the vehicle body 3 in the state where the coupling structure 370 couples the stator 310 to the base member 303 of the vehicle body 3. The coupling structure 370 restricts the rotation of the stator 310 about the rotation axis A31 with respect to the base member 303 within a predetermined rotation range MR33 in the state where the coupling structure 370 couples the stator 310 to the base member 303.

The second supporting member 372 includes a first stopper 381 and a second stopper 382. The first stopper 381 and the second stopper 382 restrict the rotation of the stator 310 about the rotation axis A31 with respect to the base member 303 of the vehicle body 3 within the predetermined rotation range MR33 in the state where the coupling structure 370 couples the stator 310 to the base member 303 of the vehicle body 3.

The first stopper 381 is disposed spaced apart from the second stopper 382 in the circumferential direction D33. In the present embodiment, the first stopper 381 includes first stoppers 381A, 381B, and 381C. The second stopper 382 includes second stoppers 382A, 382B, and 382C. The first stopper 381A is disposed spaced apart from the second stopper 382A in the circumferential direction D33. The first stopper 381B is disposed spaced apart from the second stopper 382B in the circumferential direction D33. The first stopper 381C is disposed spaced apart from the second stopper 382C in the circumferential direction D33.

The coupling member 373 is disposed between the first stopper 381 and the second stopper 382 in the circumferential direction D33. The first coupling member 377 and the second coupling member 378 are disposed between the first stopper 381 and the second stopper 382 in the circumferential direction D33. With the first coupling member 377 coming into contact with one of the first stopper 381 and the second stopper 382, the rotation of the stator 310 with respect to the base member 303 of the vehicle body 3 is restricted within the predetermined rotation range MR33.

The first coupler 377A and the second coupler 378A are disposed between the first stopper 381A and the second stopper 382A in the circumferential direction D33. The first coupler 377B and the second coupler 378B are disposed between the first stopper 381B and the second stopper 382B in the circumferential direction D33. The first coupler 377C and the second coupler 378C are disposed between the first stopper 381C and the second stopper 382C in the circumferential direction D33.

The guide groove 379 extends in the circumferential direction D33. The guide grooves 379A, 379B, and 379C extend in the circumferential direction D33. At least one of the first coupler 377A and the second coupler 378A is contactable with the first stopper 381A and the second stopper 382A in the circumferential direction D33. At least one of the first coupler 377B and the second coupler 378B is contactable with the first stopper 381B and the second stopper 382B in the circumferential direction D33. At least one of the first coupler 377C and the second coupler 378C is contactable with the first stopper 381C and the second stopper 382C in the circumferential direction D33.

A first gap 385A is provided between the first coupler 377A and the first stopper 381A. A second gap 386A is provided between the first coupler 377A and the second stopper 382A. A first gap 385B is provided between the first coupler 377B and the first stopper 381B. A second gap 386B is provided between the first coupler 377B and the second stopper 382B. A first gap 385C is provided between the first coupler 377C and the first stopper 381C. A second gap 386C is provided between the first coupler 377C and the second stopper 382C.

With the first coupler 377A coming contact with the first stopper 381A and the second stopper 382A, the rotation of the stator 310 with respect to the base member 303 of the vehicle body 3 is restricted within the predetermined rotation range MR33. With the first coupler 377B coming contact with the first stopper 381B and the second stopper 382B, the rotation of the stator 310 with respect to the base member 303 of the vehicle body 3 is restricted within the predetermined rotation range MR33. With the first coupler 377C coming contact with the first stopper 381C and the second stopper 382C, the rotation of the stator 310 with respect to the base member 303 of the vehicle body 3 is restricted within the predetermined rotation range MR33.

In addition, the first gaps 385A, 385B, and 385C and the second gaps 386A, 386B, and 386C suppress a situation where when the stator 310 moves with respect to the base member 303 along the virtual plane 370P (see, for example, FIG. 40), the first coupling member 377 comes into contact with the first stopper 381 or the second stopper 382 and the movable range of the stator 310 becomes narrower than the second movable range MR32 (see, for example, FIG. 40).

As described above, the rotary connector apparatus 304 includes the stator 310, the rotator 320, and the coupling structure 370. The rotator 320 is provided rotatably about the rotation axis A31 with respect to the stator 310. The coupling structure 370 is configured to couple the stator 310 to the vehicle body 3. For the cable housing space 350, the stator 310 and the rotator 320 define the cable housing space 350 provided to surround the rotation axis A31. The coupling structure 370 supports the stator 310 movably with respect to vehicle body 3 to change the angle of the rotation axis A31 with respect to the vehicle body 3 in the state where the coupling structure 370 couples the stator 310 to the vehicle body 3.

The rotary connector apparatus 304 supports the stator 310 movably with respect to the vehicle body 3 to change the angle of the rotation axis A31 with respect to the vehicle body 3, and thus the stator 310 can follow the declination of the steering 4 even when the rotation axis A31 of the steering 4 is tilted with respect to the rotation axis A31 of the rotary connector apparatus. In this manner, the rotator 320 can also follow the declination of the steering, and thus the influence of misalignment of the steering 4 can be reduced with a simple structure.

As described above, the rotary connector apparatus 304 includes the stator 310, the rotator 320, and the adjustment structure 309. The stator 310 is configured to be attached to the vehicle body 3. The rotator 320 is provided rotatably about the rotation axis A31 with respect to the stator 310. The adjustment structure 309 is configured to allow the rotation axis A31 to move with respect to the vehicle body 3 in the state where the stator 310 is attached to the vehicle body 3. The stator 310 and the rotator 320 define the cable housing space 350 provided to surround the rotation axis A31.

With the rotary connector apparatus 304, the adjustment structure 309 allows the rotation axis A31 to move with respect to the vehicle body 3, and thus the influence of at least one of the declination and eccentricity of the steering 4 can be reduced with a simple structure.

According to a first aspect, a rotary connector apparatus comprises a stator, a rotator, and an adjustment structure. The stator is configured to be attached to a vehicle body. The rotator is provided rotatably about a rotation axis with respect to the stator. The stator and the rotator define a cable housing space provided to surround the rotation axis. The adjustment structure is configured to allow the rotation axis to move with respect to the vehicle body in a state where the stator is attached to the vehicle body.

With the rotary connector apparatus according to the first aspect, the adjustment structure allows the rotation axis to move with respect to the vehicle body, and thus the influence of at least one of the declination and eccentricity of the steering can be reduced with a simple structure.

According to a second aspect, in the rotary connector apparatus according to the first aspect, the adjustment structure includes a movable member. The movable member is attached to the rotator and is configured to transmit a rotation of a steering to the rotator. The movable member includes a rotation input part configured to receive a rotational force from the steering. The rotator includes a support structure movably supporting the movable member to change an angle of the rotation input part with respect to the rotator.

With the rotary connector apparatus according to the second aspect, the support structure movably supports the movable member to change the angle of the rotation input part with respect to rotator, and thus the rotation input part of the movable member can follow the declination of the steering even when the rotation axis of the steering is tilted with respect to the rotation axis of the rotary connector apparatus. Thus, the influence of the declination of the steering can be reduced.

According to a third aspect, in the rotary connector apparatus according to the second aspect, the support structure includes a first supporting body supporting the movable member movably along a first virtual sphere centered at a reference point.

With the rotary connector apparatus according to the third aspect, the rotation input part of the movable member can smoothly follow the declination of the steering.

According to a fourth aspect, in the rotary connector apparatus according to the third aspect, the reference point is defined on the rotation axis.

With the rotary connector apparatus according to the fourth aspect, the rotation input part of the movable member can further smoothly follow the declination of the steering.

According to a fifth aspect, in the rotary connector apparatus according to the third or fourth aspect, the first supporting body and the movable member are contactable with each other on the first virtual sphere. With the rotary connector apparatus according to the fourth aspect, the rotation input part of the movable member can reliably follow the declination of the steering.

According to a sixth aspect, in the rotary connector apparatus according to any one of the third to fifth aspects, at least one of the first supporting body and the movable member includes a first curved surface provided along the first virtual sphere.

With the rotary connector apparatus according to the sixth aspect, the rotation input part of the movable member can further smoothly follow the declination of the steering.

According to a seventh aspect, in the rotary connector apparatus according to any one of the third to sixth aspects, the support structure includes a second supporting body supporting the movable member movably along a second virtual sphere centered at the reference point.

With the rotary connector apparatus according to the seventh aspect, the rotation input part of the movable member can further smoothly follow the declination of the steering.

According to an eighth aspect, in the rotary connector apparatus according to the seventh aspect, the second supporting body and the movable member are contactable with each other on the second virtual sphere.

With the rotary connector apparatus according to the eighth aspect, the rotation input part of the movable member can reliably and smoothly follow the declination of the steering.

According to a ninth aspect, in the rotary connector apparatus according to the seventh or eighth aspect, at least one of the second supporting body and the movable member includes a second curved surface provided along the second virtual sphere.

With the rotary connector apparatus according to the ninth aspect, the rotation input part of the movable member can further smoothly follow the declination of the steering.

According to a tenth aspect, in the rotary connector apparatus according to any one of the seventh to ninth aspects, the first virtual sphere has a first curvature radius defined from the reference point. The second virtual sphere has a second curvature radius defined from the reference point. The second curvature radius is larger than the first curvature radius.

With the rotary connector apparatus according to the tenth aspect, the rotation input part of the movable member can further smoothly follow the declination of the steering.

According to an eleventh aspect, in the rotary connector apparatus according to any one of the seventh to tenth aspects, the movable member is disposed between the first supporting body and the second supporting body.

With the rotary connector apparatus according to the eleventh aspect, the rotation input part of the movable member can further smoothly follow the declination of the steering.

According to a twelfth aspect, in the rotary connector apparatus according to any one of the seventh to eleventh aspects, the rotator includes a rotator body, and a holding member attached to the rotator body. The stator and the rotator body define the cable housing space. The movable member is movably held between the rotator body and the holding member.

With the rotary connector apparatus according to the twelfth aspect, the rotation input part of the movable member can further smoothly follow the declination of the steering.

According to a thirteenth aspect, in the rotary connector apparatus according to the twelfth aspect, the first supporting body is provided at the rotator body. The second supporting body is provided at the holding member.

With the rotary connector apparatus according to the thirteenth aspect, the movable member can be easily attached to the rotator body.

According to a fourteenth aspect, in the rotary connector apparatus according to the twelfth or thirteenth aspect, the movable member includes a first movable body and a second movable body. The rotation input part includes a first rotation input part and a second rotation input part. The first movable body includes the first rotation input part. The second movable body includes the second rotation input part. The support structure movably supports the first movable body to change an angle of the first rotation input part with respect to the rotator. The support structure movably supports the second movable body to change an angle of the second rotation input part with respect to the rotator.

With the rotary connector apparatus according to the fourteenth aspect, the rotation of the steering can be received by the first rotation input part and the second rotation input part, and thus the load of the first rotation input part and the second rotation input part can be distributed. Further, since the first rotation input part and the second rotation input part can separately follow the declination of the steering, the influence of the declination of the steering can be effectively reduced.

According to a fifteenth aspect, in the rotary connector apparatus according to the fourteenth aspect, the first supporting body includes a first supporting part and a second supporting part. The first supporting part supports the first movable body movably along the first virtual sphere. The second supporting part supports the second movable body movably along the first virtual sphere.

With the rotary connector apparatus according to the fifteenth aspect, each of the first rotation input part and the second rotation input part can smoothly follow the declination of the steering.

According to a sixteenth aspect, in the rotary connector apparatus according to the fifteenth aspect, the second supporting body includes a third supporting part and a fourth supporting part. The third supporting part supports the first movable body movably along the second virtual sphere. The fourth supporting part supports the second movable body movably along the second virtual sphere.

With the rotary connector apparatus according to the sixteenth aspect, each of the first rotation input part and the second rotation input part can further smoothly follow the declination of the steering.

According to a seventeenth aspect, in the rotary connector apparatus according to the fifteenth or sixteenth aspect, the first movable body includes a first movable part movably held between the first supporting part and the holding member. The first rotation input part protrudes from the first movable part along the rotation axis. The holding member includes a first opening. The first rotation input part extends through the first opening.

With the rotary connector apparatus according to the seventeenth aspect, the movement of the first movable body with respect to the rotator can be further smoothened while movably holding the first movable body.

According to an eighteenth aspect, in the rotary connector apparatus according to any one of the fifteenth to seventeenth aspects, the second movable body includes a second movable part movably held between the second supporting part and the holding member. The second rotation input part protrudes from the second movable part along the rotation axis. The holding member includes a second opening. The second rotation input part extends through the second opening.

With the rotary connector apparatus according to the eighteenth aspect, the movement of the second movable body with respect to the rotator can be further smoothened while movably holding the second movable body.

According to a nineteenth aspect, in the rotary connector apparatus according to the first aspect, the adjustment structure includes a coupling structure. The coupling structure is configured to couple the stator to the vehicle body. The coupling structure is contactable with the vehicle body to restrict a movement of the stator with respect to the vehicle body in an axial direction defined along the rotation axis and to allow the stator to move with respect to the vehicle body along a virtual plane perpendicular to the rotation axis in a state where the coupling structure couples the stator to the vehicle body.

With the rotary connector apparatus according to the nineteenth aspect, even when the steering becomes eccentric, the stator follows the eccentricity of the steering, and thus the rotator can also follow the eccentricity of the steering. In this manner, the influence of the eccentricity of the steering can be reduced with a simple structure.

According to a twentieth aspect, in the rotary connector apparatus according to the nineteenth aspect, the coupling structure is contactable with the vehicle body to restrict the movement of the stator with respect to the vehicle body along the virtual plane perpendicular to the rotation axis within a first movable range in the state where the coupling structure couples the stator to the vehicle body.

With the rotary connector apparatus according to the twentieth aspect, the movement of the stator with respect to the vehicle body along the virtual plane can be restricted within the minimum necessary range with the stator following the eccentricity of the steering, and thus increase in space required for installation of the rotary connector apparatus can be suppressed.

According to a twenty-first aspect, in the rotary connector apparatus according to the twentieth aspect, the coupling structure is contactable with the vehicle body to restrict a rotation of the stator about the rotation axis with respect to the vehicle body in the state where the coupling structure couples the stator to the vehicle body.

With the rotary connector apparatus according to the twenty-first aspect, the rotation of the stator with respect to the vehicle body can be suppressed with the stator following the eccentricity of the steering, and thus the operation of the rotary connector apparatus can be stabilized.

According to a twenty-second aspect, in the rotary connector apparatus according to any one of the nineteenth to twenty-first aspects, the coupling structure includes a first sliding part slidable with the vehicle body.

With the rotary connector apparatus according to the twenty-second aspect, with the first sliding part, the stator can move with respect to the vehicle body along the virtual plane while restricting the movement of the stator with respect to the vehicle body in the axial direction. Thus, the coupling structure can be simplified while reducing the influence of the eccentricity of the steering.

According to a twenty-third aspect, in the rotary connector apparatus according to the twenty-second aspect, the first sliding part is disposed spaced apart from the stator in the axial direction.

With the rotary connector apparatus according to the twenty-third aspect, since the space between the first sliding part and the stator can be effectively used, the influence of the eccentricity of the steering can be reduced while suppressing increase in space required for installation of the rotary connector apparatus.

According to a twenty-fourth aspect, in the rotary connector apparatus according to the twenty-second or twenty-third aspect, the coupling structure includes a second sliding part slidable with the vehicle body. The second sliding part is disposed at a position different from that of the first sliding part in the axial direction.

With the rotary connector apparatus according to the twenty-fourth aspect, with the first sliding part and the second sliding part, the stator can move with respect to the vehicle body along the virtual plane while restricting the movement of the stator with respect to the vehicle body in the axial direction. Thus, the movement of the stator with respect to the vehicle body can be stabilized, and the influence of the eccentricity of the steering can be effectively reduced.

According to a twenty-fifth aspect, in the rotary connector apparatus according to the twenty-fourth aspect, the second sliding part is disposed spaced apart from the first sliding part in the axial direction.

With the rotary connector apparatus according to the twenty-fifth aspect, since the space between the first sliding part and the second sliding part can be effectively used, the influence of the eccentricity of the steering can be reduced while suppressing increase in space required for installation of the rotary connector apparatus.

According to a twenty-sixth aspect, in the rotary connector apparatus according to the twenty-fourth or twenty-fifth aspect, the second sliding part is provided at the stator.

With the rotary connector apparatus according to the twenty-sixth aspect, the stator can be used as a part of the coupling structure, and thus the coupling structure can be further simplified.

According to a twenty-seventh aspect, in the rotary connector apparatus according to any one of the twenty-second to twenty-sixth aspects, the coupling structure includes a coupling member extending from the stator in the axial direction. The first sliding part is provided at an end portion of the coupling member and protrudes along the virtual plane from the coupling member.

With the rotary connector apparatus according to the twenty-seventh aspect, the first sliding part can be achieved with the first sliding part.

According to a twenty-eighth aspect, in the rotary connector apparatus according to the twenty-seventh aspect, the coupling member extends from the stator away from the cable housing space in the axial direction.

With the rotary connector apparatus according to the twenty-eighth aspect, the space on the rear side of the cable housing space can be effectively used as the space for providing the coupling structure, and thus the influence of the eccentricity of the steering can be reduced while suppressing increase in space required for installation of the rotary connector apparatus.

According to a twenty-ninth aspect, in the rotary connector apparatus according to the twenty-seventh or twenty-eighth aspect, the coupling member is provided integrally with the stator as a one-piece member.

With the rotary connector apparatus according to the twenty-ninth aspect, the influence of the eccentricity of the steering can be reduced while increasing the coupling strength between the stator and the coupling member.

According to a thirtieth aspect, in the rotary connector apparatus according to any one of the twenty-seventh to twenty-ninth aspects, the coupling member includes at least one coupling rod extending from the stator in the axial direction. The first sliding part includes at least one restriction plate attached to an end portion of the at least one coupling rod, respectively. The at least one restriction plate protrudes along the virtual plane from the at least one coupling rod, respectively.

With the rotary connector apparatus according to the thirtieth aspect, with the at least one coupling rod and the at least one restriction plate, the influence of the eccentricity of the steering can be reduced while further increasing the coupling strength between the stator and the coupling member.

According to a thirty-first aspect, the steering apparatus includes a supporting member included in a vehicle body, and the rotary connector apparatus according to any one of the nineteenth to thirtieth aspects. The coupling structure is contactable with the supporting member to restrict the movement of the stator with respect to the supporting member in the axial direction and to allow the stator to move with respect to the supporting member along the virtual plane in the state where the coupling structure couples the stator to the supporting member.

With the rotary connector apparatus according to the thirty-first aspect, even when the steering becomes eccentric, the stator follows the eccentricity of the steering, and thus the rotator can also follow the eccentricity of the steering. In this manner, the influence of the eccentricity of the steering can be reduced with a simple structure.

According to a thirty-second aspect, in the steering apparatus according to the thirty-first aspect, the supporting member includes an opening and a first supporting part provided at a periphery of the opening. The coupling structure is inserted into the opening in the state where the coupling structure couples the stator to the supporting member. The coupling structure is contactable with the first supporting part to restrict the movement of the stator with respect to the supporting member in the axial direction and to allow the stator to move with respect to the supporting member along the virtual plane in the state where the coupling structure couples the stator to the supporting member.

With the steering apparatus the according to the thirty-second aspect, the influence of the eccentricity of the steering can be reduced with a simple structure while suppressing increase in size of the supporting member.

According to a thirty-third aspect, in the rotary connector apparatus according to the first aspect, the adjustment structure includes a coupling structure. The coupling structure is configured to couple the stator to the vehicle body. The coupling structure supports the stator movably with respect to the vehicle body to change an angle of the rotation axis with respect to the vehicle body in a state where the coupling structure couples the stator to the vehicle body.

With the rotary connector apparatus according to the thirty-third aspect, since the stator is supported movably with respect to the vehicle body to change the angle of the rotation axis with respect to the vehicle body, the stator can follow the declination of the steering even when the rotation axis of the steering is tilted with respect to the rotation axis of the rotary connector apparatus. Thus, the rotator can also follow the declination of the steering, and the influence of misalignment of the steering can be reduced with a simple structure.

According to a thirty-fourth aspect, in the rotary connector apparatus according to the thirty-third aspect, the coupling structure includes a first supporting member supporting the stator movably with respect to the vehicle body along a first virtual sphere centered at a reference point.

With the rotary connector apparatus according to the thirty-fourth aspect, the stator and the rotator can smoothly follow the declination of the steering.

According to a thirty-fifth aspect, in the rotary connector apparatus according to the thirty-fourth aspect, the reference point is defined on the rotation axis.

With the rotary connector apparatus according to the thirty-fifth aspect, the stator and the rotator can further smoothly follow the declination of the steering.

According to a thirty-sixth aspect, in the rotary connector apparatus according to the thirty-fourth or thirty-fifth aspect, the coupling structure includes a coupling member coupled to the stator. The first supporting member is contactable with the coupling member on the first virtual sphere.

With the rotary connector apparatus according to the thirty-sixth aspect, the stator and the rotator can reliably follow the declination of the steering.

According to a thirty-seventh aspect, in the rotary connector apparatus according to the thirty-sixth aspect, at least one of the first supporting member and the coupling member includes a first curved surface provided along the first virtual sphere.

With the rotary connector apparatus according to the thirty-seventh aspect, the stator and the rotator can further smoothly follow the declination of the steering.

According to a thirty-eighth aspect, in the rotary connector apparatus according to the thirty-sixth or thirty-seventh aspect, the coupling structure includes a second supporting member supporting the stator movably with respect to the vehicle body along a second virtual sphere centered at the reference point.

With the rotary connector apparatus according to the thirty-eighth aspect, the stator and the rotator can further smoothly follow the declination of the steering.

According to a thirty-ninth aspect, in the rotary connector apparatus according to the thirty-eighth aspect, the second supporting member is contactable with the coupling member on the second virtual sphere.

With the rotary connector apparatus according to the thirty-ninth aspect, the stator and the rotator can reliably and smoothly follow the declination of the steering.

According to a fortieth aspect, in the rotary connector apparatus according to the thirty-eighth or thirty-ninth aspect, at least one of the second supporting member and the coupling member includes a second curved surface provided along the second virtual sphere.

With the rotary connector apparatus according to the fortieth aspect, the stator and the rotator can further smoothly follow the declination of the steering.

According to a forty-first aspect, in the rotary connector apparatus according to any one of the thirty-eighth to fortieth aspects, the first virtual sphere has a first curvature radius defined from the reference point. The second virtual sphere has a second curvature radius defined from the reference point. The second curvature radius is larger than the first curvature radius.

With the rotary connector apparatus according to the forty-first aspect, the stator and the rotator can further smoothly follow the declination of the steering.

According to a forty-second aspect, in the rotary connector apparatus according to any one of the thirty-eighth to forty-first aspects, the coupling member is disposed between the first supporting member and the second supporting member.

With the rotary connector apparatus according to the forty-second aspect, the stator and the rotator can further smoothly follow the declination of the steering.

According to a forty-third aspect, in the rotary connector apparatus according to any one of the thirty-eighth to forty-second aspects, the coupling structure supports the stator movably with respect to the vehicle body and to allow the stator to move with respect to the vehicle body along a virtual plane perpendicular to the rotation axis in the state where the coupling structure couples the stator to the vehicle body.

With the rotary connector apparatus according to the forty-third aspect, the stator and the rotator can follow not only the declination of the steering, but also the eccentricity of the steering. Thus, the influence of misalignment of the steering can be further reduced with a simple structure.

According to a forty-fourth aspect, in the rotary connector apparatus according to the forty-third aspect, the coupling member includes a first coupling member fastened to the stator, and a second coupling member coupled to the first coupling member and movable with respect to the first coupling member along the virtual plane. The first supporting member is contactable with the second coupling member on the first virtual sphere.

With the rotary connector apparatus according to the forty-fourth aspect, the stator and the rotator can follow the eccentricity of the steering with a simple structure.

According to a forty-fifth aspect, in the rotary connector apparatus according to the forty-fourth aspect, the second supporting member is contactable with the second coupling member on the second virtual sphere.

With the rotary connector apparatus according to the forty-fifth aspect, the stator and the rotator can smoothly follow the eccentricity of the steering with a simple structure.

According to a forty-sixth aspect, in the rotary connector apparatus according to the forty-fourth or forty-fifth aspect, one of the first coupling member and the second coupling member includes a guide groove. The other of the first coupling member and the second coupling member is movably provided in the guide groove.

With the rotary connector apparatus according to the forty-sixth aspect, the stator and the rotator can smoothly follow the eccentricity of the steering with a simple structure.

According to a forty-seventh aspect, a steering apparatus includes a base member included in the vehicle body, and the rotary connector apparatus according to any one of the first to forty-sixth aspects. The coupling structure supports the stator movably with respect to the base member to change the angle of the rotation axis with respect to the base member in the state where the coupling structure couples the stator to the base member.

With the steering apparatus according to the forty-seventh aspect, since the stator is supported movably with respect to the vehicle body to change the angle of the rotation axis with respect to the vehicle body, the stator can follow the declination of the steering even when the rotation axis of the steering is tilted with respect to the rotation axis of the rotary connector apparatus. Thus, the rotator can also follow the declination of the steering, and the influence of misalignment of the steering can be reduced with a simple structure.

In the present application, the term "comprise" and its derivatives are non-limiting terms for explaining the existence of a component, and the existence of other components not described is not excluded. This also applies to "have", "include", and their derivatives.

In the present application, ordinal numbers such as "first" and "second" are merely terms used to identify a configuration and do not have any other meaning (e.g., a specific order or the like). For example, the presence of "first element" does not imply the presence of "second element", and the presence of "second element" does not imply the presence of the "first element".

In addition, the expressions such as "parallel", "orthogonal", and "the same" in the present disclosure should not be strictly interpreted, and the expressions may include the meanings of "substantially parallel", "substantially orthogonal", and "substantially the same", respectively. In addition, the terms such as "substantially", "about", and "approximately" for describing degrees mean that the modifying term may include a reasonable amount of deviation that does not significantly change the final result.

The expression "at least one of A and B" in the present disclosure also includes, for example, all of (1) only A, (2) only B, and (3) both A and B. The expression "at least one of A, B, and C" includes, for example, all of (1) only A, (2) only B, (3) only C, (4) A and B, (5) B and C, (6) A and C, and (7) A, B and C. In the present disclosure, the expression "at least one of A and B" is not construed as "at least one of A and at least one of B".

It is apparent from the above disclosure that various changes and modifications of the disclosure are possible. Accordingly, the disclosure may be implemented in a manner different from the specific disclosure of the present application without departing from the spirit of the disclosure.

What is claimed is:

1. A rotary connector apparatus comprising:
a stator configured to be attached to a vehicle body;
a rotator provided rotatably about a rotation axis with respect to the stator, the stator and the rotator defining a cable housing space provided to surround the rotation axis; and
an adjustment structure configured to allow the rotation axis to move with respect to the vehicle body in a state where the stator is attached to the vehicle body, the adjustment structure comprising a coupling structure configured to couple the stator to the vehicle body,
the coupling structure supporting the stator movably with respect to the vehicle body to change an angle of the rotation axis with respect to the vehicle body in a state where the coupling structure couples the stator to the vehicle body,
the coupling structure comprising a first supporting member supporting the stator movably with respect to the vehicle body along a first virtual sphere centered at a reference point,
the coupling structure comprising a coupling member coupled to the stator, and
the first supporting member being contactable with the coupling member on the first virtual sphere.

2. The rotary connector apparatus according to claim 1, wherein
the reference point is defined on the rotation axis.

3. The rotary connector apparatus according to claim 1, wherein
at least one of the first supporting member and the coupling member comprises a first curved surface provided along the first virtual sphere.

4. The rotary connector apparatus according to claim 1, wherein
the coupling structure comprises a second supporting member supporting the stator movably with respect to the vehicle body along a second virtual sphere centered at the reference point.

5. The rotary connector apparatus according to claim 4, wherein
the second supporting member is contactable with the coupling member on the second virtual sphere.

6. The rotary connector apparatus according to claim 4, wherein
at least one of the second supporting member and the coupling member comprises a second curved surface provided along the second virtual sphere.

7. The rotary connector apparatus according to claim 4, wherein
the first virtual sphere has a first curvature radius defined from the reference point,
the second virtual sphere has a second curvature radius defined from the reference point, and
the second curvature radius is larger than the first curvature radius.

8. The rotary connector apparatus according to claim 4, wherein
the coupling member is disposed between the first supporting member and the second supporting member.

9. The rotary connector apparatus according to claim 4, wherein
the coupling structure supports the stator movably with respect to the vehicle body and to allow the stator to move with respect to the vehicle body along a virtual plane perpendicular to the rotation axis in the state where the coupling structure couples the stator to the vehicle body.

10. The rotary connector apparatus according to claim 9, wherein
the coupling member comprises:
a first coupling member fastened to the stator; and
a second coupling member coupled to the first coupling member and movable with respect to the first coupling member along the virtual plane, and
the first supporting member is contactable with the second coupling member on the first virtual sphere.

11. The rotary connector apparatus according to claim 10, wherein the second supporting member is contactable with the second coupling member on the second virtual sphere.

12. The rotary connector apparatus according to claim 10, wherein one of the first coupling member and the second coupling member comprises a guide groove, and the other of the first coupling member and the second coupling member is movably provided in the guide groove.

13. A steering apparatus comprising:

a base member included in the vehicle body;

the rotary connector apparatus according to claim 1; and the coupling structure supporting the stator movably with respect to the base member to change the angle of the rotation axis with respect to the base member in the state where the coupling structure couples the stator to the base member.

\*   \*   \*   \*   \*